US008515065B2

(12) United States Patent
Murakami et al.

(10) Patent No.: US 8,515,065 B2

(45) Date of Patent: Aug. 20, 2013

(54) VIDEO INPUT DEVICE AND VIDEO DISPLAY SYSTEM

(75) Inventors: Shinya Murakami, Kyoto (JP); Ryogo Yanagisawa, Osaka (JP); Syuji Kato, Osaka (JP); Toru Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/371,097

(22) Filed: Feb. 10, 2012

(65) Prior Publication Data

US 2012/0140924 A1 Jun. 7, 2012

Related U.S. Application Data

(63) Continuation of application No. PCT/JP2010/001010, filed on Feb. 17, 2010.

(30) Foreign Application Priority Data

Aug. 18, 2009 (JP) ................................ 2009-189118

(51) Int. Cl.
*H04N 7/167* (2011.01)

(52) U.S. Cl.
USPC ........... 380/200; 380/205; 380/210; 380/216; 380/232; 726/2; 726/26; 725/20; 713/168; 713/187

(58) Field of Classification Search
USPC ......... 380/200, 205, 210, 216, 232; 713/168, 713/187; 725/20; 726/2, 26
See application file for complete search history.

(56) References Cited

U.S. PATENT DOCUMENTS

| | | | | |
|---|---|---|---|---|
| 7,362,861 B2 * | 4/2008 | Yacobi et al. | 380/213 |
| 7,698,722 B1 * | 4/2010 | Chatelier et al. | 725/50 |
| 7,979,910 B2 * | 7/2011 | Mantani | 726/26 |
| 8,026,981 B2 * | 9/2011 | Jong | 348/705 |
| 8,055,363 B2 * | 11/2011 | Lee | 700/94 |
| 2008/0240230 A1 * | 10/2008 | Oxman et al. | 375/240.01 |
| 2008/0307496 A1 | 12/2008 | Kurose | |
| 2010/0118000 A1 * | 5/2010 | Gu et al. | 345/204 |
| 2011/0113442 A1 * | 5/2011 | Kikkawa | 725/25 |

FOREIGN PATENT DOCUMENTS

| | | |
|---|---|---|
| JP | 2008-288647 | 11/2008 |
| JP | 2008-306232 | 12/2008 |

OTHER PUBLICATIONS

International Search Report issued in International Patent Application No. PCT/JP2010/001010 dated Mar. 30, 2010.
InstaPort Technology Brief, [online], Silicon Image, Inc., Jul. 1, 2008, [retrieved on Mar. 16, 2010], Retrieved from the internet: <URL: http://www.siliconimage.com/docs/InstaPort_Tech_Brief_FINAL_6-1-08.pdf>.

* cited by examiner

*Primary Examiner* — Carl Colin
*Assistant Examiner* — Mohammad A Siddiqi
(74) *Attorney, Agent, or Firm* — McDermott Will & Emery LLP

(57) ABSTRACT

An input processing circuit decodes a digital video signal selected by an input signal selector. Decryption circuits each decrypt the encryption of a video signal output from the input processing circuit, and generate an authentication key of the encryption. A video signal selector selects and outputs one of the video signals output from the decryption circuits, to a monitor. The decryption circuits each include a pseudo-signal generation circuit which extracts information from the video signal, and based on the extracted information, generates a pseudo-video signal.

23 Claims, 37 Drawing Sheets

CK101 CK102 107 101 S101 111 112 V106 113 V102 109 110 Port 0 HDMI PORT 105 106 PSEUDO-SIGNAL GENERATION CIRCUIT HDCP DECRYPTION CIRCUIT 114 MONITOR AUTHENTICATION KEY GENERATION CIRCUIT V103 V104 V105 S102 INPUT PROCESSING CIRCUIT 108 Port 1 HDMI PORT S103 116 V108 117 V101 HDCP DECRYPTION CIRCUIT 102 H101 C102 PSEUDO-SIGNAL GENERATION CIRCUIT AUTHENTICATION KEY GENERATION CIRCUIT 118 K102 CONNECTION DETECTION CIRCUIT V107 115 H102 104 K101 103 C101 INPUT SELECTION CIRCUIT HDMI PORT
Port 0
HDMI PORT
Port 1
INPUT SELECTION CIRCUIT
CONNECTION DETECTION CIRCUIT
INPUT PROCESSING CIRCUIT
PSEUDO-SIGNAL GENERATION CIRCUIT
HDCP DECRYPTION CIRCUIT
AUTHENTICATION KEY GENERATION CIRCUIT
PSEUDO-SIGNAL GENERATION CIRCUIT
HDCP DECRYPTION CIRCUIT
AUTHENTICATION KEY GENERATION CIRCUIT
MONITOR
101
102
103
104
105
106
107
108
109
110
111
112
113
114
115
116
117
118
CK101
CK102
K101
K102
S101
S102
S103
H101
H102
C101
C102
V101
V102
V103
V104
V105
V106
V107
V108

111 (115)
PSEUDO-SIGNAL GENERATION CIRCUIT
TIMING DETECTION CIRCUIT
121
TIMING INFORMATION HOLDING CIRCUIT
122
ENCRYPTION CONTROL INFORMATION HOLDING CIRCUIT
123
VIDEO SIGNAL GENERATION CIRCUIT
124
TM101
TM102
D101
V105 (V107)
CK101 (CK102)
V101
C101

INPUT SELECTION INFORMATION (C101)
CLOCK SIGNAL (CK101)
VSYNC (V101)
CTL (V101)
COUNTER (121)
VSYNC FALL TIME INFORMATION (122)
VSYNC RISE TIME INFORMATION (122)
CTL (123)
COUNTER (124)
VSYNC (V105)
CTL (V105)
Port 0
Port 1
A
m
m+1
n
0
1
t101
t102
t103
t104
t105
t106
t107
t108

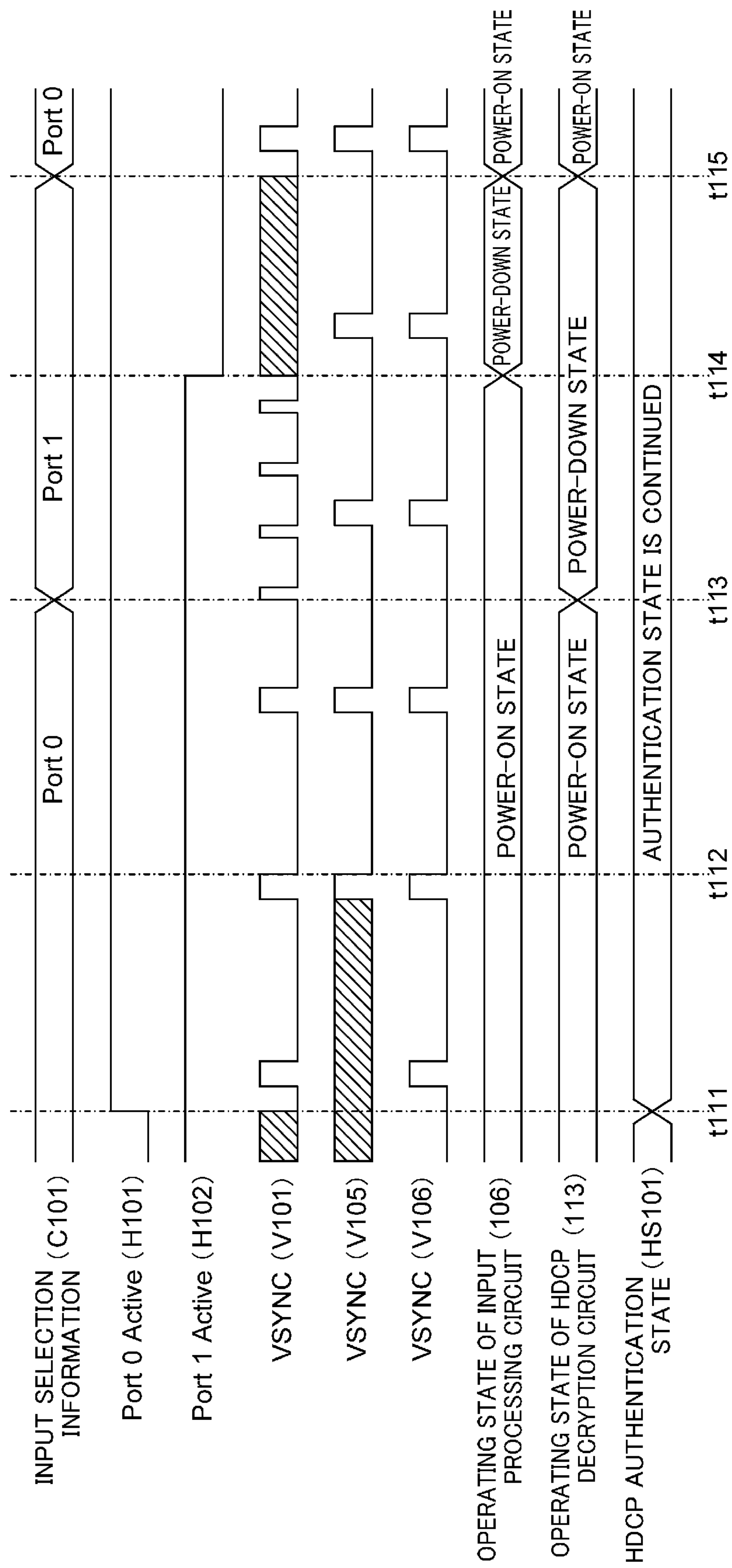
FIG.4
INPUT SELECTION INFORMATION (C101)
Port 0 Active (H101)
Port 1 Active (H102)
VSYNC (V101)
VSYNC (V105)
VSYNC (V106)
OPERATING STATE OF INPUT PROCESSING CIRCUIT (106)
OPERATING STATE OF HDCP DECRYPTION CIRCUIT (113)
HDCP AUTHENTICATION STATE (HS101)
Port 0
Port 1
Port 0
POWER-ON STATE
POWER-DOWN STATE
POWER-ON STATE
POWER-ON STATE
POWER-ON STATE
POWER-DOWN STATE
POWER-ON STATE
POWER-ON STATE
AUTHENTICATION STATE IS CONTINUED
t111
t112
t113
t114
t115

131
OSCILLATOR
CK131
Port 0
101
HDMI PORT
CK101
H101
S101
Port 1
102
HDMI PORT
CK102
H102
S102
K102
103
INPUT SELECTION CIRCUIT
105
S103
106
INPUT PROCESSING CIRCUIT
K101
V101
107
111
PSEUDO-SIGNAL GENERATION CIRCUIT
V105
112
V106
113
HDCP DECRYPTION CIRCUIT
114
AUTHENTICATION KEY GENERATION CIRCUIT
V102
108
115
PSEUDO-SIGNAL GENERATION CIRCUIT
V107
116
V108
117
HDCP DECRYPTION CIRCUIT
118
AUTHENTICATION KEY GENERATION CIRCUIT
V103
109
V104
110
MONITOR
C101

INPUT SELECTION INFORMATION (C101)
CLOCK SIGNAL (CK101)
CLOCK SIGNAL (CK131)
VSYNC (V101)
CTL (V101)
COUNTER (121)
VSYNC FALL TIME INFORMATION (122)
VSYNC RISE TIME INFORMATION (122)
CTL (123)
COUNTER (124)
VSYNC (V105)
CTL (V105)
Port 0
Port 1
A
m
n
m+1
0
1
t131
t132
t133
t134
t135
t136
t137
t138

INPUT SELECTION INFORMATION (C101)
Port 0 Active (H101)
Port 1 Active (H102)
VSYNC (V101)
VSYNC (V105)
VSYNC (V106)
HDCP AUTHENTICATION STATE (HS101)
Port 0
Port 1
Port 0
AUTHENTICATION STATE IS CONTINUED
t141
t142
t143
t144

Port 0
Port 1
Port 2
201
202
203
HDMI PORT
HDMI PORT
HDMI PORT
204
OUTPUT VIDEO SELECTION CIRCUIT
205
INPUT SELECTION CIRCUIT
CK201
CK202
CK203
C201
C202
C203
S201
S202
S203
S204
S205
H201
H202
H203
206
207
208
INPUT PROCESSING CIRCUIT
209
INPUT PROCESSING CIRCUIT
210
CONNECTION DETECTION CIRCUIT
V201
V202
V203
V204
V205
V206
211
212
213
HDCP PROCESSING CIRCUIT
HDCP PROCESSING CIRCUIT
HDCP PROCESSING CIRCUIT
K201
K202
K203
214
215
MONITOR HDCP PROCESSING CIRCUIT
211 / 212 / 213
221
HDCP DECRYPTION CIRCUIT
224
AUTHENTICATION KEY GENERATION CIRCUIT
225
V203 / V204 / V205
K201 / K202 / K203
V214
223
222
V213
V212
VIDEO SIGNAL GENERATION CIRCUIT
230
TM212
TIMING INFORMATION HOLDING CIRCUIT
228
D211
TM211
TIMING DETECTION CIRCUIT
227
ENCRYPTION CONTROL INFORMATION HOLDING CIRCUIT
229
V211
226
CK201 / CK202 / CK203
V201
V202
C201
C202

OUTPUT SELECTION INFORMATION (C201)
INPUT SELECTION INFORMATION (C202)
CLOCK SIGNAL (CK201)
VSYNC (V202)
CTL (V202)
COUNTER (227)
VSYNC FALL TIME INFORMATION (228)
VSYNC RISE TIME INFORMATION (228)
CTL (229)
COUNTER (230)
VSYNC (V212)
CTL (V212)
Port 2
Port 0
Port 1
A
0
1
m
m+1
n
t211
t212
t213
t214
t215
t216
t217
t218

OUTPUT SELECTION INFORMATION (C201)
INPUT SELECTION INFORMATION (C202)
VSYNC (V214)
AUTHENTICATION KEY (K201)
STATE OF AUTHENTICATION KEY GENERATION CIRCUIT (225)
Port 0
Port 1
Port 0
Port 2
128 frames
128 frames
128 frames
128 frames
128 frames
128 frames
KEY1
KEY2
KEY3
KEY4
KEY5
KEY6
POWER-ON STATE
POWER-DOWN STATE
POWER-DOWN STATE
POWER-DOWN STATE
POWER-ON STATE
t231
t232
t233
t234

OSCILLATOR
241
CK204
201
CK201
HDMI PORT
Port 0
202
CK202
HDMI PORT
Port 1
203
CK203
HDMI PORT
Port 2
H201
H202
H203
S201
S202
S203
206
207
S204
S205
INPUT PROCESSING CIRCUIT
208
INPUT PROCESSING CIRCUIT
209
V201
V202
HDCP PROCESSING CIRCUIT
211
HDCP PROCESSING CIRCUIT
212
HDCP PROCESSING CIRCUIT
213
V203
V204
V205
V206
214
MONITOR
215
K201
K202
K203
OUTPUT VIDEO SELECTION CIRCUIT
204
C201
C202
INPUT SELECTION CIRCUIT
TIMER
242
205

HDCP PROCESSING CIRCUIT
HDCP DECRYPTION CIRCUIT
224
AUTHENTICATION KEY GENERATION CIRCUIT
225
V203 / V204 / V205
K201 / K202 / K203
211 / 212 / 213
223
V214
222
V213
V212
221
VIDEO SIGNAL GENERATION CIRCUIT
230
TM212
D211
TIMING INFORMATION HOLDING CIRCUIT
228
TM211
TIMING DETECTION CIRCUIT
227
ENCRYPTION CONTROL INFORMATION HOLDING CIRCUIT
229
V211
226
CK204
V201
V202
C201
C202

OUTPUT SELECTION (C201) INFORMATION
INPUT SELECTION (C202) INFORMATION
CLOCK SIGNAL (CK201)
CLOCK SIGNAL (CK204)
VSYNC (V201)
CTL (V201)
COUNTER (227)
VSYNC FALL TIME INFORMATION (228)
VSYNC RISE TIME INFORMATION (228)
CTL (229)
COUNTER (230)
VSYNC (V212)
CTL (V212)
Port 0
Port 1
Port 2
A
m
n
m+1
t241
t242
t243
t244
t245
t246
t247
t248

OUTPUT SELECTION INFORMATION (C201)
INPUT SELECTION INFORMATION (C202)
CLOCK SIGNAL (CK201)
CLOCK SIGNAL (CK204)
VSYNC (V202)
CTL (V202)
COUNTER (227)
VSYNC FALL TIME INFORMATION (228)
VSYNC RISE TIME INFORMATION (228)
CTL (229)
COUNTER (230)
VSYNC (V212)
CTL (V212)
Port 2
Port 0
Port 1
A
m
n
m+1
t251
t252
t253
t254
t255
t256
t257
t258

OUTPUT SELECTION INFORMATION (C201)
INPUT SELECTION INFORMATION (C202)
Port 0 Active (H201)
Port 1 Active (H202)
Port 2 Active (H203)
VSYNC (V201)
VSYNC (V202)
VSYNC (V212)
VSYNC (V214)
HDCP AUTHENTICATION STATE (HS201)
Port 0
Port 1
Port 0
Port 2
AUTHENTICATION STATE IS CONTINUED
t261
t262
t263
t264
t265
t266

Port 0 Active (H201)
Port 1 Active (H202)
Port 2 Active (H203)
TIMER (242)
OUTPUT SELECTION INFORMATION (C201)
INPUT SELECTION INFORMATION (C202)
VSYNC (V201)
VSYNC (V202)
T (ms)
T (ms)
Port 0
Port 1
Port 0
Port 1
Port 2
Port 0
Port 1
Port 2
Port 0
Port 1
t271
t272
t273
t274
t275

POWER CONTROL INFORMATION (C303)
CLOCK SIGNAL (CK301)
VSYNC (V301)
CTL (V301)
COUNTER (321)
VSYNC FALL TIME INFORMATION (322)
VSYNC RISE TIME INFORMATION (322)
CTL (323)
COUNTER (324)
VSYNC (V305)
CTL (V305)
POWER-ON STATE
POWER-DOWN STATE
A
0
1
m
m+1
n
t301
t302
t303
t304
t305
t306
t307
t308

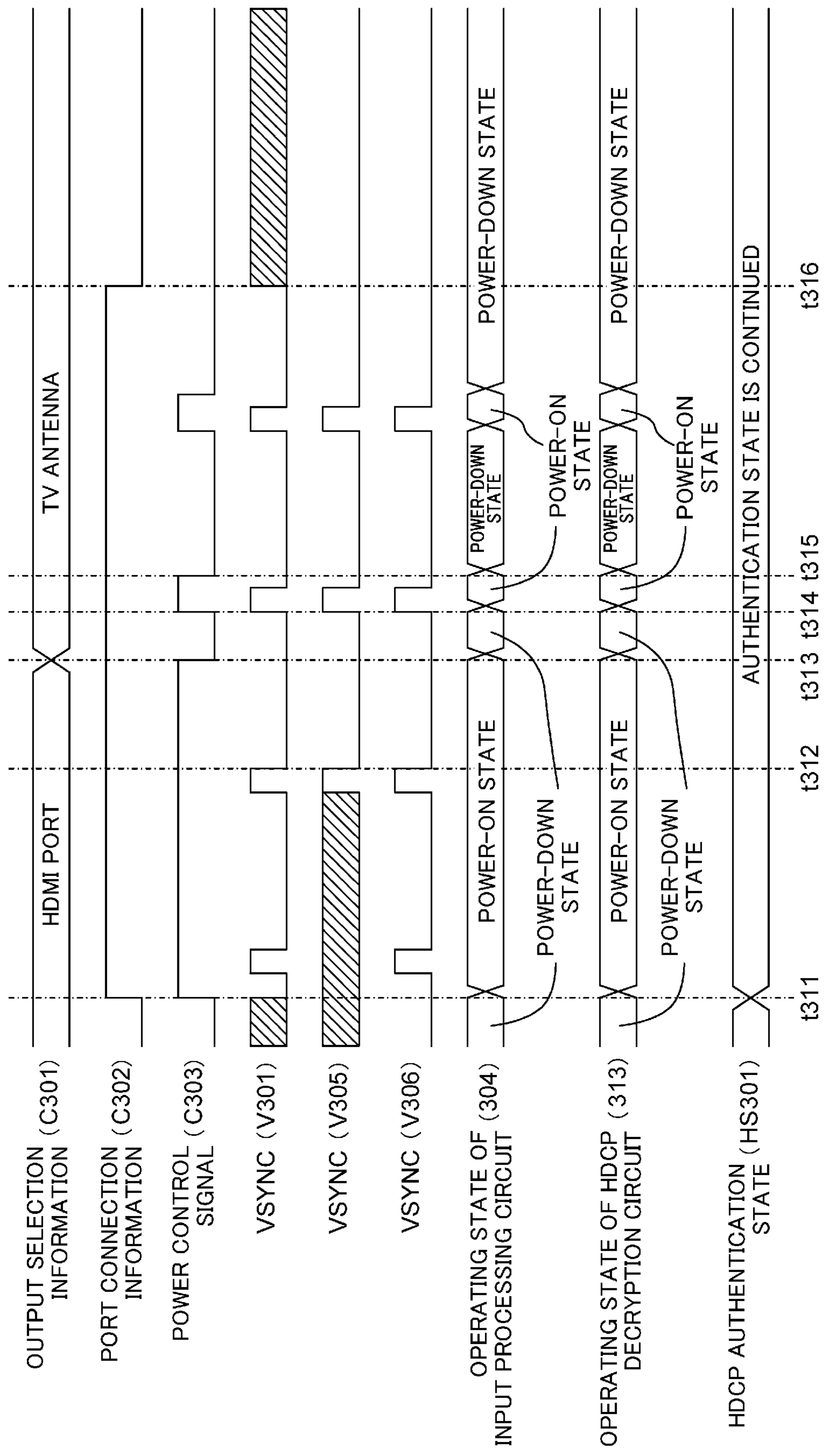
FIG.25
OUTPUT SELECTION INFORMATION (C301)
PORT CONNECTION INFORMATION (C302)
POWER CONTROL SIGNAL (C303)
VSYNC (V301)
VSYNC (V305)
VSYNC (V306)
OPERATING STATE OF INPUT PROCESSING CIRCUIT (304)
OPERATING STATE OF HDCP DECRYPTION CIRCUIT (313)
HDCP AUTHENTICATION STATE (HS301)
HDMI PORT
TV ANTENNA
POWER-ON STATE
POWER-DOWN STATE
POWER-ON STATE
POWER-DOWN STATE
POWER-DOWN STATE
POWER-ON STATE
POWER-DOWN STATE
POWER-DOWN STATE
POWER-ON STATE
POWER-DOWN STATE
POWER-DOWN STATE
POWER-ON STATE
POWER-DOWN STATE
POWER-DOWN STATE
AUTHENTICATION STATE IS CONTINUED
t311
t312
t313
t314
t315
t316

POWER CONTROL (C303) SIGNAL
VSYNC (V306)
AUTHENTICATION KEY (K301)
STATE OF AUTHENTICATION KEY GENERATION CIRCUIT (314)
128 frames
KEY1
KEY2
KEY3
KEY4
KEY5
KEY6
POWER-ON STATE
POWER-DOWN STATE
t321
t322
t323

POWER CONTROL SIGNAL (C303)
CLOCK SIGNAL (CK301)
CLOCK SIGNAL (CK302)
VSYNC (V301)
CTL (V301)
COUNTER (321)
VSYNC FALL TIME INFORMATION (322)
VSYNC RISE TIME INFORMATION (322)
CTL (323)
COUNTER (324)
VSYNC (V305)
CTL (V305)
POWER-ON STATE
POWER-DOWN STATE
A
0
1
m
m+1
n
t331
t332
t333
t334
t335
t336
t337
t338

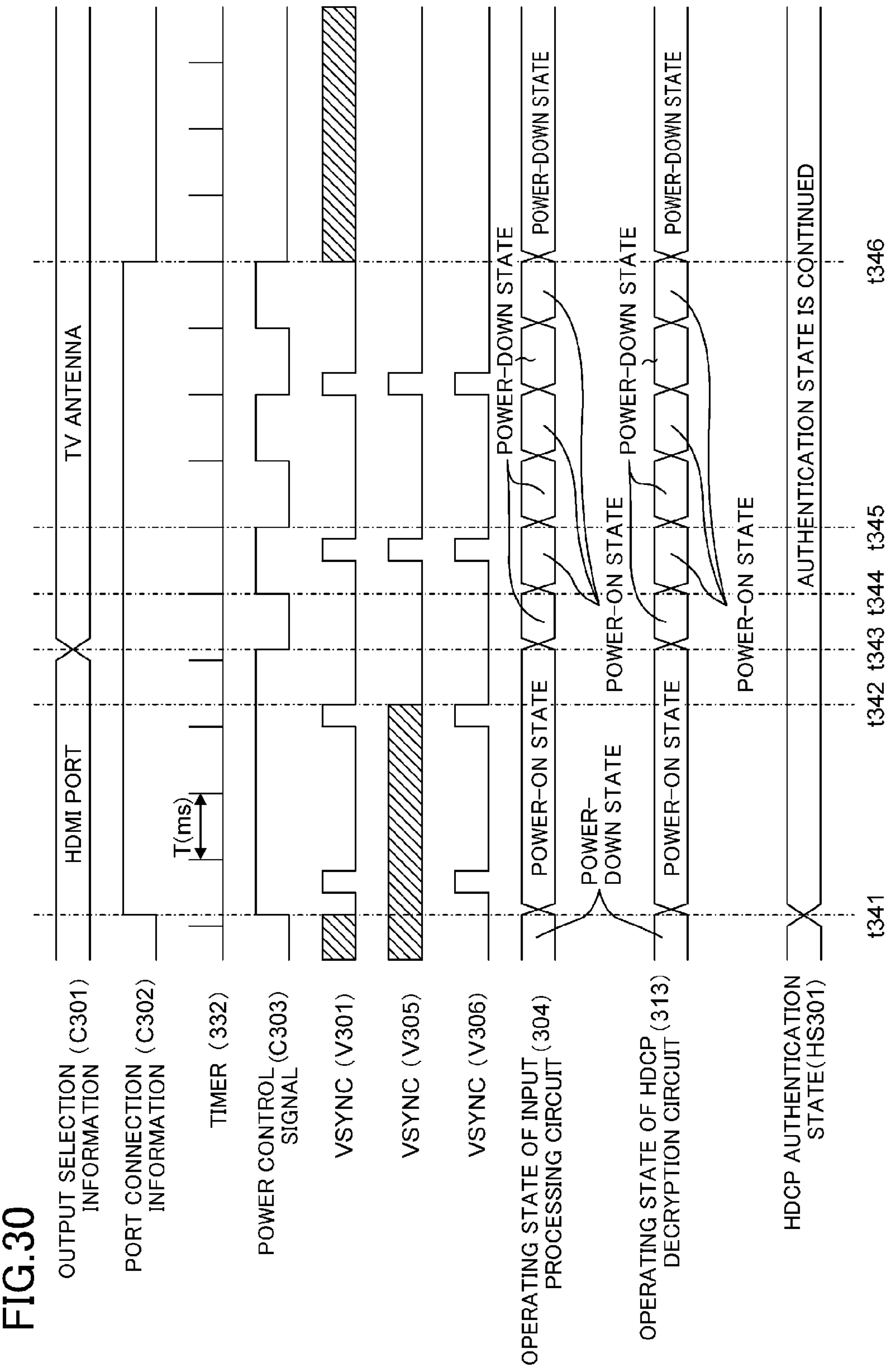
FIG.30
OUTPUT SELECTION INFORMATION (C301)
PORT CONNECTION INFORMATION (C302)
TIMER (332)
POWER CONTROL SIGNAL (C303)
VSYNC (V301)
VSYNC (V305)
VSYNC (V306)
OPERATING STATE OF INPUT PROCESSING CIRCUIT (304)
OPERATING STATE OF HDCP DECRYPTION CIRCUIT (313)
HDCP AUTHENTICATION STATE (HS301)
HDMI PORT
TV ANTENNA
T(ms)
POWER-ON STATE
POWER-DOWN STATE
POWER-ON STATE
POWER-DOWN STATE
POWER-DOWN STATE
POWER-ON STATE
POWER-DOWN STATE
POWER-ON STATE
POWER-DOWN STATE
POWER-DOWN STATE
AUTHENTICATION STATE IS CONTINUED
t341
t342
t343
t344
t345
t346

POWER CONTROL SIGNAL (C303)
VSYNC (V306)
AUTHENTICATION KEY (K301)
STATE OF AUTHENTICATION KEY GENERATION CIRCUIT (314)
128 frames
128 frames
128 frames
128 frames
128 frames
128 frames
KEY1
KEY2
KEY3
KEY4
KEY5
KEY6
POWER-ON STATE
POWER-DOWN STATE
POWER-DOWN STATE
POWER-DOWN STATE
POWER-ON STATE
t351
t352
t353

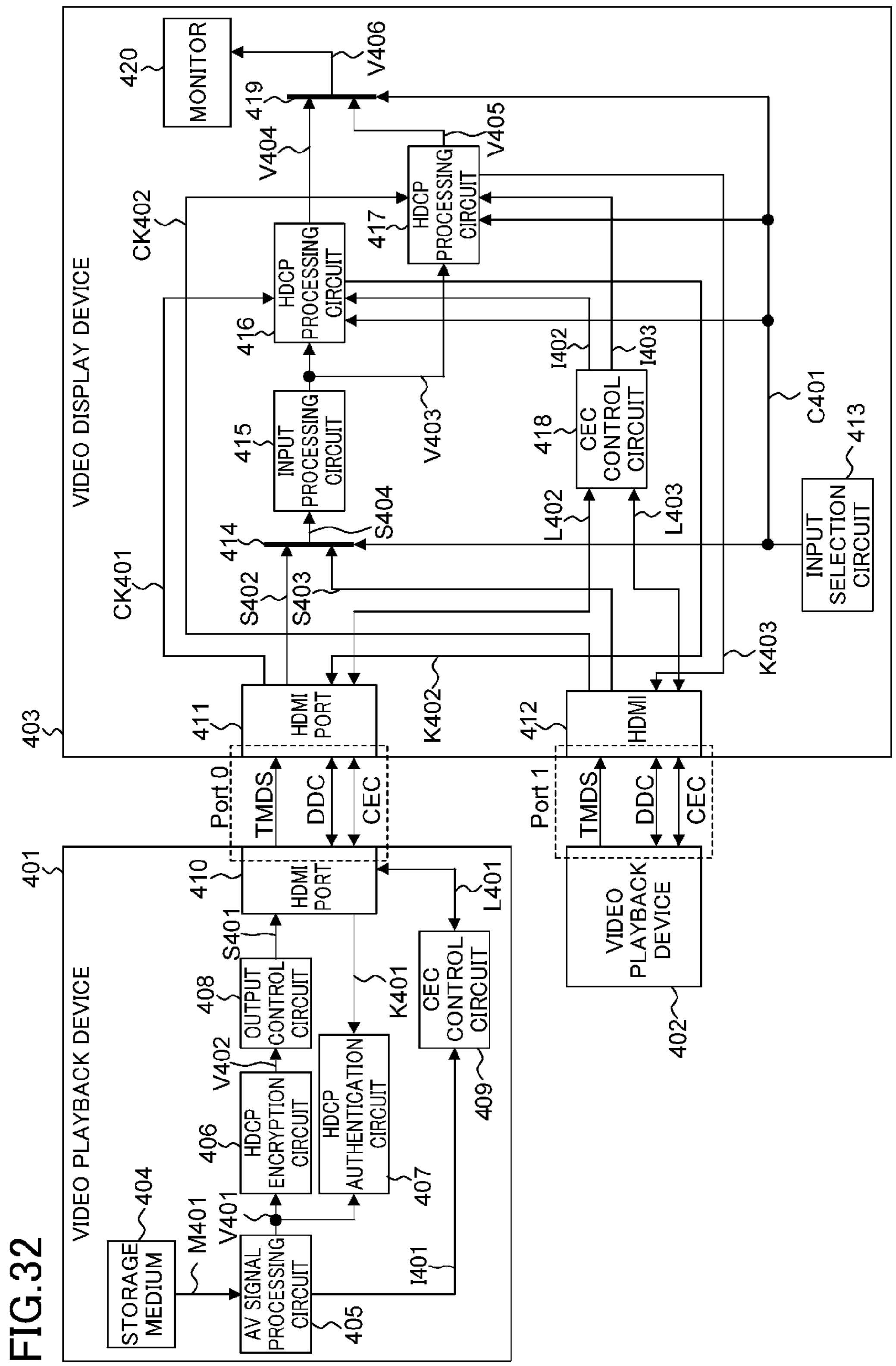
FIG.32
VIDEO PLAYBACK DEVICE
401
STORAGE MEDIUM
404
M401
AV SIGNAL PROCESSING CIRCUIT
405
V401
HDCP ENCRYPTION CIRCUIT
406
V402
HDCP AUTHENTICATION CIRCUIT
407
OUTPUT CONTROL CIRCUIT
408
S401
K401
CEC CONTROL CIRCUIT
409
I401
HDMI PORT
410
L401
Port 0
TMDS
DDC
CEC
Port 1
TMDS
DDC
CEC
VIDEO PLAYBACK DEVICE
402
VIDEO DISPLAY DEVICE
403
HDMI PORT
411
HDMI
412
K402
K403
CK401
CK402
S402
S403
414
S404
INPUT PROCESSING CIRCUIT
415
V403
HDCP PROCESSING CIRCUIT
416
HDCP PROCESSING CIRCUIT
417
CEC CONTROL CIRCUIT
418
L402
L403
I402
I403
INPUT SELECTION CIRCUIT
413
C401
V404
V405
419
V406
MONITOR
420

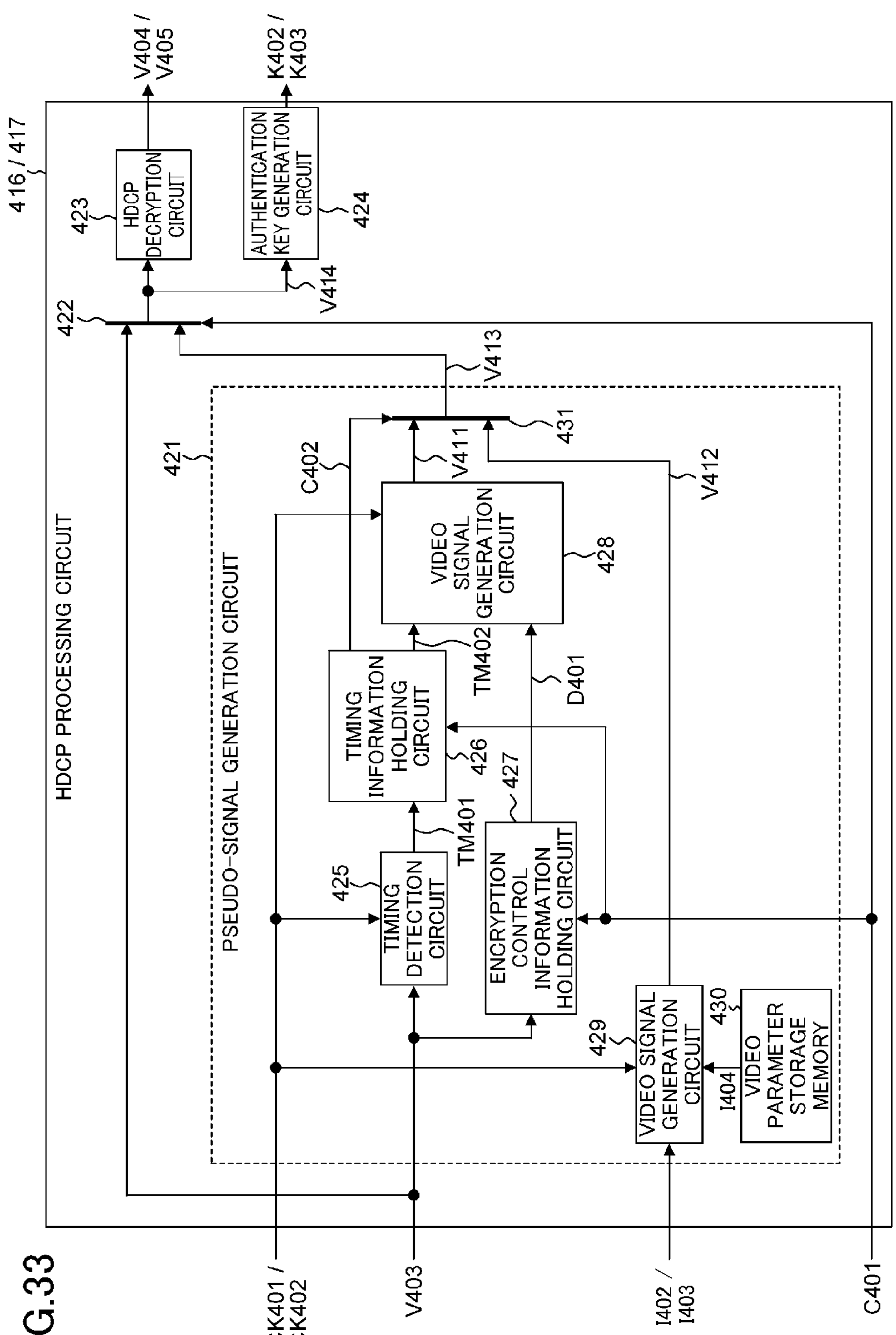
FIG.33
HDCP PROCESSING CIRCUIT
416 / 417
PSEUDO-SIGNAL GENERATION CIRCUIT
421
422
423
HDCP DECRYPTION CIRCUIT
424
AUTHENTICATION KEY GENERATION CIRCUIT
425
TIMING DETECTION CIRCUIT
426
TIMING INFORMATION HOLDING CIRCUIT
427
ENCRYPTION CONTROL INFORMATION HOLDING CIRCUIT
428
VIDEO SIGNAL GENERATION CIRCUIT
429
VIDEO SIGNAL GENERATION CIRCUIT
430
VIDEO PARAMETER STORAGE MEMORY
431
V404 / V405
K402 / K403
V414
V413
V411
V412
C402
TM402
TM401
D401
I404
CK401 / CK402
V403
I402 / I403
C401

INPUT SELECTION INFORMATION (C401)
CLOCK SIGNAL (CK401)
VSYNC (V403)
CTL (V403)
COUNTER (425)
VSYNC FALL TIME INFORMATION (426)
VSYNC RISE TIME INFORMATION (426)
CTL (427)
COUNTER (428)
VSYNC (V411)
CTL (V411)
INFORMATION STORAGE COMPLETION SIGNAL (C402)
Port 0
Port 1
A
m
n
m+1
0
1
t401
t402
t403
t404
t405
t406
t407
t408

INPUT SELECTION INFORMATION (C401)
CEC COMMUNICATION LINE (L402)
VSYNC (V402)
VSYNC FALL TIME INFORMATION (I404)
VSYNC RISE TIME INFORMATION (I404)
COUNTER (429)
VSYNC (V412)
Port 1
A
m
n
0
1
m
m+1
m+2
n
0
1
m
m+1
m+2
t411
t412
t413
t414

VIDEO INPUT DEVICE AND VIDEO DISPLAY SYSTEM

CROSS-REFERENCE TO RELATED APPLICATIONS

This is a continuation of PCT International Application PCT/JP2010/001010 filed on Feb. 17, 2010, which claims priority to Japanese Patent Application No. 2009-189118 filed on Aug. 18, 2009. The disclosures of these applications including the specifications, the drawings, and the claims are hereby incorporated by reference in their entirety.

BACKGROUND

The present disclosure relates to video input devices which receive a plurality of digital video signals, and select and output one of the received digital video signals.

In recent years, the use of video playback apparatuses which have an interface conforming to the high-definition multimedia interface (HDMI) standard, with which uncompressed digital video signals can be transmitted, have grown rapidly. Along with this, the HDMI interface has also been widely used in video receiver apparatuses, such as a television (TV) set etc., which receive digital video signals, and an increasing number of video receiver apparatuses which have two or more HDMI interfaces have become available. In HDMI, high-bandwidth digital content protection (HDCP) for preventing unauthorized copying is employed to allow digital video signals to be transferred only between authenticated apparatuses.

In the video receiver apparatus which has two or more HDMI interfaces, HDMI ports are changed by operating a remote control etc., and video received via a selected HDMI port is displayed on a monitor. In conventional video receiver apparatuses, a video playback apparatus connected to a selected HDMI port is activated by activating the hot plug detect of the HDMI port to receive video, while the hot plug detect of an unselected HDMI port is kept inactive. In other words, when HDMI ports are changed by using a remote control etc., the hot plug detect of a selected port transitions from the inactive state to the active state, and a video playback apparatus connected to the selected port is initialized. Moreover, in the video playback apparatus, an HDCP authentication process is performed before a video signal is output. When HDMI ports are changed, a video playback apparatus connected to a selected HDMI port needs to start over from initialization, and therefore, it takes a long time to output an image when the ports are changed (this time is also hereinafter referred to as a "display waiting time"). Therefore, in order to reduce the display waiting time that it takes to output an image when HDMI ports are changed, it is necessary to remove the initialization of a video playback apparatus. To do this, however, the hot plug detect of an unselected HDMI port needs to be in the active state. However, the conventional video receiver apparatus has only one circuit that performs the HDCP authentication process, and therefore, is allowed to perform the HDCP authentication process only for a selected HDMI port, i.e., is not allowed to perform the HDCP authentication process for an unselected HDMI port. Therefore, even when the hot plug detect of an unselected HDMI port is activated, the HDCP authentication process cannot be performed on the unselected HDMI port. As a result, when HDMI ports are changed, a video playback apparatus connected to a selected HDMI port needs to start over from the HDCP authentication process, and therefore, the display waiting time cannot be reduced.

As a technique of reducing the time that it takes to output an image when HDMI ports for receiving video data are changed, Japanese Patent Publication No. 2008-306232 proposes a video receiver apparatus, for example.

FIG. 37 shows an example configuration of the video receiver apparatus of Japanese Patent Publication No. 2008-306232. The video receiver apparatus of FIG. 37 includes authentication ICs 009 and 010 which are provided for a predetermined number (here, two) of HDMI ports 003 and 004 (one authentication IC for each HDMI port), and perform an authentication process on external apparatuses 001 and 002 connected to the HDMI ports 003 and 004, respectively. An MPU 005 of a digital broadcast receiver includes a terminal selector 014 which selects one HDMI port 003 (004) as a video input terminal based on an operation input received via a remote control 006, a video receiver section 015 which receives video information from the external apparatus 001 (002) connected to the selected HDMI port via the corresponding authentication IC 009 (010), and a display controller 016 which outputs the received video information to a display 008.

A video signal encrypted by HDCP is transferred between the external apparatuses 001 and 002 and the video receiver apparatus of FIG. 37, and the received video signal is input via the authentication ICs 009 and 010. The authentication ICs 009 and 010 are used to perform HDCP authentication on the HDMI ports 003 and 004, respectively. A connection determiner 012 determines whether or not an external apparatus is connected to the HDMI port 003 or 004. When the connection determiner 012 determines that an external apparatus is connected to the HDMI port 003 or 004, the authentication IC 009 or 010 corresponding to the HDMI port 003 or 004 for which the presence of an external apparatus is determined performs an authentication process on the external apparatus. Thus, the authentication process is performed for the HDMI ports separately, whereby the time that it takes to display an image on the monitor can be reduced.

SUMMARY

The above conventional video receiver apparatus can reduce the time that it takes to display an image on the monitor when HDMI ports for displaying are changed.

However, in the video receiver apparatus of Japanese Patent Publication No. 2008-306232, implementation cost and power consumption may increase. In the video receiver apparatus of FIG. 37, video signals input from the HDMI ports 003 and 004 are input to the authentication ICs 009 and 010 which perform an authentication process for the respective HDMI ports, so that the HDCP authentication process is performed on the ports separately. In this case, a digital signal input to the HDMI port 003 (004) is subjected to signal processing, such as serial-to-parallel conversion etc., which conforms to the HDMI standard, whereby a video signal is decoded, in the HDMI port 003 (004). In other words, it is necessary to provide as many circuits which perform a decode process, such as serial-to-parallel conversion etc., as there are HDMI ports (here, two HDMI ports), resulting in a significant increase in implementation cost and power consumption.

The present disclosure describes implementations of a video input device in which the time that it takes to display an image when digital video signals to be displayed are changed, without an increase in implementation cost or power consumption.

A video input device according to a first embodiment of the present disclosure includes a predetermined number of two or more reception interface sections configured to receive a digital signal conforming to a predetermined digital interface standard, the digital signal having been obtained from an encrypted video signal, and selects and decrypts one of the digital signals received via the predetermined number of reception interface sections, and outputs the decrypted signal. The video input device includes an input selection circuit configured to output input selection information for selecting one of the predetermined number of reception interface sections, an input signal selector configured to select and output one of the digital signals input via the predetermined number of reception interface sections, based on the input selection information, an input processing circuit configured to decode the digital signal output from the input signal selector to output a video signal, a plurality of decryption circuits, one decryption circuit for each of the predetermined number of reception interface sections, each configured to decrypt encryption of the video signal output from the input processing circuit and output the decrypted video signal, and generate and send an authentication key of the encryption to the reception interface section, and a video signal selector configured to select and output one of the video signals output from the plurality of decryption circuits, based on the input selection information. The plurality of decryption circuits each include a pseudo-signal generation circuit configured to extract information from the video signal output from the input processing circuit, and based on the extracted information, generate and output a pseudo-video signal, a second video signal selector configured to select and output one of the video signal output from the input processing circuit and the pseudo-video signal output from the pseudo-signal generation circuit, based on the input selection information, an authentication key generation circuit configured to generate and output an authentication key based on the video signal output from the second video signal selector, and a video decryption circuit configured to decrypt encryption of the video signal output from the second video signal selector, and output the decrypted video signal.

According to the first embodiment, the decryption circuit provided for each reception interface section includes the pseudo-signal generation circuit which generates and outputs a pseudo-video signal. Therefore, in a decryption circuit corresponding to a reception interface section which has not been selected by the input selection information, authentication can be continued using the pseudo-video signal. As a result, when the reception interface sections are changed based on the input selection information, it is no longer necessary to perform authentication again, whereby the time that it takes to display video on a monitor can be reduced.

A video input device according to a second embodiment of the present disclosure includes a predetermined number of three or more reception interface sections configured to receive a digital signal conforming to a predetermined digital interface standard, the digital signal having been obtained from an encrypted video signal, and selects and decrypts one of the digital signals received via the predetermined number of reception interface sections, and outputs the decrypted signal. The video input device includes an output video selection circuit configured to output output selection information for selecting one of the predetermined number of reception interface sections, an input selection circuit configured to output input selection information for selecting one of the predetermined number of reception interface sections, a first input signal selector configured to select and output one of the digital signals input via the predetermined number of reception interface sections, based on the output selection information, a second input signal selector configured to select and output one of the digital signals input via the predetermined number of reception interface sections, based on the input selection information, a first input processing circuit configured to decode the digital signal output from the first input signal selector to output a video signal, a second input processing circuit configured to decode the digital signal output from the second input signal selector to output a video signal, a plurality of decryption circuits, one decryption circuit for each of the predetermined number of reception interface sections, each configured to decrypt encryption of the video signal output from the first or second input processing circuit and output the decrypted video signal, and generate and send an authentication key of the encryption to the reception interface section, and a video signal selector configured to select and output one of the video signals output from the plurality of decryption circuits, based on the output selection information. The plurality of decryption circuits each include a pseudo-signal generation circuit configured to extract information from the video signal output from the first or second input processing circuit, and based on the extracted information, generate and output a pseudo-video signal, a second video signal selector configured to select and output one of the video signal output from the second input processing circuit and the pseudo-video signal output from the pseudo-signal generation circuit, based on the input selection information, a third video signal selector configured to select and output one of the video signal output from the first input processing circuit and the video signal output from the second video signal selector, based on the output selection information, an authentication key generation circuit configured to generate and output an authentication key based on the video signal output from the third video signal selector, and a video decryption circuit configured to decrypt encryption of the video signal output from the third video signal selector, and output the decrypted video signal.

According to the second embodiment, each decryption circuit, even when the corresponding reception interface section has not been selected based on the output selection information, but has been selected based on the input selection information, can perform a decryption process on a video signal obtained by decoding a digital signal received by the reception interface section. Also, each decryption circuit, even when the corresponding reception interface section has not been selected based on the output selection information or the input selection information, can continue to perform authentication using a pseudo-video signal generated by the pseudo-signal generation circuit. As a result, when the reception interface sections are changed based on the output selection information, it is no longer necessary to perform authentication again, whereby the time that it takes to display video on a monitor can be reduced.

A video input device according to a third embodiment of the present disclosure includes a reception interface section configured to receive a digital signal conforming to a predetermined digital interface standard, the digital signal having been obtained from an encrypted video signal, and a predetermined number of video signal receivers configured to receive a video signal from a transmission path, and selects and outputs one of the digital signal received via the reception interface section and the video signals received via the predetermined number of video signal receivers. The video input device includes an output selection circuit configured to output output selection information for selecting output video, an input processing circuit configured to decode the digital signal input via the reception interface section to output a video signal, an input power control circuit configured to output power control information for controlling whether or not to cause the input processing circuit to be in a power-down state, a decryption circuit configured to decrypt encryption of the video signal output from the input processing circuit and output the decrypted video signal, and generate and send an authentication key of the encryption to the reception interface section, a received signal processing circuit provided for each of the predetermined number of video signal receivers, and configured to perform signal processing, such as a decoding process or the like, on a received signal to output a video signal, and a video signal selector configured to select and output one of the video signal output from the decryption circuit and the video signal output from the received signal processing circuit, based on the output selection information. The decryption circuit includes a pseudo-signal generation circuit configured to extract information from the video signal output from the input processing circuit, and based on the extracted information, generate and output a pseudo-video signal, a second video signal selector configured to select and output one of the video signal output from the input processing circuit and the pseudo-video signal output from the pseudo-signal generation circuit, based on the output selection information, an authentication key generation circuit configured to generate and output an authentication key based on the video signal output from the second video signal selector, and a video decryption circuit configured to decrypt encryption of the video signal output from the second video signal selector, and output the decrypted video signal.

According to the third embodiment, the decryption circuit provided for the reception interface section includes the pseudo-signal generation circuit which generates and outputs a pseudo-video signal. Therefore, even when a video signal received from a transmission path by a video signal receiver has been selected based on the output selection information, authentication can be continued using the pseudo-video signal in the decryption circuit. As a result, when output video is changed based on the output selection information, and a video signal is generated and output from a digital signal received by the reception interface section, it is no longer necessary to perform authentication again, whereby the time that it takes to display video on a monitor can be reduced.

A video display system according to a fourth embodiment of the present disclosure includes a predetermined number of one or more video playback devices configured to transmit a digital signal conforming to a predetermined digital interface standard, the digital signal having been obtained from an encrypted video signal, and a video display device which includes a predetermined number of reception interface sections configured to receive the digital signals transmitted from the respective ones of the predetermined number of video playback devices, the video display device being configured to select and decrypt one of the digital signals received via the predetermined number of reception interface sections, and output the decrypted digital signal. The video playback devices each include an encryption circuit configured to encrypt a digital video signal, an output control circuit configured to encode the digital video signal output from the encryption circuit in order to output the digital video signal to external circuitry, a transmission interface section configured to output a digital signal to the video display device, receive an authentication key of the video display device, and receive and output control information, an authentication circuit configured to generate an authentication key of encryption based on the digital video signal, and compare the authentication key of encryption with the authentication key of the video display device input via the transmission interface section, to check an authentication state, and a transmission control information communication section configured to receive and output control information via the transmission interface section. The video display device includes a reception control information communication section configured to receive and output control information via the predetermined number of reception interface sections, an input selection circuit configured to output input selection information for selecting one of the predetermined number of reception interface sections, an input signal selector configured to select and output one of the digital signals input via the predetermined number of reception interface sections, based on the input selection information, an input processing circuit configured to decode the digital signal output from the input signal selector to output a video signal, a plurality of decryption circuits, one decryption circuit for each of the predetermined number of reception interface sections, each configured to decrypt encryption of the video signal output from the input processing circuit and output the decrypted video signal, and generate and send an authentication key of the encryption to the reception interface section, and a video signal selector configured to select and output one of the video signals output from the plurality of decryption circuits, based on the input selection information. The plurality of decryption circuits each include a pseudo-signal generation circuit configured to extract information from the video signal output from the input processing circuit, and based on the extracted information, generate and output a pseudo-video signal, a second video signal selector configured to select and output one of the video signal output from the input processing circuit and the pseudo-video signal output from the pseudo-signal generation circuit, based on the input selection information, an authentication key generation circuit configured to generate and output an authentication key based on the video signal output from the second video signal selector, and a video decryption circuit configured to decrypt encryption of the video signal output from the second video signal selector, and output the decrypted video signal. The transmission control information communication section outputs video format information of a video signal to be transmitted. The reception control information communication section outputs the received video format information to the plurality of decryption circuits. The pseudo-signal generation circuit in each of the plurality of decryption circuits generates the pseudo-video signal based on the video format information.

According to the fourth embodiment, in the video display device, the decryption circuit provided for the reception interface section includes the pseudo-signal generation circuit which generates and outputs a pseudo-video signal. Therefore, in a decryption circuit corresponding to a reception interface section which has not been selected based on the input selection information, authentication can be continued using the pseudo-video signal. As a result, when the reception interface sections are changed based on the input selection information, it is no longer necessary to perform authentication again, whereby the time that it takes to display video on a monitor can be reduced.

According to the present disclosure, a low-cost and low-power consumption configuration can be used to reduce the time that it takes to display an image when one of a plurality of digital video signals etc. is selected and output to external circuitry.

BRIEF DESCRIPTION OF THE DRAWINGS

FIG. 4 is a timing chart for describing state transitions of each constituent circuit which occur when HDMI ports for displaying are changed, in the video input device of the first embodiment.

FIG. 25 is a timing chart for describing state transitions of each constituent circuit which occur when HDMI ports for displaying are changed, in the video input device of the fifth embodiment.

FIG. 30 is a timing chart for describing state transitions of each constituent circuit which occur when HDMI ports for displaying are changed, in the video input device of the sixth embodiment.

FIG. 32 is a block diagram showing an example configuration of a video display system according to a seventh embodiment.

FIG. 33 is a block diagram showing an example configuration of an HDCP processing circuit in a video display device of the video display system of the seventh embodiment.

DETAILED DESCRIPTION

Embodiments of the present disclosure will be described hereinafter with reference to the accompanying drawings.

First Embodiment

Figure 1:
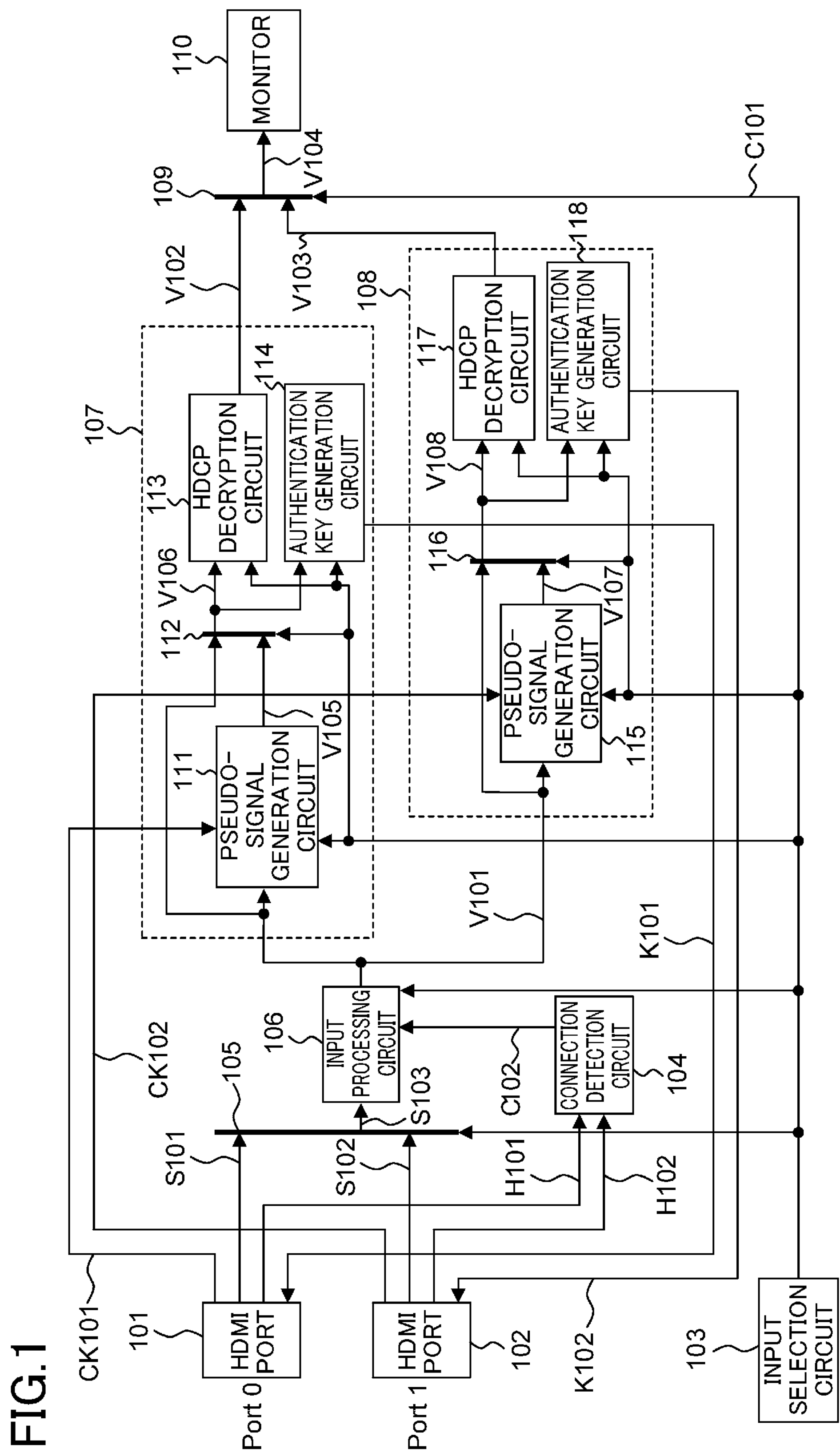
FIG. 1 is a block diagram showing an example configuration of a video input device according to a first embodiment.

FIG. 1 shows an example configuration of a video input device according to a first embodiment. In FIG. 1, the video input device includes HDMI ports (reception interface sections) 101 and 102, an input selection circuit 103, a connection detection circuit 104, an input signal selector 105, an input processing circuit 106, HDCP processing circuits (decryption circuits) 107 and 108, a video signal selector 109, and a monitor 110. The HDCP processing circuit 107 (108) includes a pseudo-signal generation circuit 111 (115), a video signal selector 112 (116), an HDCP decryption circuit (video decryption circuit) 113 (117), and an authentication key generation circuit 114 (118).

The HDMI ports 101 and 102 are used to connect to an external apparatus via an HDMI cable, and receive a digital video signal, and write or read HDCP-related information (including an authentication key) to and from the external apparatus. The digital signal received from the HDMI port 101 (102) is output as a digital signal S101 (S102), and a clock signal contained in the received digital signal is output as a clock signal CK101 (CK102). The input selection circuit 103 outputs input selection information C101 for selecting one of the video signals received from the HDMI ports 101 and 102. The input signal selector 105 selects one of the digital signals S101 and S102 received from the HDMI ports 101 and 102, based on the input selection information C101, and outputs the selected signal as a digital signal S103. The connection detection circuit 104 receives signals H101 and H102 which indicate whether or not an external apparatus is connected to the HDMI ports 101 and 102, respectively, detects the connection states of the HDMI ports 101 and 102, and outputs port connection information C102.

The input processing circuit 106 performs a serial-to-parallel conversion process conforming to the HDMI standard on the input digital signal S103 to output a video signal V101. The input processing circuit 106 can transition to the power-down state, depending on the states of the port connection information C102 and the input selection information C101. The HDCP processing circuit 107 (108) decrypts the encryption of the video signal V101 to output a video signal V102 (V103), and generates and outputs an authentication key K101 (K102) required for HDCP authentication. The video signal selector 109 selects one of the video signals V102 and V103 which have been output by the HDCP processing circuits 107 and 108 decrypting the encryption of the video signal V101, based on the input selection information C101, and outputs the selected signal as a video signal V104. The monitor 110 displays the input video signal V104.

Next, the internal circuitry of the HDCP processing circuit 107 (108) will be described. The pseudo-signal generation circuit 111 (115) generates and outputs a pseudo-video signal V105 (V107) based on the video signal V101 and the clock signal CK101 (CK102) received from the HDMI port 101 (102). The video signal selector 112 (116), when the input selection information C101 indicates the corresponding port, selects the video signal V101, and otherwise, selects the pseudo-video signal V105 (V107) output from the pseudo-signal generation circuit 111 (115). In other words, the video signal selector 112 selects the video signal V101 when the input selection information C101 indicates the HDMI port 101 (Port 0) and the pseudo-video signal V105 when the input selection information C101 indicates the HDMI port 102 (Port 1), and outputs the selected signal as a video signal V106. The video signal selector 116 selects the video signal V101 when the input selection information C101 indicates Port 1 and the pseudo-video signal V107 when the input selection information C101 indicates Port 0, and outputs the selected signal as a video signal V108.

The HDCP decryption circuit 113 (117) decrypts the encryption of the video signal V106 (V108), and outputs the decryption result as the video signal V102 (V103). The authentication key generation circuit 114 (118) generates and outputs the authentication key K101 (K102) based on the video signal V106 (V108).

The HDCP decryption circuit 113 (117) is allowed to transition to the power-down state when the input selection information C101 indicates Port 1 (Port 0) and to the power-on state when the input selection information C101 indicates Port 0 (Port 1). The authentication key generation circuit 114 (118) is allowed to transition to the power-down state or the power-on state, depending on the timing of the video signal V106 (V108), when the input selection information C101 indicates Port 1 (Port 0).

Figure 2:
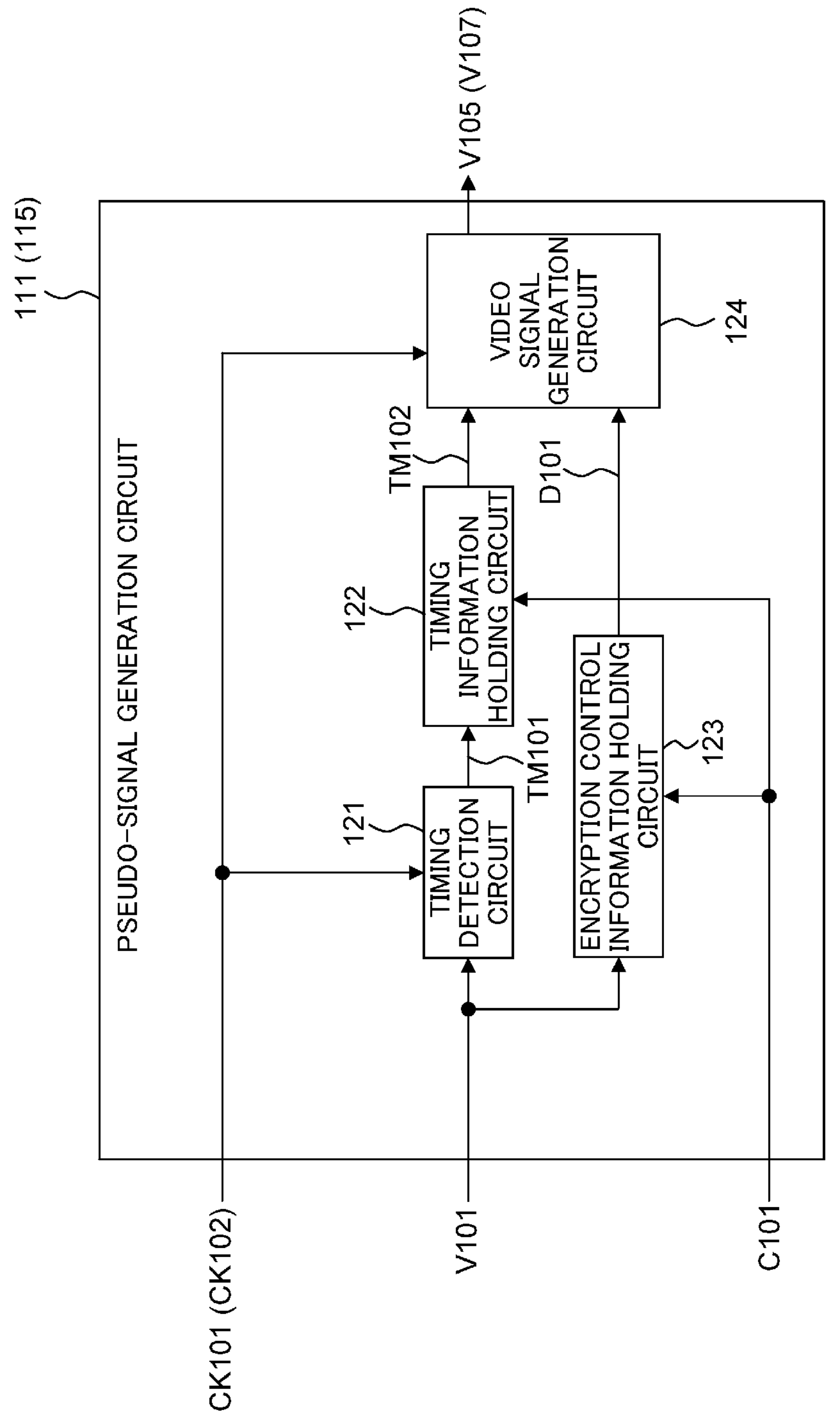
FIG. 2 is a block diagram showing an example configuration of a pseudo-signal generation circuit in the video input device of the first embodiment.

FIG. 2 shows an example configuration of the pseudo-signal generation circuit 111 (115) of FIG. 1. The pseudo-signal generation circuit 111 (115) includes a timing detection circuit 121, a timing information holding circuit 122, an encryption control information holding circuit 123, and a video signal generation circuit 124.

The timing detection circuit 121 detects an operation timing of the video signal V101 based on the clock signal CK101 (CK102) to output timing information TM101. Here, the timing information TM101 includes VSYNC rise time information indicating a time when a vertical synchronization signal (hereinafter abbreviated to VSYNC) contained in the video signal V101 rises, and VSYNC fall time information indicating a time when VSYNC falls. The timing information holding circuit 122 holds the timing information TM101 based on the input selection information C101, and outputs the timing information TM101 as timing information TM102. The encryption control information holding circuit 123 holds encryption control information (CTL) contained in the video signal V101 based on the input selection information C101, and outputs the encryption control information (CTL) as encryption control information D101. The video signal generation circuit 124 generates a video signal based on the clock signal CK101 (CK102), the timing information TM101, and the encryption control information D101, and outputs the video signal as the pseudo-video signal V105 (V107).

The timing information holding circuit 122 and the encryption control information holding circuit 123, when the input selection information C101 indicates the corresponding port, update the held information based on input information, and otherwise, continue to hold the held information without any change. Specifically, the timing information holding circuit 122 and the encryption control information holding circuit 123 in the pseudo-signal generation circuit 111 (115), when the input selection information C101 indicates Port 0 (Port 1), hold input information, and when the input selection information C101 indicates Port 1 (Port 0), continue to hold the information which has been held when the input selection information C101 has indicated Port 0 (Port 1).

Figure 3:
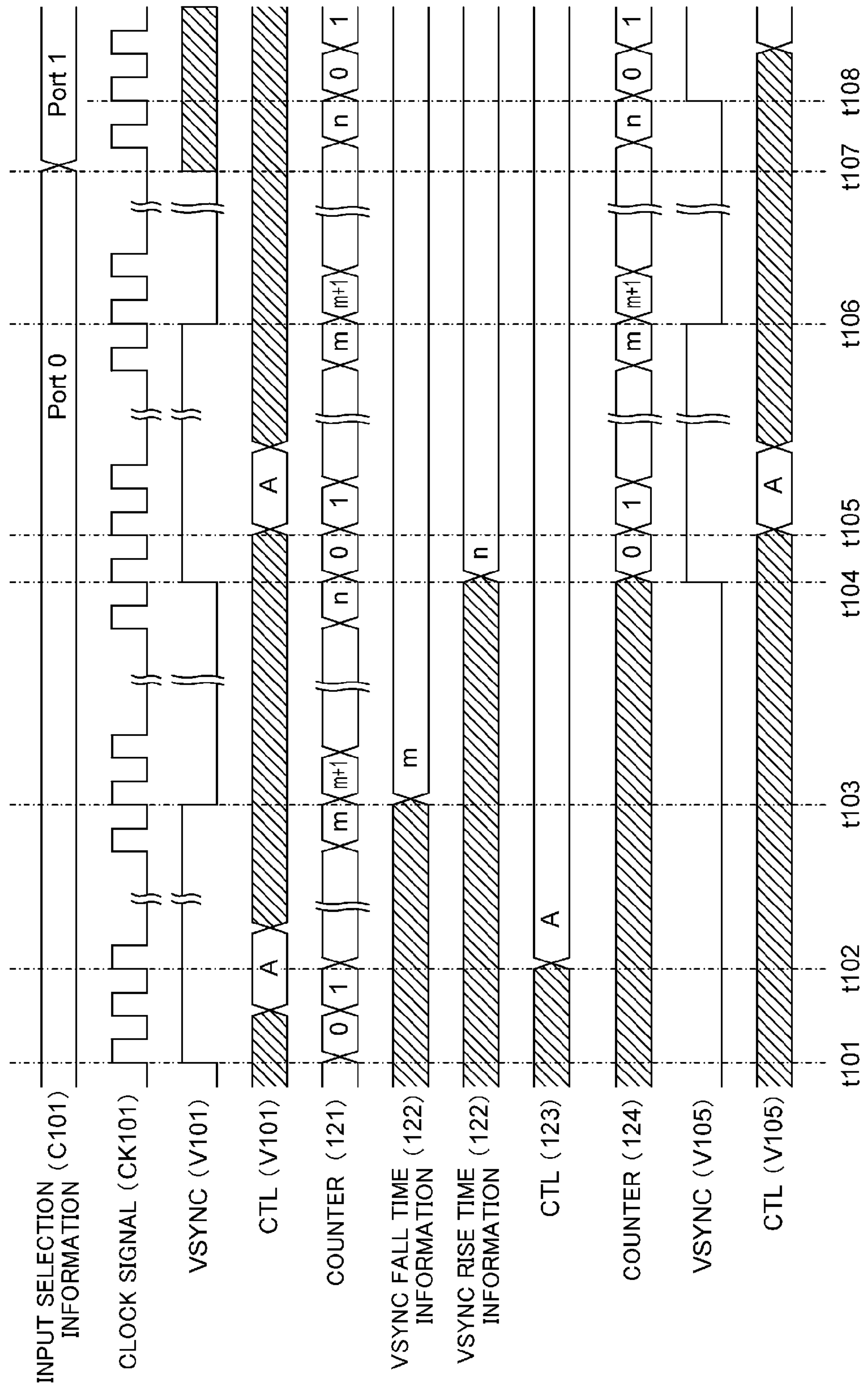
FIG. 3 is a timing chart for describing operation of the pseudo-signal generation circuit in the video input device of the first embodiment.

FIG. 3 is a timing chart for describing operation of the pseudo-signal generation circuit 111. Note that operation of the pseudo-signal generation circuit 115 is similar to this.

When the input selection information C101 indicates Port 0, then if the timing detection circuit 121 receives the video signal V101, the timing detection circuit 121 detects the timing of VSYNC contained in the video signal V101 in synchronization with the clock signal CK101. At time t101, VSYNC rises, and the timing detection circuit 121 activates an internal counter to start timing detection. At time t102, CTL which is encryption control information contained in the video signal V101 is set to an arbitrary value "A," and the encryption control information holding circuit 123 captures and holds the value "A" indicated by CTL. The value of CTL is captured with timing which is previously determined relative to VSYNC. Next, at time t103, VSYNC falls, and a value "m" indicated by the internal counter of the timing detection circuit 121 at this time is output as the timing information TM101, and is held as VSYNC fall time information in the timing information holding circuit 122. At time t104, VSYNC rises, and a value "n" indicated by the internal counter of the timing detection circuit 121 at this time is output as the timing information TM101, and is held as VSYNC rise time information in the timing information holding circuit 122. Also, at this time, the value of the internal counter of the timing detection circuit 121 is cleared to "0" in synchronization with the rise of VSYNC contained in the video signal V101.

The video signal generation circuit 124 generates the pseudo-video signal V105 based on the timing information TM102 (containing the VSYNC fall time information and the VSYNC rise time information) held in the timing information holding circuit 122, the encryption control information (CTL) held in the encryption control information holding circuit 123, and the clock signal CK101. At time t104, the VSYNC rise time information is output, so that all information items required for generation of the pseudo-video signal V105 have been obtained, and therefore, the video signal generation circuit 124 activates the internal counter to start generating the pseudo-video signal V105 in synchronization with the clock signal CK101. At time t105, the video signal generation circuit 124 outputs a value indicated by the encryption control information D101 (CTL) as CTL contained in the pseudo-video signal V105. The output timing of CTL is previously determined relative to VSYNC contained in the pseudo-video signal V105. At time t106, the counter value of the video signal generation circuit 124 is equal to the VSYNC fall time information contained in the timing information TM102, and therefore, VSYNC contained in the pseudo-video signal V105 falls. At time t108, the counter value of the video signal generation circuit 124 is equal to the VSYNC rise time information contained in the timing information TM102, and therefore, VSYNC contained in the pseudo-video signal V105 rises. At time t107, the input selection information C101 changes from Port 0 to Port 1, and therefore, after time t107, the information held in the timing information holding circuit 122 and the information held in the encryption control information holding circuit 123 continue to be held without any change. Therefore, even after time t107, the pseudo-signal generation circuit 111 continues to generate the pseudo-video signal V105 which operates with predetermined timing.

FIG. 4 is a timing chart for describing state transitions of each constituent circuit which occur when the HDMI ports for outputting a signal to the monitor are changed. Here, as an example, the HDCP authentication state of the HDMI port 101 will be described.

In FIG. 4, initially, the input selection information C101 indicates "Port 0." At time t111, an external apparatus is connected to the HDMI port 101, and the signal H101 which indicates the connection state of the HDMI port 101 is set to "1," and a digital signal is input from the external apparatus via the HDMI port 101. Because the input selection information C101 indicates "Port 0," the input signal selector 105 selects and outputs the digital signal S101 output from the HDMI port 101, as the digital signal S103. The HDCP processing circuit 107 receives the video signal V101 which has been obtained by serial-to-parallel conversion in the input processing circuit 106. The encryption of the input video signal V101 is decrypted by the HDCP processing circuit 107, and the resulting signal is output as the video signal V102. Because the input selection information C101 indicates "Port 0," the video signal selector 109 selects and outputs the video signal V102 as the video signal V104 to the monitor 110. At time t111, an HDCP authentication operation is started, and the authentication key K101 generated by the authentication key generation circuit 114 starts to be output. After time till, the authentication state is continued while the authentication key K101 is being updated based on VSYNC contained in the video signal V106.

At time t112, the pseudo-signal generation circuit 111 starts outputting the pseudo-video signal V105. At time t113, the input selection information C101 changes from "Port 0" to "Port 1." Because the input selection information C101 is set to "Port 1," the input signal selector 105 selects and outputs the digital signal S102 output by the HDMI port 102 as the digital signal S103. Therefore, VSYNC contained in the video signal V101 output from the input processing circuit 106 has a changed period after time t113. However, because the input selection information C101 is set to "Port 1," the video signal selector 112 outputs the pseudo-video signal V105 as the video signal V106, and therefore, even after time t113, the period of VSYNC of the video signal V106 does not change, i.e., is maintained. As a result, even after time t113 when the input selection information C101 is changed, HDCP authentication can be continued. Because the input selection information C101 is set to "Port 1," the HDCP decryption circuit 113 transitions to the power-down state. Also, after time t113, because the input selection information C101 indicates "Port 1," the input signal selector 105 and the video signal selector 109 are set to Port 1. As a result, a video signal received from the HDMI port 102 (Port 1) is output to the monitor 110.

At time t114, the external apparatus is disconnected from the HDMI port 102, the signal H102 is set to "0," and the digital signal S102 is stopped. The input processing circuit 106 finds that the input selection information C101 indicates "Port 1" and, based on the port connection information C102, that the HDMI port 102 is not connected, and therefore, transitions to the power-down state. At time t115, the input selection information C101 is set back to "Port 0," so that the input signal selector 105 selects and outputs the digital signal S101 as the digital signal S103. The input processing circuit 106 performs serial-to-parallel conversion on the digital signal S103 to output the video signal V101, and the video signal selector 112 selects and outputs the video signal V101 as the video signal V106. As a result, the period of VSYNC is not changed, and the HDCP authentication state is continued.

Also, at time t115, because the input selection information C101 is set back to "Port 0," the input processing circuit 106 finds that the input selection information C101 indicates "Port 0" and, based on the port connection information C102, that the HDMI port 101 is connected, and therefore, transitions to the power-on state. Because the input selection information C101 is set to "Port 0," the HDCP decryption circuit 113 transitions to the power-on state.

Thus, according to this embodiment, the pseudo-signal generation circuit 111 generates the pseudo-video signal, and therefore, even when the input selection information C101 is changed to indicate "Port 1," HDCP authentication is continued for the HDMI port 101 (Port 0). Therefore, it is no longer necessary to perform authentication again when the input selection information C101 is set back to "Port 0," and therefore, the time that it takes to display video on the monitor 110 can be reduced. This holds true for the pseudo-signal generation circuit 115.

Figure 5:
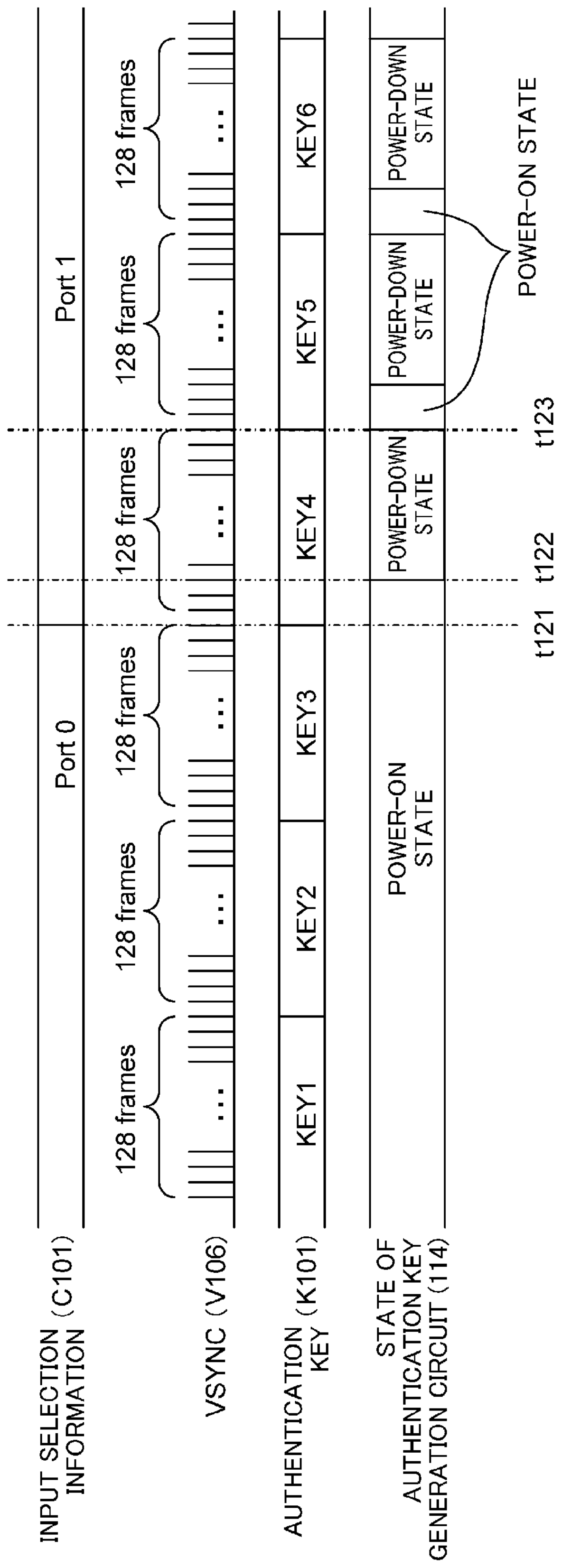
FIG. 5 is a timing chart for describing state transitions of an authentication key generation circuit which occur when HDMI ports for displaying are changed, in the video input device of the first embodiment.

FIG. 5 is a timing chart showing changes in VSYNC contained in the video signal V106, changes in the authentication key K101 generated from the authentication key generation circuit 114, and state transitions of the authentication key generation circuit 114. Here, as an example, operation of the HDCP processing circuit 107 will be described. Operation of the HDCP circuit 108 is similar to that of the HDCP processing circuit 107. The authentication key generation circuit 114 generates an authentication key based on the video signal V106. Specifically, the authentication key is calculated based on VSYNC of the video signal V106, and the calculated authentication key is output as the authentication key K101 every 128 frames while VSYNC contained in the video signal V106 is being counted. While the input selection information C101 indicates "Port 0," the authentication key is calculated in synchronization with VSYNC of the input video signal V106. At time t121 when the input selection information C101 is set to "Port 1," and thereafter, the authentication key generation circuit 114 immediately calculates an authentication key for 128 frames. When the calculation of an authentication key for the 128 frames is ended (at time t122), the authentication key generation circuit 114 transitions to the power-down state. Thereafter, when the number of counts of VSYNC of the video signal V106 reaches 128 frames (at time t123), the authentication key generation circuit 114 transitions back to the power-on state, and outputs the calculated authentication key as the authentication key K101, and starts calculating an authentication key for the next 128 frames. Thus, when the input selection information C101 indicates "Port 1," power consumption can be reduced by operating the authentication key generation circuit 114 intermittently.

Second Embodiment

Figure 6:
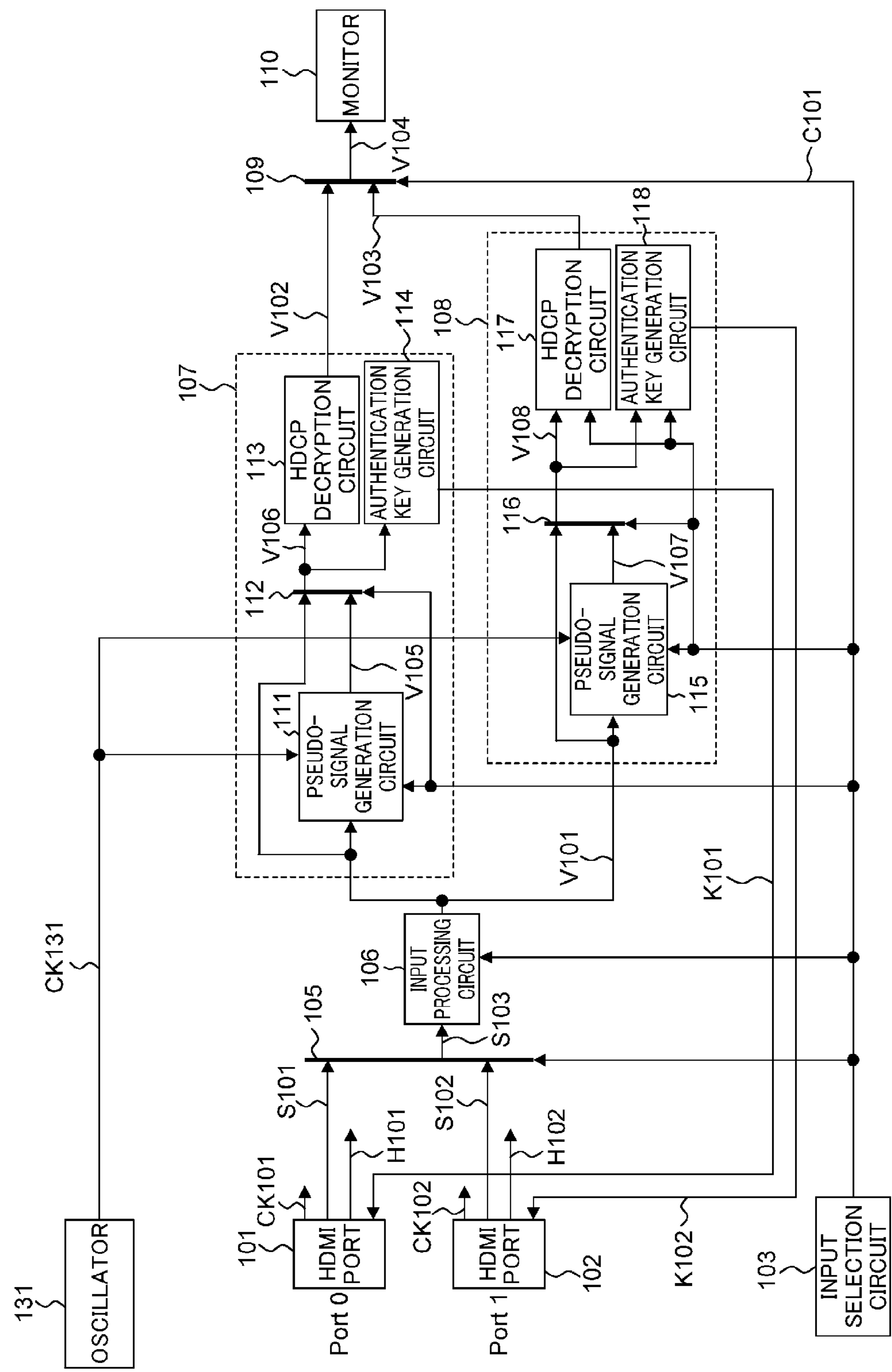
FIG. 6 is a block diagram showing an example configuration of a video input device according to a second embodiment.

FIG. 6 shows an example configuration of a video input device according to a second embodiment. In FIG. 6, the same parts as those of FIG. 1 are indicated by the same reference characters as those of FIG. 1 and will not be described here in detail. The configuration of FIG. 6 is different from that of FIG. 1 in that an oscillator 131 which outputs a clock signal CK131 which oscillates at a predetermined frequency is provided, and the pseudo-signal generation circuit 111 (115) receives the clock signal CK131 instead of the clock signal CK101 (CK102) output from the HDMI port 101 (102). Also, the connection detection circuit 104 is removed.

Figure 7:
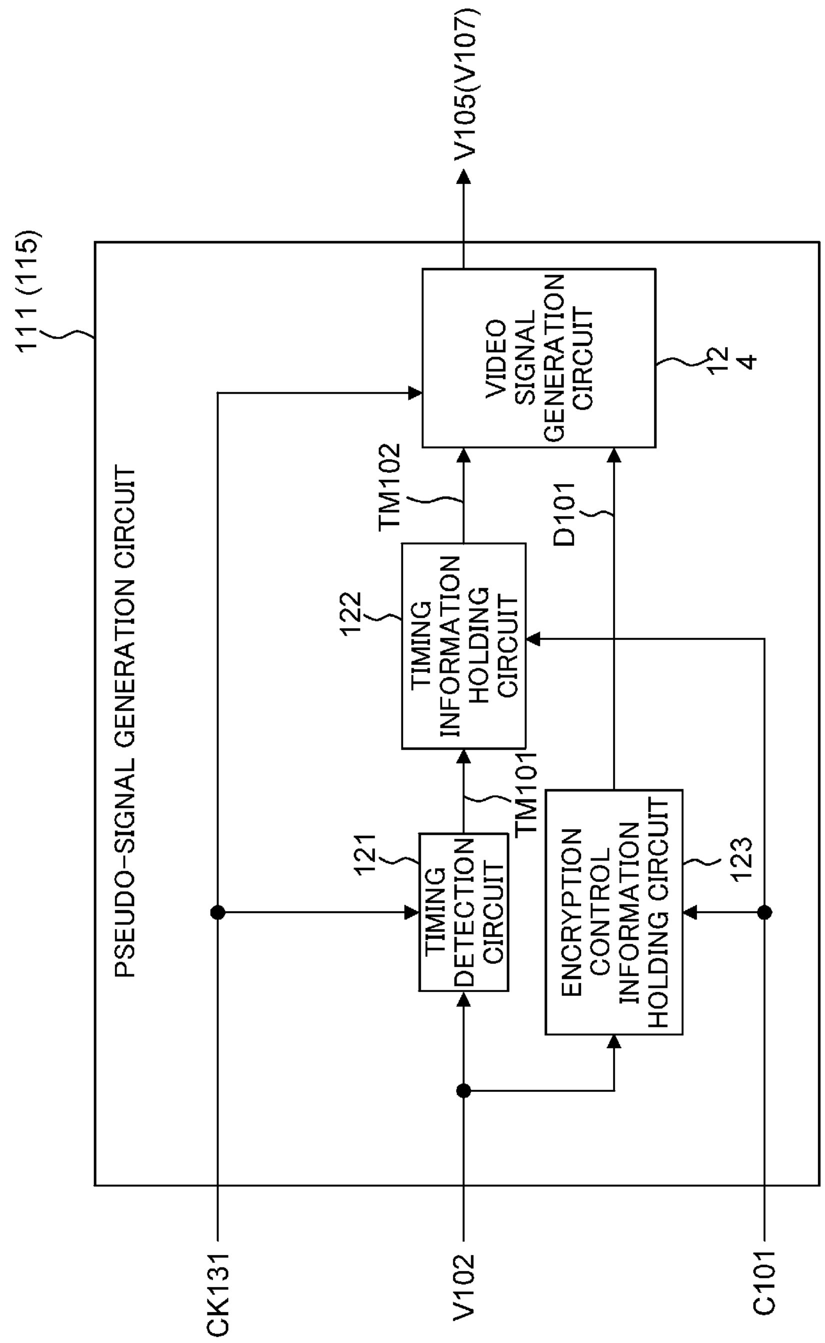
FIG. 7 is a block diagram showing an example configuration of a pseudo-signal generation circuit in the video input device of the second embodiment.

FIG. 7 shows an example configuration of the pseudo-signal generation circuit 111 (115) of FIG. 6. In FIG. 7, the same parts as those of FIG. 2 are indicated by the same reference characters as those of FIG. 2 and will not be described here in detail. The configuration of FIG. 7 is different from that of FIG. 2 in that the clock signal CK131 output from the oscillator 131 is input to the timing detection circuit 121 and the video signal generation circuit 124. The other parts are similar to those of FIG. 2.

Figure 8:
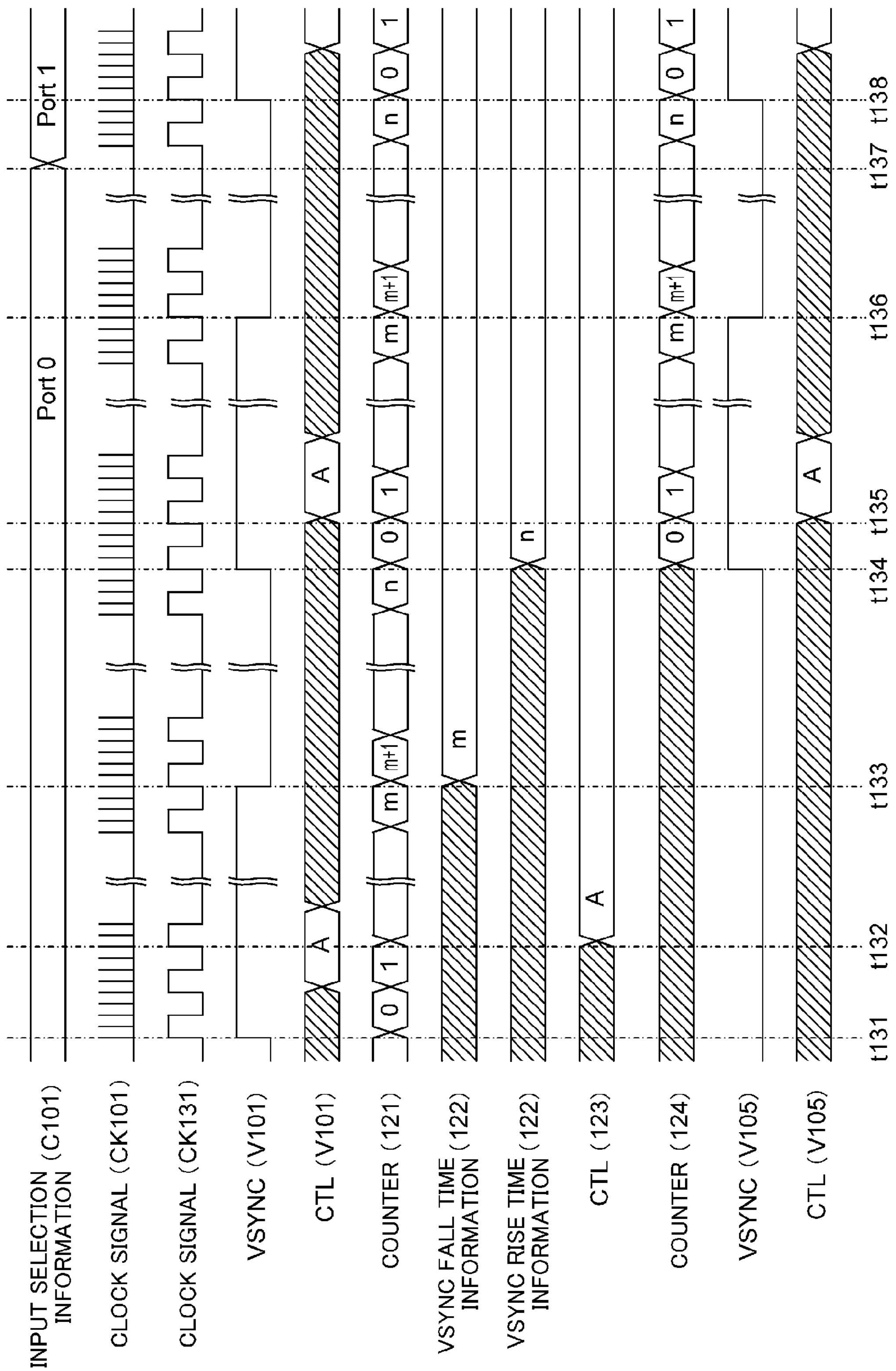
FIG. 8 is a timing chart for describing operation of the pseudo-signal generation circuit in the video input device of the second embodiment.

FIG. 8 is a timing chart for describing operation of the pseudo-signal generation circuit 111. This operation is similar to that of FIG. 3, except that the clock signal CK131 is used, and therefore, will not be described here in detail. Note that operation of the pseudo-signal generation circuit 115 is similar to this.

Figure 9:
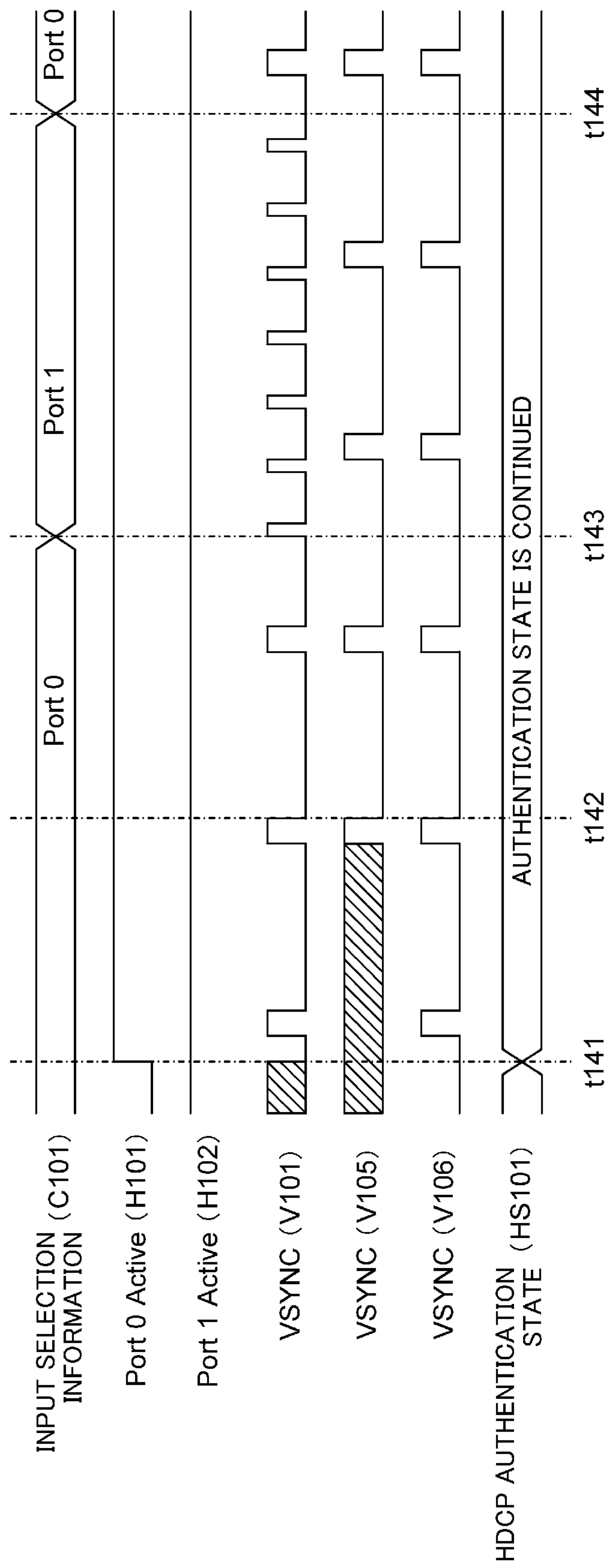
FIG. 9 is a timing chart for describing state transitions of each constituent circuit which occur when HDMI ports for displaying are changed, in the video input device of the second embodiment.

FIG. 9 is a timing chart for describing state transitions of the constituent circuits which occur when HDMI ports through which a signal is output to the monitor are changed. Here, as an example, the HDCP authentication state of the HDMI port 101 will be described.

In FIG. 9, initially, the input selection information C101 indicates "Port 0." At time t141, an external apparatus is connected to the HDMI port 101, and the signal H101 which indicates the connection state of the HDMI port 101 is set to "1," and a digital signal is input from the external apparatus via the HDMI port 101. Because the input selection information C101 indicates "Port 0," the input signal selector 105 selects and outputs the digital signal S101 output from the HDMI port 101, as the digital signal S103. The HDCP processing circuit 107 receives the video signal V101 which has been obtained by serial-to-parallel conversion in the input processing circuit 106. The encryption of the input video signal V101 is decrypted by the HDCP processing circuit 107, and the resulting signal is output as the video signal V102. Because the input selection information C101 indicates "Port 0," the video signal selector 109 selects and outputs the video signal V102 as the video signal V104 to the monitor 110. Also, at time t141, an HDCP authentication operation is started, and the authentication key K101 generated by the authentication key generation circuit 114 starts to be output. After time t141, the authentication state is continued while the authentication key K101 is being updated based on VSYNC contained in the video signal V106.

At time t142, the pseudo-signal generation circuit 111 starts outputting the pseudo-video signal V105. At time t143, the input selection information C101 changes from "Port 0" to "Port 1." Because the input selection information C101 is set to "Port 1," the input signal selector 105 selects and outputs the digital signal S102 output by the HDMI port 102 as the digital signal S103. Therefore, VSYNC contained in the video signal V101 output from the input processing circuit 106 has a changed period after time t143. However, because the input selection information C101 is set to "Port 1," the video signal selector 112 outputs the pseudo-video signal V105 as the video signal V106, and therefore, the period of VSYNC of the video signal V106 does not change, i.e., is maintained after time t143. As a result, after time t143 when the input selection information C101 is changed, HDCP authentication can be continued. Also, after time t143, because the input selection information C101 indicates "Port 1," the input signal selector 105 and the video signal selector 109 are set to Port 1. As a result, a video signal received from the HDMI port 102 (Port 1) is output to the monitor 110.

At time t144, the input selection information C101 is set back to "Port 0," so that the input signal selector 105 selects and outputs the digital signal S101 as the digital signal S103. The input processing circuit 106 performs serial-to-parallel conversion on the digital signal S103 to output the video signal V101, and the video signal selector 112 selects and outputs the video signal V101 as the video signal V106. As a result, the period of VSYNC of the video signal V106 does not change, and the HDCP authentication state is continued.

Thus, according to this embodiment, the pseudo-signal generation circuit 111 generates a pseudo-video signal, whereby even if the input selection information C101 is changed to indicate "Port 1," the HDCP authentication of the HDMI port 101 (Port 0) is continued. Therefore, when the input selection information C101 is set back to "Port 0," it is not necessary to perform authentication again, and therefore, the time that it takes to display video on the monitor 110 can be reduced. This holds true for the pseudo-signal generation circuit 115.

Moreover, in this embodiment, by extending the period of the clock signal CK131 output by the oscillator 131 (reducing the frequency of the clock signal CK131) within an acceptable range, the operating frequencies of the pseudo-signal generation circuits 111 and 115 can be reduced, whereby power consumption can be reduced. This is particularly effective when the frequencies of the clock signals CK101 and CK102 received and output by the HDMI ports 101 and 102 are high.

Third Embodiment

Figure 10:
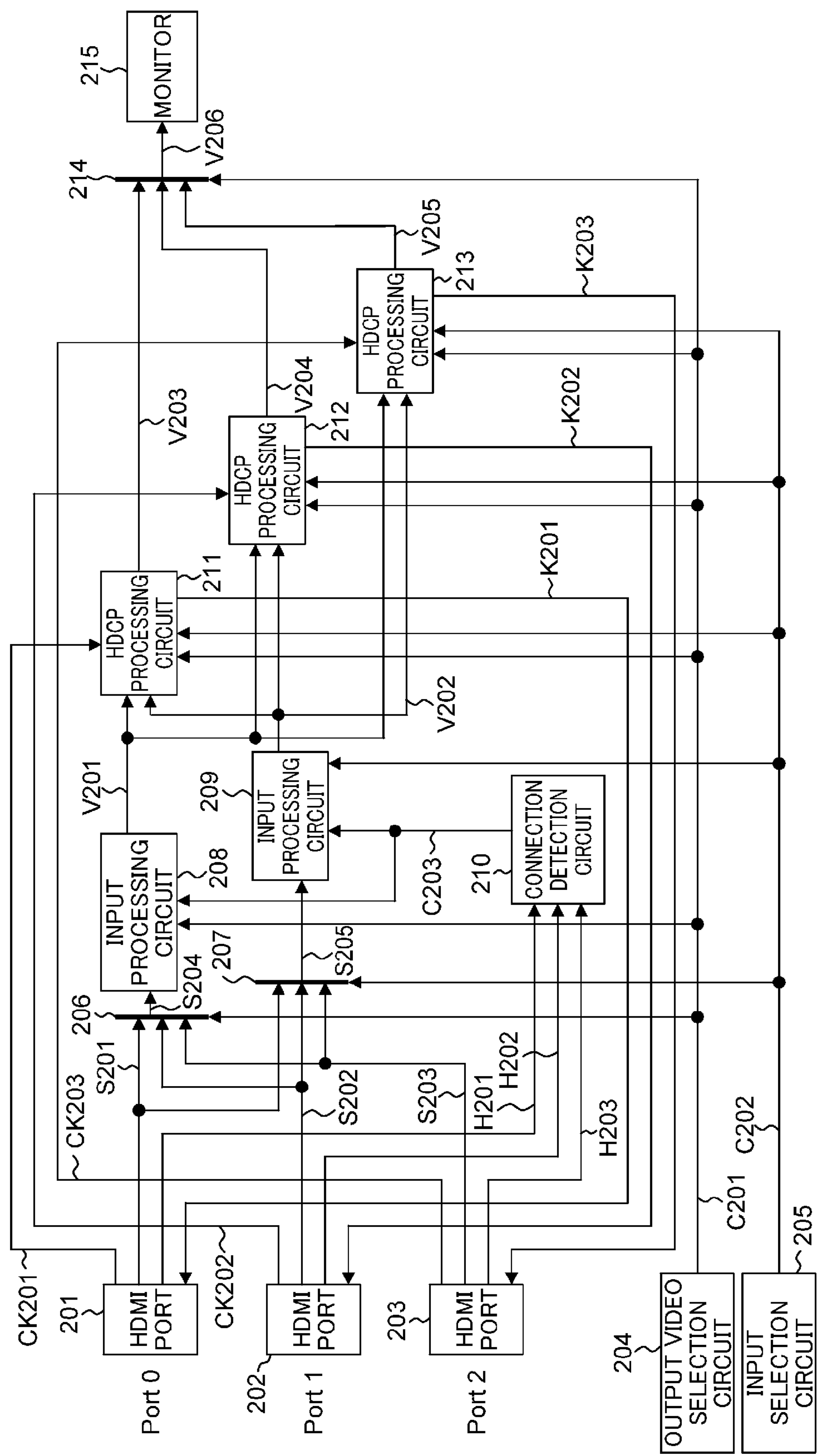
FIG. 10 is a block diagram showing an example configuration of a video input device according to a third embodiment.

FIG. 10 shows an example configuration of a video input device according to a third embodiment. In FIG. 10, the video input device includes HDMI ports (reception interface sections) 201, 202, and 203, an output video selection circuit 204, an input selection circuit 205, a first and a second input signal selector 206 and 207, a first and a second input processing circuit 208 and 209, a connection detection circuit 210, HDCP processing circuits (decryption circuits) 211, 212, and 213, a video signal selector 214, and a monitor 215.

The HDMI ports 201, 202, and 203 are used to connect to an external apparatus via an HDMI cable, and receive a digital video signal, and write or read HDCP-related information (including an authentication key) to and from the external apparatus. The digital signal received from the HDMI port 201 (202, 203) is output as a digital signal S201 (S202, S203), and a clock signal contained in the received digital signal is output as a clock signal CK201 (CK202, CK203). The output video selection circuit 204 outputs output selection information C201 for selecting one of the video signals received from the HDMI ports 201, 202, and 203. The input selection circuit 205 outputs input selection information C202 for selecting one of the video signals received from the HDMI ports 201, 202, and 203. The input signal selector 206 (207) selects one of the digital signals S201, S202, and S203 received from the HDMI ports 201, 202, and 203, based on the output selection information C201 (input selection information C202), and outputs the selected signal as a digital signal S204 (S205). The connection detection circuit 210 receives signals H201, H202, and H203 which indicate whether or not an external apparatus is connected to the HDMI ports 201, 202, and 203, respectively, detects the connection states of the HDMI ports 201, 202, and 203, and outputs port connection information C203.

The input processing circuit 208 (209) performs a serial-to-parallel conversion process conforming to the HDMI standard on the input digital signal S204 (S205), and outputs a video signal V201 (V202). The input processing circuit 208 (209) is allowed to transition to the power-down state, depending on the states of the port connection information C203 and the output selection information C201 (input selection information C202). The HDCP processing circuit 211 (212, 213) decrypts the encryption of the video signals V201 and V202 to output a video signal V203 (V204, V205), and generates and outputs an authentication key K201 (K202, K203) required for HDCP authentication. The video signal selector 214 selects one of the video signals V203, V204, and V205 which have been output by the HDCP processing circuits 211, 212, and 213, based on the output selection information C201, and outputs the selected signal as a video signal V206. The monitor 215 displays the input video signal V206.

Figure 11:
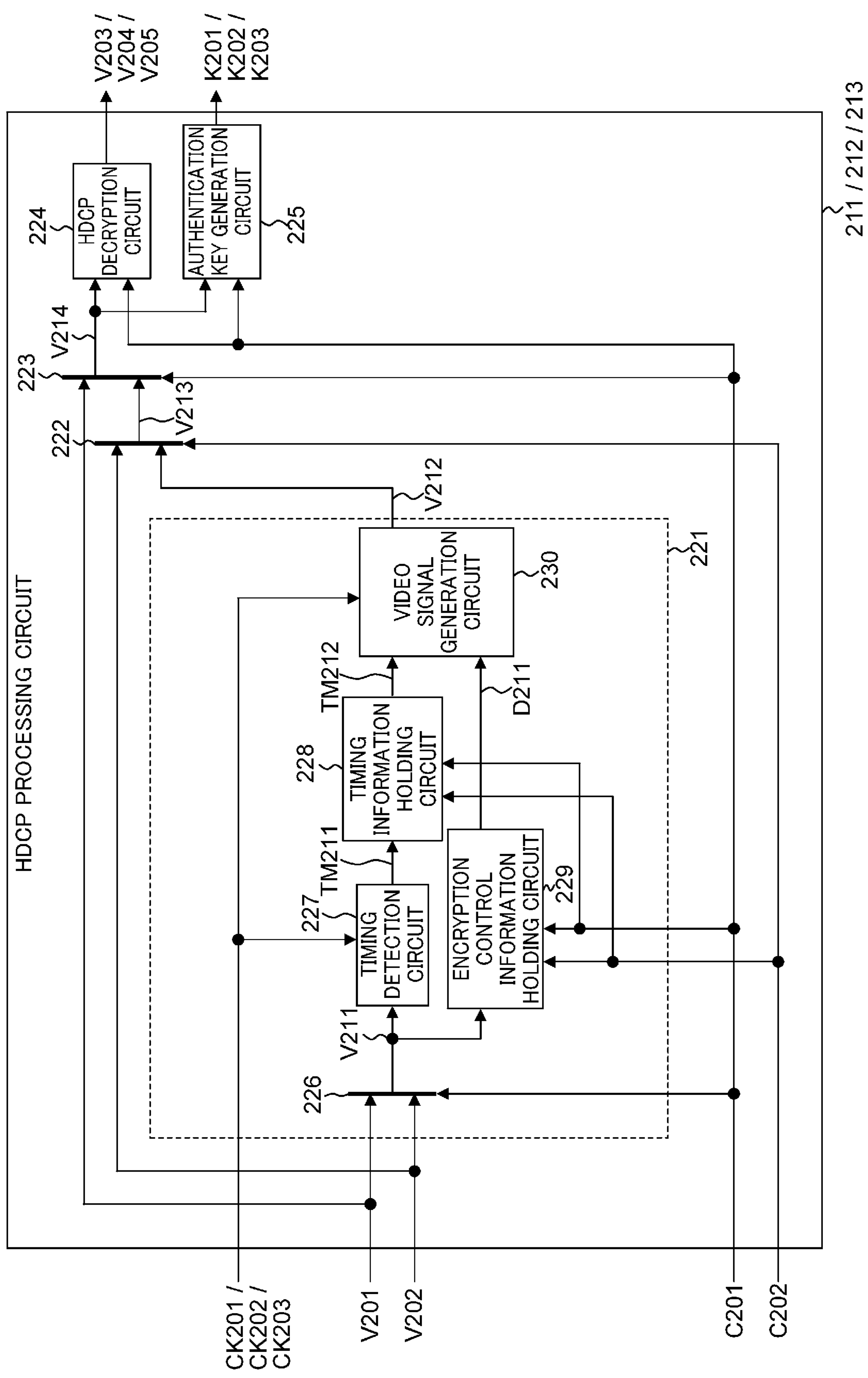
FIG. 11 is a block diagram showing an example configuration of an HDCP processing circuit in the video input device of the third embodiment.

FIG. 11 shows an example configuration of the HDCP processing circuit 211 (212, 213) of FIG. 10. The HDCP processing circuit 211 includes a pseudo-signal generation circuit 221, a second and a third video signal selector 222 and 223, an HDCP decryption circuit (video decryption circuit) 224, and an authentication key generation circuit (225). The pseudo-signal generation circuit 221 includes a fourth video signal selector 226, a timing detection circuit 227, a timing information holding circuit 228, an encryption control information holding circuit 229, and a video signal generation circuit 230.

The pseudo-signal generation circuit 221 generates and outputs a pseudo-video signal V212 based on the video signal V201 or V202 and the clock signal CK201 (CK202, CK203). The video signal selector 222 selects the video signal V202 when the input selection information C202 indicates "Port 0 (Port 1, Port 2)" in the HDCP processing circuit 211 (212, 213), and the pseudo-video signal V212 when the input selection information C202 indicates a "port other than Port 0 (Port 1, Port 2)," and outputs the selected signal as a video signal V213. The video signal selector 223 selects the video signal V201 when the output selection information C203 indicates "Port 0 (Port 1, Port 2)" in the HDCP processing circuit 211 (212, 213), and the video signal V213 when the output selection information C203 indicates a "port other than Port 0 (Port 1, Port 2)," and outputs the selected signal as a video signal V214. The HDCP decryption circuit 224 decrypts the encryption of the video signal V214, and outputs the resulting signal as the video signal V203 (V204, V205). The authentication key generation circuit 225 generates and outputs the authentication key K201 (K202, K203) based on the video signal V214.

The HDCP decryption circuit 224 is allowed to transition to the power-on state when the output selection information C201 indicates "Port 0 (Port 1, Port 2)" in the HDCP processing circuit 211 (212, 213), and to the power-down state when the output selection information C201 indicates a "port other than Port 0 (Port 1, Port 2)." The authentication key generation circuit 225 is allowed to transition to the power-down state or the power-on state, depending on the timing of the video signal V214, when the output selection information C201 indicates a "port other than Port 0 (Port 1, Port 2)" in the HDCP processing circuit 211 (212, 213).

Next, the pseudo-signal generation circuit 221 will be described. In the HDCP processing circuit 211 (212, 213), the video signal selector 226 selects the video signal V201 when the output selection information C201 indicates "Port 0 (Port 1, Port 2)," and the video signal V202 when the output selection information C201 indicates a "port other than Port 0 (Port 1, Port 2)," and outputs the selected signal as a video signal V211. The timing detection circuit 121 detects the operation timing of the video signal V211 based on the clock signal CK201 (CK202, CK203) to output timing information TM211. Here, the timing information TM211 contains VSYNC rise time information indicating a time when VSYNC contained in the video signal V211 rises, and VSYNC fall time information indicating a time when VSYNC falls. The timing information holding circuit 228 holds the timing information TM211 based on the output selection information C201 and the input selection information C202, and outputs the timing information TM211 as timing information TM212. The encryption control information holding circuit 229 holds encryption control information (CTL) contained in the video signal V211 based on the output selection information C201 and the input selection information C202, and outputs the encryption control information (CTL) as encryption control information D211. The video signal generation circuit 230 generates a video signal based on the clock signal CK201 (CK202, CK203), the timing information TM211, and the encryption control information D211, and outputs the video signal as the pseudo-video signal V212.

The timing information holding circuit 228 and the encryption control information holding circuit 229, when the output selection information C201 or the input selection information C202 indicates the corresponding port, update the held information based on the input information, and otherwise, continue to hold the held information without any change. Specifically, in the HDCP processing circuit 211 (212, 213), the timing information holding circuit 228 and the encryption control information holding circuit 229, when the output selection information C201 or the input selection information C202 indicates "Port 0 (Port 1, Port 2)," hold input information, and when the output selection information C201 or the input selection information C202 indicates a "port other than Port 0 (Port 1, Port 2)," continue to hold the information which has been held when the output selection information C201 or the input selection information C202 has indicated "Port 0 (Port 1, Port 2)."

Figure 12:
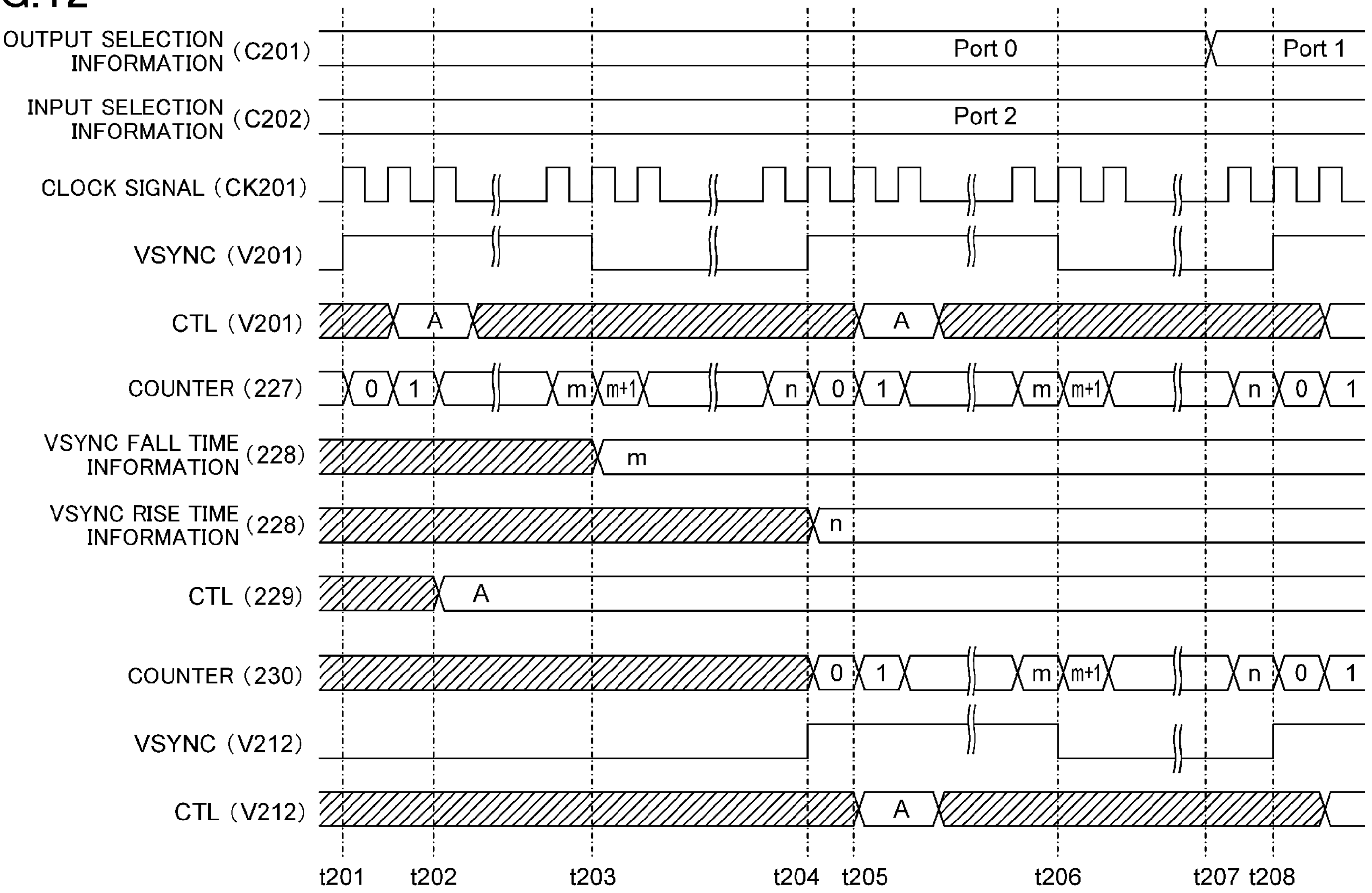
FIG. 12 is a timing chart for describing operation of a pseudo-signal generation circuit in the video input device of the third embodiment.

FIG. 12 is a timing chart for describing operation of the pseudo-signal generation circuit 221 in the HDCP processing circuit 211. Note that operation of the pseudo-signal generation circuits 221 in the MCP processing circuits 212 and 213 is similar to this.

In the operation timing of FIG. 12, initially, the output selection information C201 indicates "Port 0" and the input selection information C202 indicates "Port 2." Because the output selection information C201 indicates "Port 0," the video signal selector 226 selects the video signal V201 from the video signals V201 and V202, and outputs the video signal V201 as the video signal V211. The timing detection circuit 227, when receiving the video signal V211, detects the timing of VSYNC contained in the video signal V211 in synchronization with the clock signal CK201. At time t201, VSYNC rises, and the timing detection circuit 227 activates the internal counter to start timing detection. At time t202, CTL which is encryption control information contained in the video signal V211 is set to an arbitrary value "A," and the encryption control information holding circuit 229 captures and holds the value "A" indicated by CTL. The value of CTL is captured with timing which is previously determined relative to VSYNC.

Next, at time t203, VSYNC falls, and a value "m" indicated by the internal counter of the timing detection circuit 227 at this time is output as the timing information TM211, and is held as VSYNC fall time information in the timing information holding circuit 228. At time t204, VSYNC rises, and a value "n" indicated by the internal counter of the timing detection circuit 217 at this time is output as the timing information TM211, and is held as VSYNC rise time information in the timing information holding circuit 228. Also, at this time, the value of the internal counter of the timing detection circuit 227 is cleared to "0" in synchronization with the rise of VSYNC contained in the video signal V211.

The video signal generation circuit 230 generates the pseudo-video signal V212 based on the timing information TM212 (containing the VSYNC fall time information and the VSYNC rise time information) held in the timing information holding circuit 228, the encryption control information (CTL) held in the encryption control information holding circuit 229, and the clock signal CK201. At time t204, the VSYNC rise time information is output, so that all information items required for generation of the pseudo-video signal V212 have been obtained, and therefore, the video signal generation circuit 230 activates the internal counter to start generating the pseudo-video signal V212 in synchronization with the clock signal CK201. At time t205, the video signal generation circuit 230 outputs a value indicated by the encryption control information D211 (CTL) as CTL contained in the pseudo-video signal V212. The output timing of CTL is previously determined relative to VSYNC contained in the pseudo-video signal V212.

At time t206, the counter value of the video signal generation circuit 230 is equal to the VSYNC fall time information contained in the timing information TM212, and therefore, VSYNC contained in the pseudo-video signal V212 falls. At time t208, the counter value of the video signal generation circuit 230 is equal to the VSYNC rise time information contained in the timing information TM212, and therefore, VSYNC contained in the pseudo-video signal V212 rises. At time t207, the output selection information C201 changes from "Port 0" to "Port 1" and the input selection information indicates "Port 2," and therefore, after time t207, the information held in the timing information holding circuit 228 and the information held in the encryption control information holding circuit 229 continue to be held without any change. Therefore, even after time t107, the pseudo-signal generation circuit 221 continues to generate the pseudo-video signal V212 which operates with predetermined timing.

Figure 13:
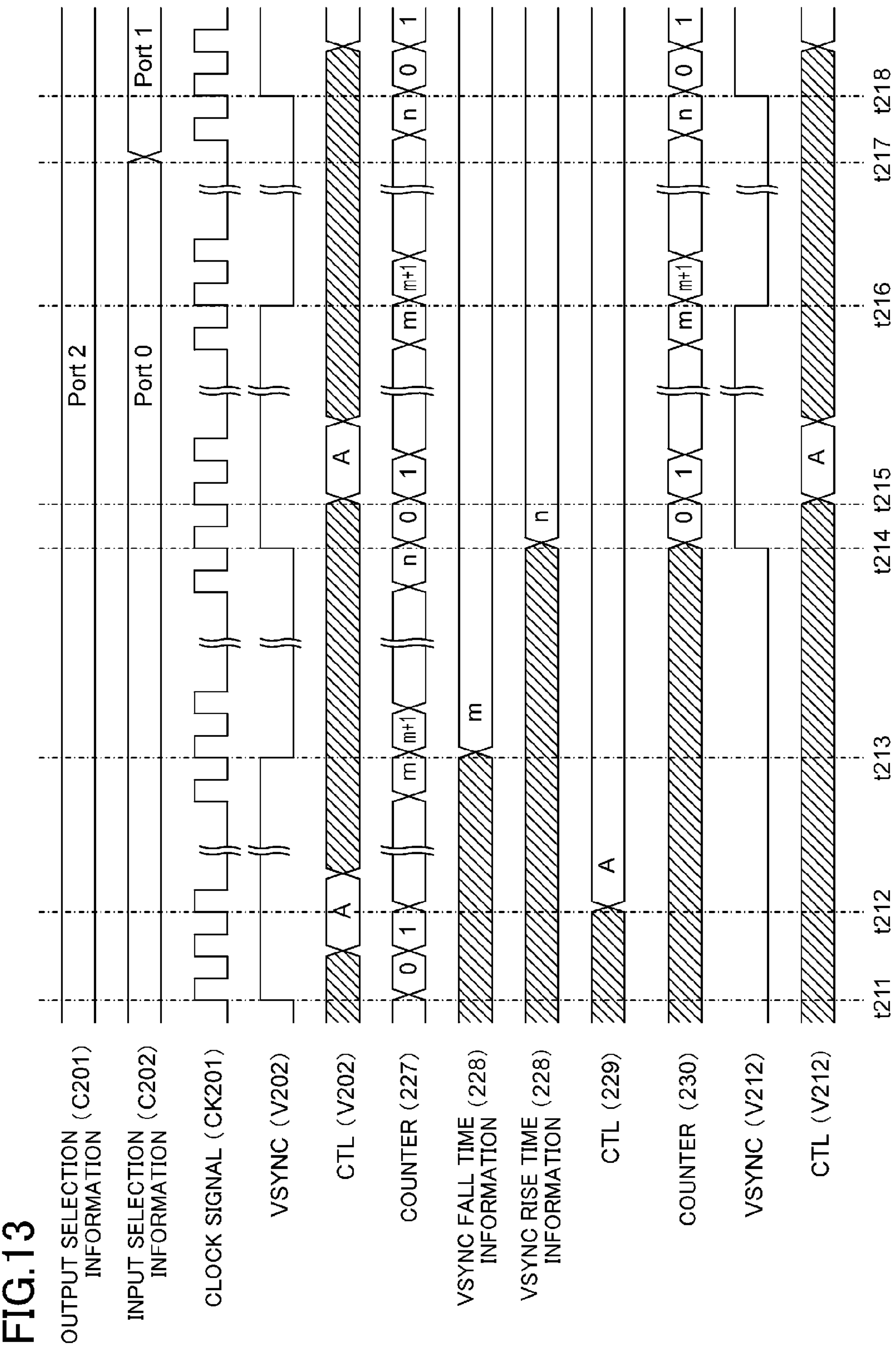
FIG. 13 is a timing chart for describing state transitions of each constituent circuit which occur when HDMI ports for displaying are changed, in the video input device of the third embodiment.

FIG. 13 is another timing chart for describing operation of the pseudo-signal generation circuit 221 in the HDCP processing circuit 211. Note that operations of the pseudo-signal generation circuits 221 in the HDCP processing circuits 212 and 213 are similar to this.

In the operation timing of FIG. 13, initially, the output selection information C201 indicates "Port 2" and the input selection information C202 indicates "Port 0." Because the output selection information C201 indicates a "port other than Port 0," the video signal selector 226 selects the video signal V202 from the video signals V201 and V202, and outputs the video signal V202 as the video signal V211. The subsequent operation is similar to that of FIG. 12.

As shown in FIGS. 12 and 13, in the pseudo-signal generation circuit 221 of the HDCP processing circuit 211, while any one of the output selection information C201 and the input selection information C202 indicates "Port 0," information for generating the video signal V212 can be obtained. Therefore, even when the output selection information C201 indicates a "port other than Port 0," then if the input selection circuit 205 selects Port 0, the pseudo-signal generation circuit 221 can obtain information of a video signal received from the HDMI port 201. This holds true for the other HDCP processing circuits 212 and 213.

Figure 14:
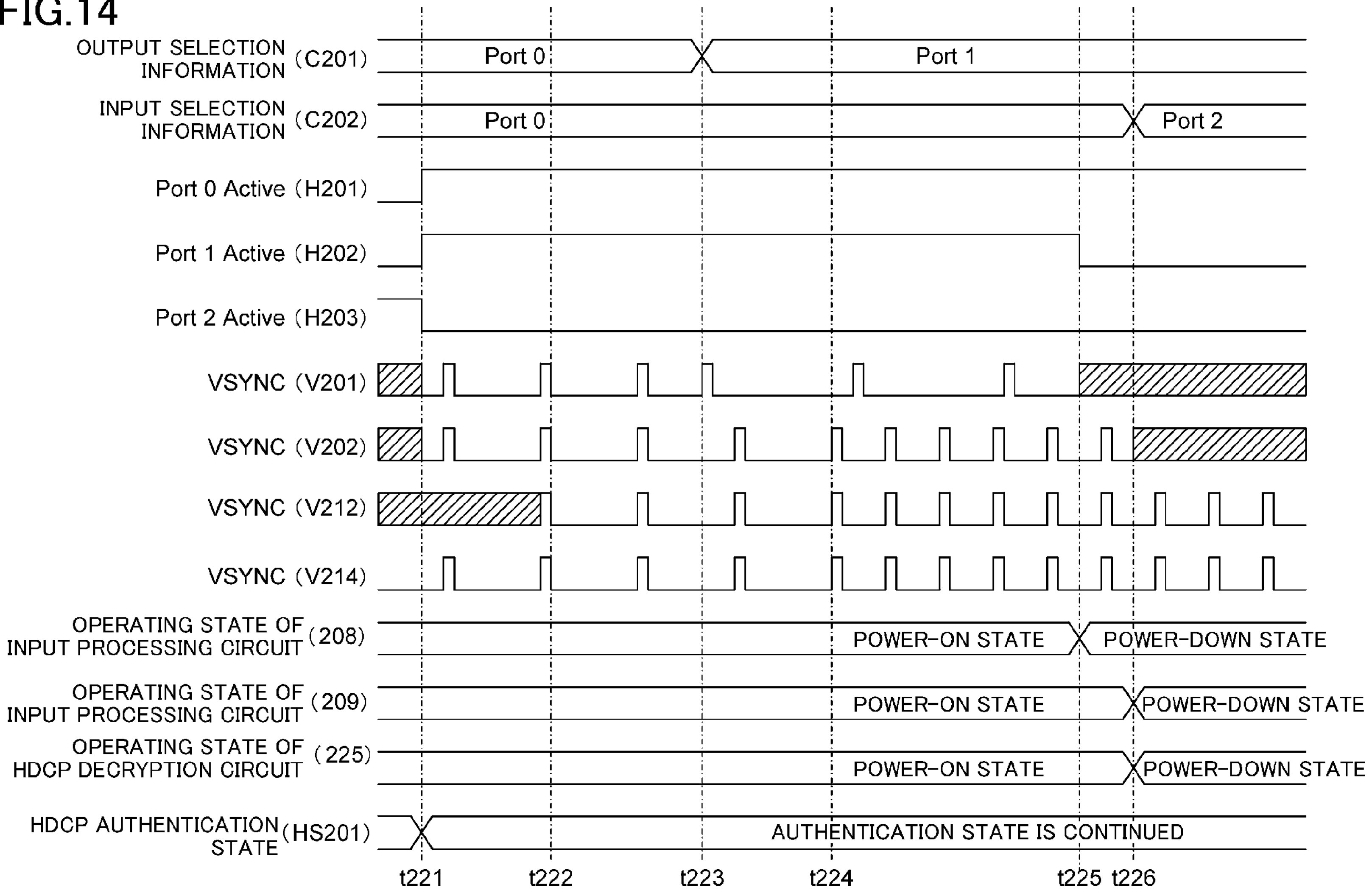
FIG. 14 is a timing chart for describing state transitions of each constituent circuit which occur when HDMI ports for displaying are changed, in the video input device of the third embodiment.

FIG. 14 is a timing chart for describing state transitions of the constituent circuits which occur when the HDMI ports for outputting a signal to the monitor are changed. Here, as an example, the HDCP authentication state of the HDMI port 201 will be described.

In FIG. 14, initially, the output selection information C201 indicates "Port 0," and the input selection information C202 indicates "Port 0." At time t221, external apparatuses are connected to the HDMI ports 201 and 202, and the signals H201 and H202 which indicate the connection states of the HDMI ports 201 and 202 are set to "1," and digital signals are input from the external apparatuses via the HDMI ports 201 and 202. An external apparatus is disconnected from the HDMI port 203, and therefore, the signal H203 indicating the connection state of the HDMI port 203 is "0." Because the output selection information C201 indicates "Port 0," the input signal selector 206 selects and outputs the digital signal S201 output from the HDMI port 201, as the digital signal S204. The HDCP processing circuit 211 receives the video signal V201 which has been obtained by serial-to-parallel conversion in the input processing circuit 208. Also, because the input selection information C202 indicates "Port 0," the input signal selector 207 selects and outputs the digital signal S201 output from the HDMI port 201, as the digital signal S205. The HDCP processing circuit 211 receives the video signal V202 which has been obtained by serial-to-parallel conversion in the input processing circuit 209.

Because the output selection information C201 indicates "Port 0," the HDCP processing circuit 211 decrypts the encryption of the video signal V201, and outputs the resulting signal as the video signal V203. Because the output selection information C201 indicates "Port 0," the video signal selector 214 selects and outputs the video signal V203 as the video signal V206 to the monitor 215. At time t221, HDCP authentication operation is started, and the authentication key K201 generated by the authentication key generation circuit 225 starts to be output. After time t221, the authentication state is continued while the authentication key K101 is being updated based on VSYNC contained in the video signal V214.

At time t222, the pseudo-video signal V212 starts to be output from the pseudo-signal generation circuit 221. At time t223, the output selection information C201 changes from “Port 0” to “Port 1.” Because the output selection information C201 is set to “Port 1,” the input signal selector 206 selects and outputs the digital signal S202 output from the HDMI port 202, as the digital signal S204. Therefore, VSYNC contained in the video signal V201 output from the input processing circuit 208 has a changed period after time t223. However, because the output selection information C201 is set to “Port 1,” the video signal selector 226 selects and outputs the video signal V202 as the video signal V211, and the video signal selector 222 selects and outputs the video signal V202 as the video signal V213. Also, the video signal selector 223 selects and outputs the video signal V213 as the video signal V214, and therefore, the period of VSYNC contained in the video signal V214 does not change after time t223, and the HDCP authentication is continued.

At time t224, the period of VSYNC of a video signal input from the HDMI port 201 changes. At this time, while the output selection information C201 indicates “Port 1,” the input selection information C202 indicates “Port 0,” and therefore, the change in the period of VSYNC of the video signal input to the HDMI port 201 causes a change in the period of VSYNC of the video signal V202, so that the period of VSYNC of the pseudo-video signal V212 output by the pseudo-signal generation circuit 221 also changes, following the video signal V202.

At time t225, the HDMI port 202 is disconnected from the external apparatus, and the signal H202 is set to “0.” At this time, because the output selection information C201 indicates “Port 1,” the input processing circuit 208 transitions to the power-down state. Although the input processing circuit 208 transitions to the power-down state, the video signal V202 is input via the input processing circuit 209 to the HDCP processing circuit 211 because the input selection information C202 indicates “Port 0.” Therefore, the operation is performed without a problem. At time t226, if the input selection information C202 is set to “Port 2,” the video signal selector 222 of the HDCP processing circuit 211 selects and outputs the pseudo-video signal V212 output by the pseudo-signal generation circuit 221, as the video signal V213. Because the output selection information C201 does not indicate “Port 0,” the video signal selector 223 selects and outputs the video signal V213 as the video signal V214. Therefore, the HDCP decryption circuit 224 and the authentication key generation circuit 225 receives the pseudo-video signal V212 generated by the pseudo-signal generation circuit 221, and continues to operate in a manner similar to that which is performed before time t226. Because the input selection information C202 is set to “Port 2,” the HDCP decryption circuit 225 transitions to the power-down state.

Thus, according to this embodiment, even when the output selection information C201 is set to indicate “Port 1,” then if the input selection information C202 indicates “Port 0,” it is possible to follow changes in a video signal received from the HDMI port 201, and it is possible to respond to changes in the reception state of the HDMI port 201 in a sensitive manner. Also, even when both the output selection information C201 and the input selection information C202 indicate a “port other than Port 0,” the HDCP authentication of the HDMI port 201 (Port 0) is continued by the pseudo-signal generation circuit 221 generating a pseudo-video signal. Therefore, it is no longer necessary to perform authentication again when the output selection information C201 is set back to “Port 0,” whereby the time that it takes to display video on the monitor 215 can be reduced. This holds true for the HDMI ports 202 (Port 1) and 203 (Port 2).

Figure 15:
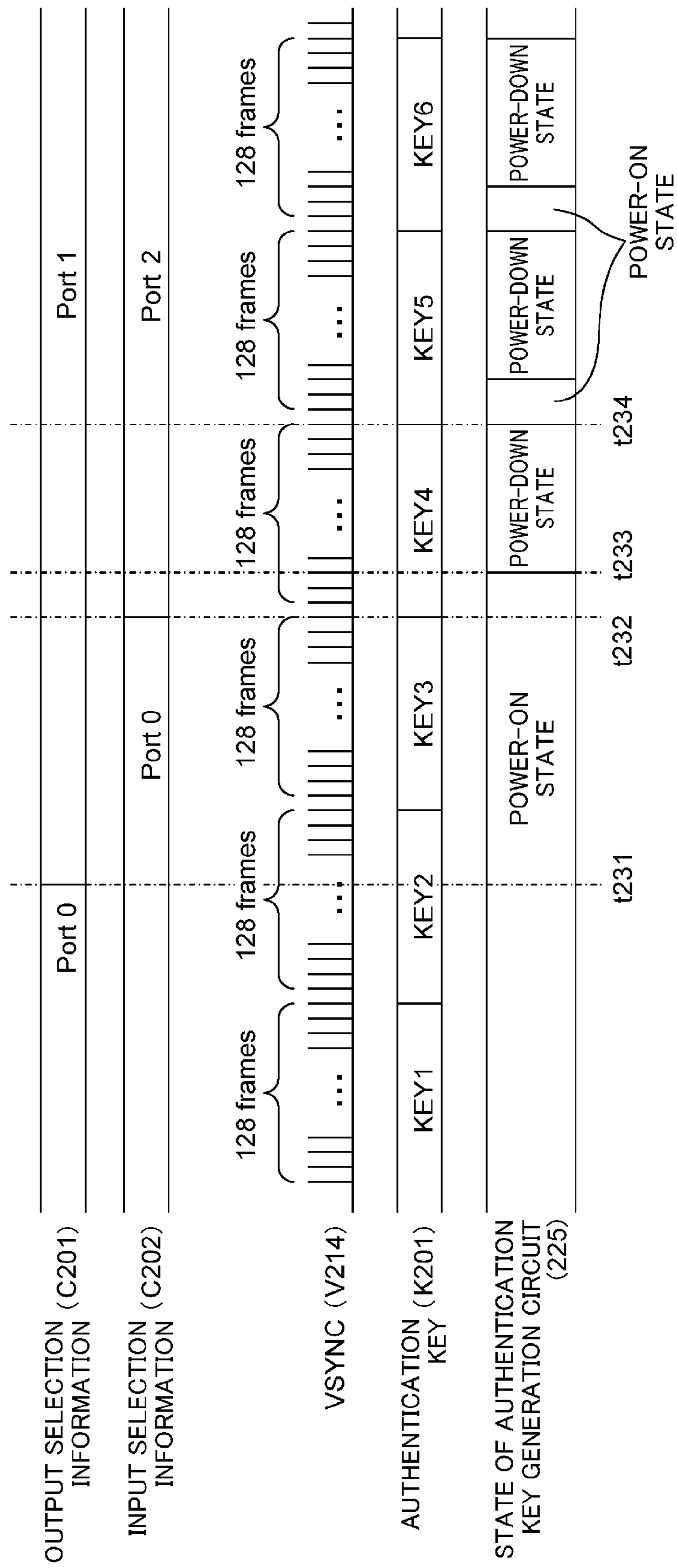
FIG. 15 is a timing chart for describing state transitions of an authentication key generation circuit which occur when HDMI ports for displaying are changed, in the video input device of the third embodiment.

FIG. 15 is a timing chart showing changes in VSYNC contained in the video signal V214, changes in the authentication key K201 generated from the authentication key generation circuit 225, and state transitions of the authentication key generation circuit 225. Here, as an example, operation of the HDCP processing circuit 211 will be described. Note that operation of the other HDCP processing circuits 212 and 213 is similar to that of the HDCP processing circuit 211.

The authentication key generation circuit 225 generates an authentication key based on the video signal V214. Specifically, the authentication key is calculated based on VSYNC of the video signal V214, and the calculated authentication key is output as the authentication key K201 every 128 frames while VSYNC contained in the video signal V214 is being counted. While the output selection information C201 indicates “Port 0,” the authentication key is calculated in synchronization with VSYNC of the input video signal V214. Even if, at time t231, the output selection information C201 is set to “Port 1,” an authentication key is calculated in synchronization with VSYNC of the video signal V214 as before time t231 because the input selection information C202 indicates “Port 0.” After the input selection information C202 is set to “Port 2” at time t232, the authentication key generation circuit 225 immediately calculates an authentication key for 128 frames. When the calculation of an authentication key for the 128 frames is ended (at time t233), the authentication key generation circuit 225 transitions to the power-down state. Thereafter, when the number of counts of VSYNC of the video signal V214 reaches 128 frames (at time t234), the authentication key generation circuit 225 transitions back to the power-on state, and outputs the calculated authentication key as the authentication key K201, and starts calculating an authentication key for the next 128 frames. Thus, when both the output selection information C201 and the input selection information C202 indicate a “port other than Port 0,” power consumption can be reduced by operating the authentication key generation circuit 225 intermittently.

Fourth Embodiment

Figure 16:
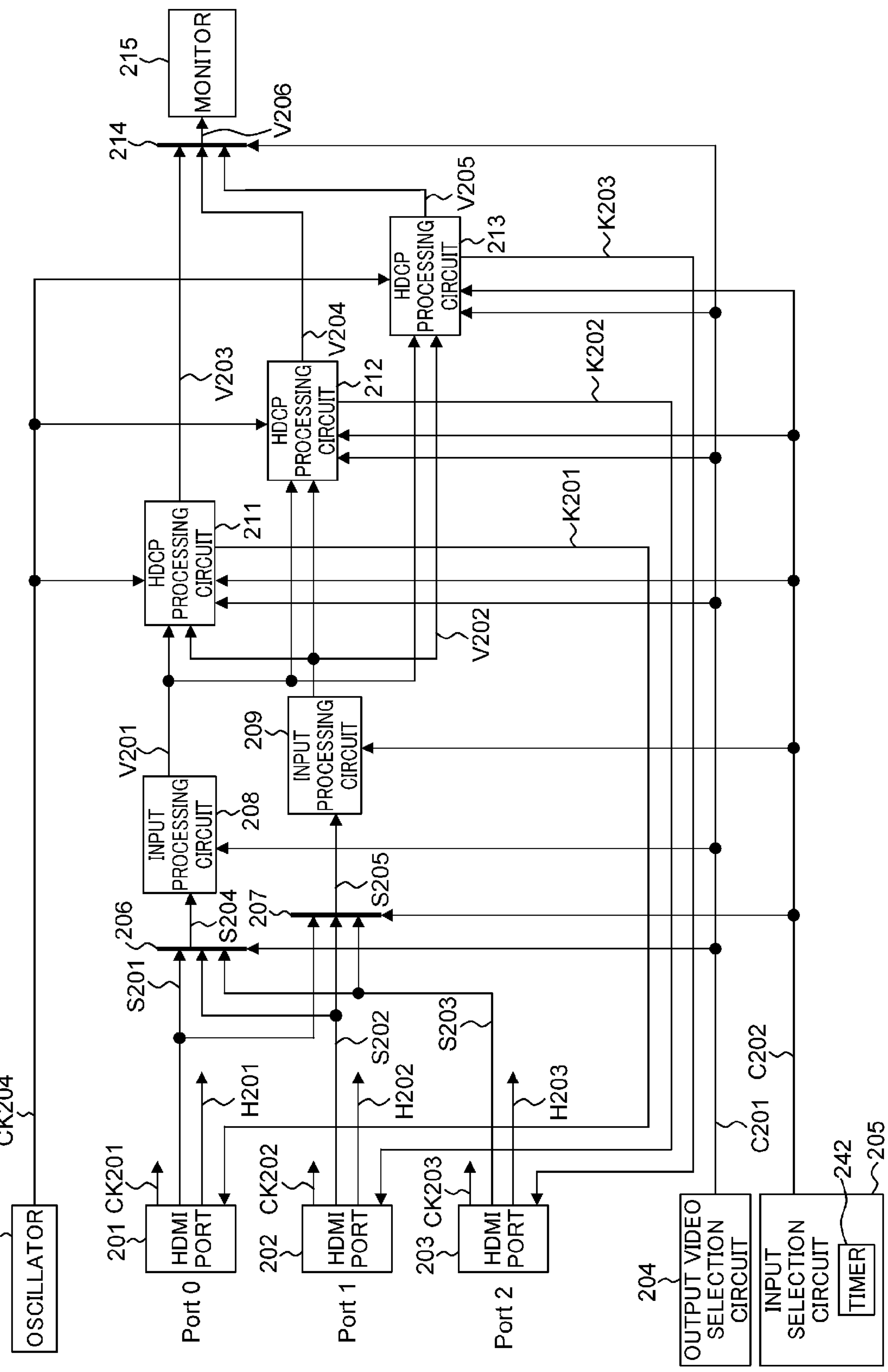
FIG. 16 is a block diagram showing an example configuration of a video input device according to a fourth embodiment.

FIG. 16 shows an example configuration of a video input device according to a fourth embodiment. In FIG. 16, the same parts as those of FIG. 10 are indicated by the same reference characters as those of FIG. 10 and will not be described here in detail. The configuration of FIG. 16 is different from that of FIG. 10 in that an oscillator 241 which outputs a clock signal CK204 which oscillates at a predetermined frequency is provided, and the HDCP processing circuit 211 (212, 213) receives the clock signal CK204 instead of the clock signal CK201 (CK202, CK203) output from the HDMI port 201 (202, 203). Also, the connection detection circuit 210 is removed. Also, the input selection circuit 205 includes a timer 242 which measures an arbitrary period of time and outputs the measured value. The timer 242 is used to change the input selection information C202 with predetermined timing.

Figure 17:
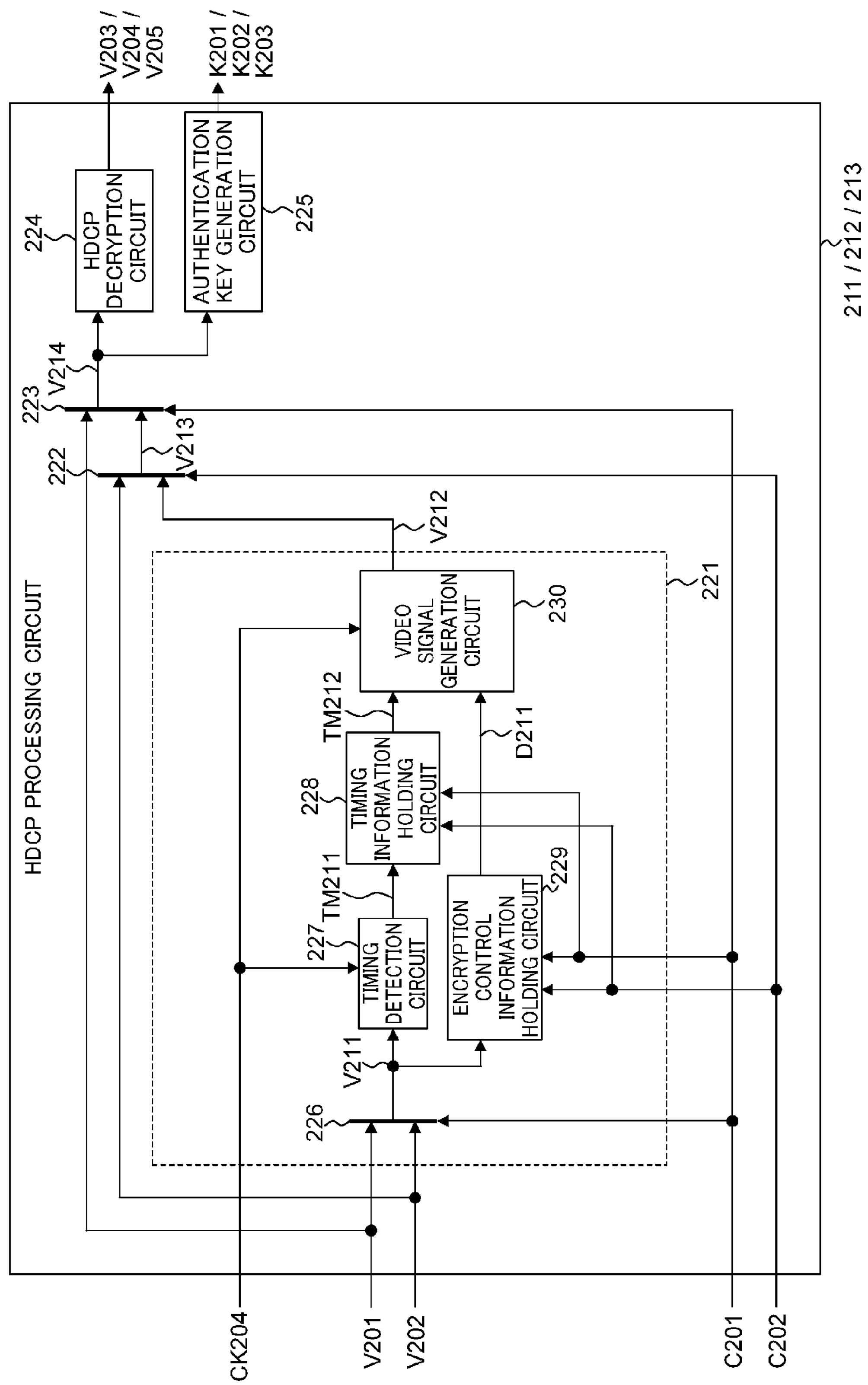
FIG. 17 is a block diagram showing an example configuration of an HDCP processing circuit in the video input device of the fourth embodiment.

FIG. 17 shows an example configuration of the HDCP processing circuit 211 (212, 213) of FIG. 16. In FIG. 17, the same parts as those of FIG. 11 are indicated by the same reference characters as those of FIG. 11 and will not be described here in detail. The configuration of FIG. 17 is different from that of FIG. 11 in that the clock signal CK204 output from the oscillator 241 is input to the timing detection circuit 227 and the video signal generation circuit 230. The other parts are similar to those of FIG. 11.

Figure 18:
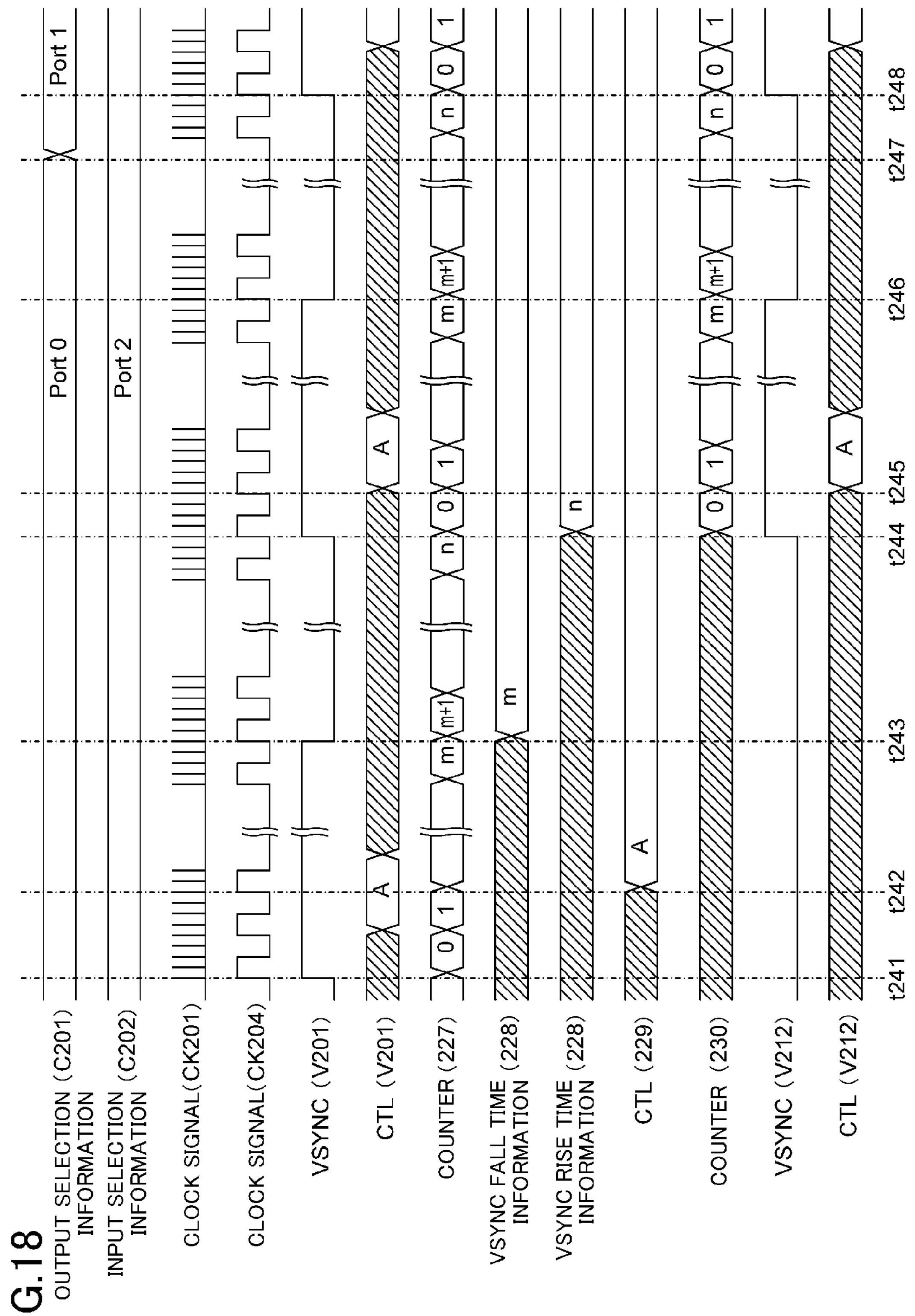
FIG. 18 is a timing chart for describing operation of a pseudo-signal generation circuit in the video input device of the fourth embodiment.
Figure 19:
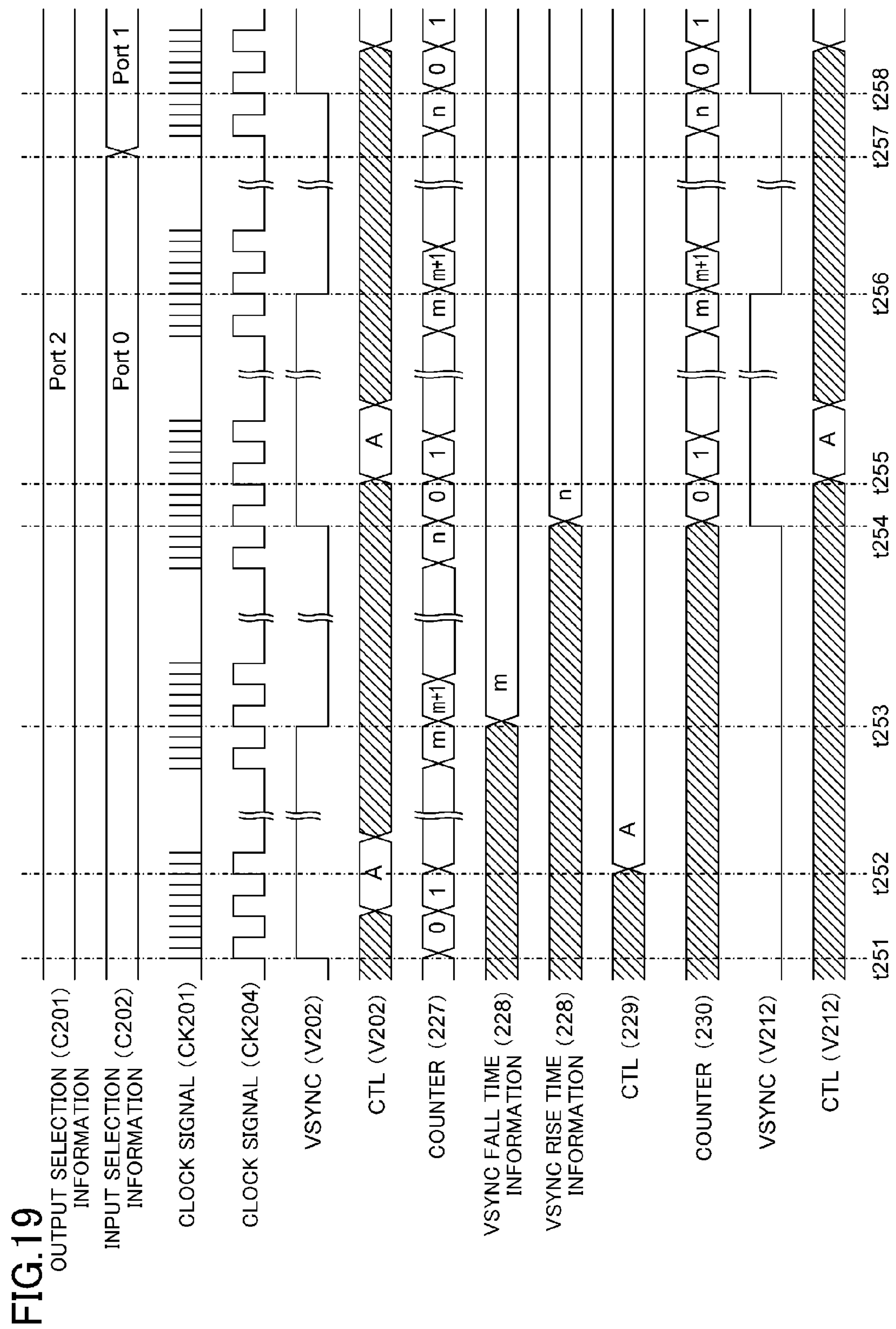
FIG. 19 is a timing chart for describing operation of the pseudo-signal generation circuit in the video input device of the fourth embodiment.

FIGS. 18 and 19 are timing charts for describing operation of the pseudo-signal generation circuit 221 in the HDCP processing circuit 211. Operation of FIGS. 18 and 19 is similar to that of FIGS. 12 and 13, except that the clock signal CK204 is used, and will not be described here in detail. Note that operation of the pseudo-signal generation circuits 221 in the HDCP processing circuits 212 and 213 is similar to this.

Figure 20:
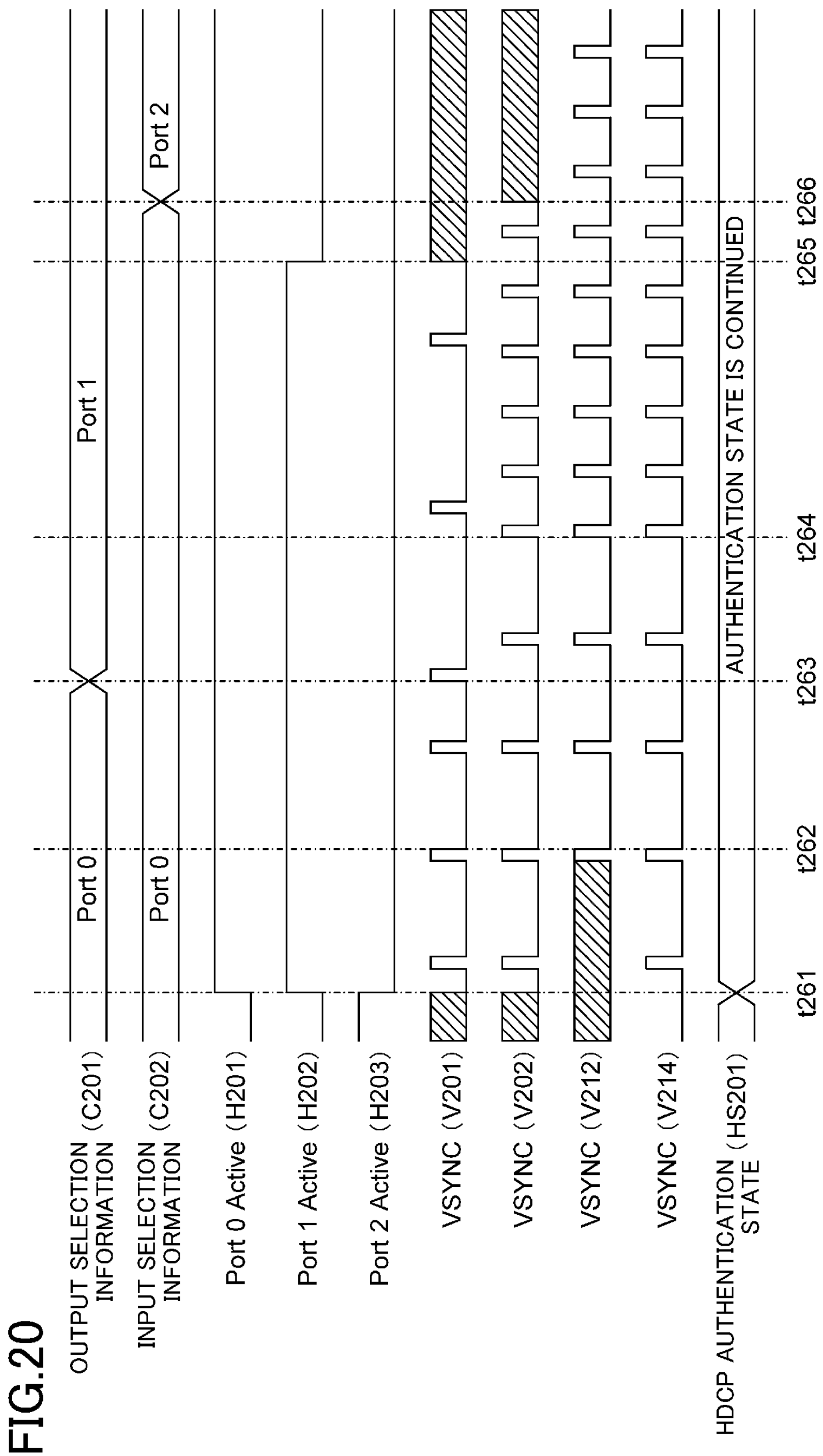
FIG. 20 is a timing chart for describing state transitions of each constituent circuit which occur when HDMI ports for displaying are changed, in the video input device of the fourth embodiment.

FIG. 20 is a timing chart for describing state transitions of the constituent circuits which occur when the HDMI ports for outputting a signal to the monitor are changed. Here, as an example, the HDCP authentication state of the HDMI port 201 will be described. Operation of FIG. 20 is similar to that of FIG. 14 and will not be described here in detail.

Thus, according to this embodiment, even when the output selection information C201 is set to indicate "Port 1," then if the input selection information C202 indicates "Port 0," it is possible to follow changes in a video signal received from the HDMI port 201, and it is possible to respond to changes in the reception state of the HDMI port 201 in a sensitive manner. Also, even when both the output selection information C201 and the input selection information C202 indicate a "port other than Port 0," the HDCP authentication of the HDMI port 201 (Port 0) is continued by the pseudo-signal generation circuit 221 generating a pseudo-video signal. Therefore, it is no longer necessary to perform authentication again when the output selection information C201 is set back to "Port 0," whereby the time that it takes to display video on the monitor 215 can be reduced.

Moreover, in this embodiment, by extending the period of the clock signal CK204 output by the oscillator 241 (reducing the frequency of the clock signal CK204) within an acceptable range, the operating frequency of the pseudo-signal generation circuit 221 can be reduced, whereby power consumption can be reduced. This is particularly effective when the frequencies of the clock signals CK201, CK202, and CK203 received and output by the HDMI ports 201, 202, and 203 are high.

Figure 21:
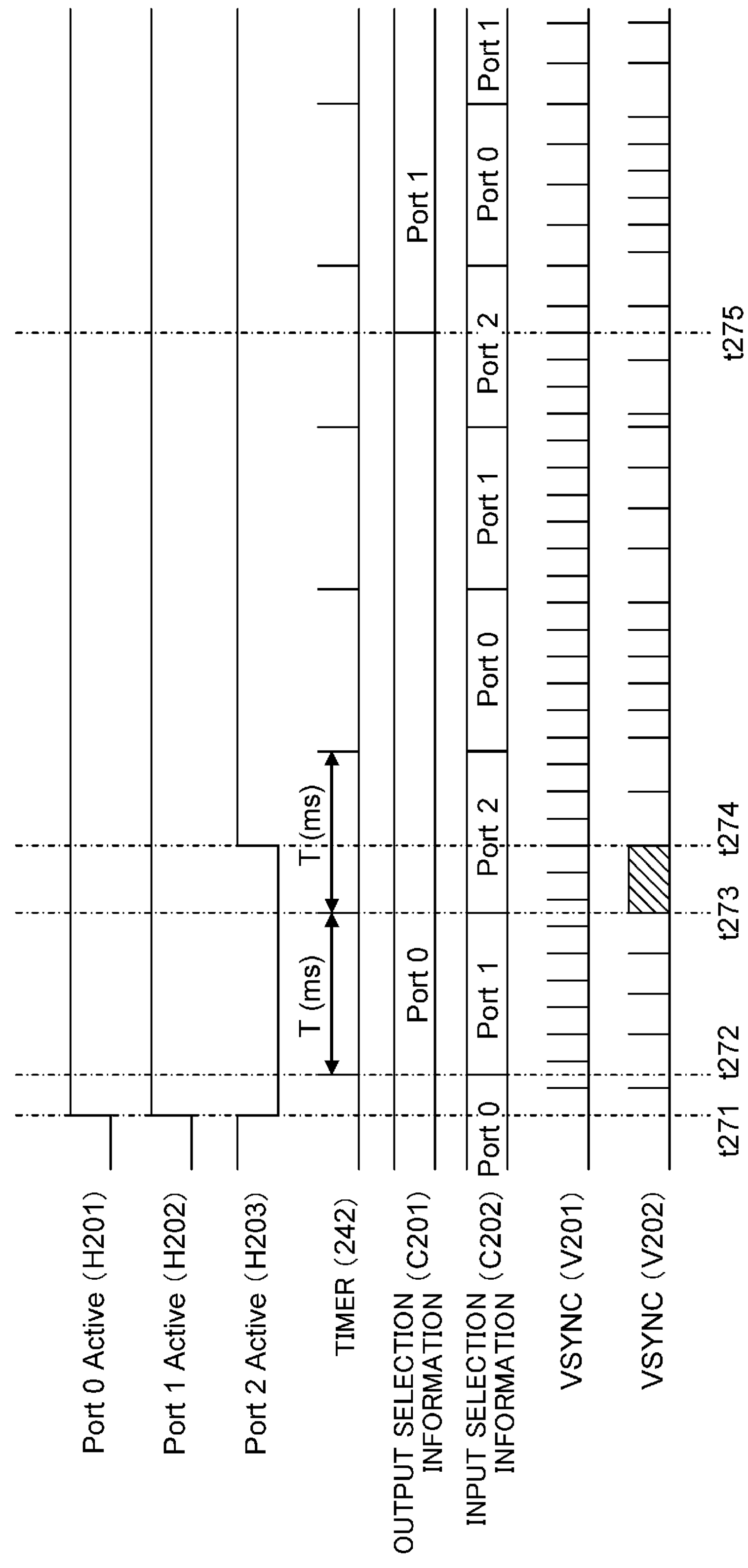
FIG. 21 is a timing chart for describing operation of an input selection circuit in the video input device of the fourth embodiment.

FIG. 21 is a timing chart for describing operation of the timer 242 included in the input selection circuit 205. In FIG. 21, initially, the output selection information C201 indicates "Port 0," the input selection information C202 indicates "Port 0," an external apparatus is not connected to the HDMI port 201 (Port 0) or 202 (Port 1), and an external apparatus is connected to the HDMI port 203 (Port 2). The timer 242 measures a predetermined interval T (ms). The input selection circuit 205 changes the input selection information C202 at the predetermined intervals T (ms) indicated by the timer 242.

At time t271, external apparatuses are connected to Port 0 and Port 1, and therefore, the signals H201 and H202 indicating that external apparatuses are connected to the HDMI ports 201 and 202 are set to "1," and an external apparatus is disconnected from Port 2, and therefore, the signal H203 indicating that an external apparatus is connected to the HDMI port 203 is set to "0." At this time, the output selection information C201 indicates "Port 0," and therefore, a video signal received from the HDMI port 201 is output as the video signal V201. Also, the input selection information C202 indicates "Port 0," and therefore, a video signal received from the HDMI port 201 is output as the video signal V202.

At time t272, the input selection circuit 205 changes the input selection information C202 from "Port 0" to "Port 1" based on the timer 242, and along with this, the video signal V202 is changed to a video signal received from the HDMI port 202. At time t273 which is T (ms) after time t272, the input selection information C202 changes from "Port 1" to "Port 2," and along with this, the video signal V202 is changed to a video signal received from the HDMI port 203. At this time, because, at time t273, an external apparatus is not connected to the HDMI port 203, and therefore, the video signal V202 is unstable. T (ms) after time t273, the input selection information C202 changes from "Port 2" to "Port 0." Thus, by using the timer 242, the input selection information C202 is changed at the predetermined intervals T (ms).

At time t274, an external apparatus is connected to the HDMI port 203, and the signal H203 indicating that an external apparatus is connected to the HDMI port 203 is set to "1." At this time, the input selection information C202 indicates "Port 2," and therefore, after time t274, when the input selection information C202 indicates "Port 2," a video signal received from the HDMI port 203 is output as the video signal V202. At time t275, the output selection information C201 is set to "Port 1," and a video signal received from the HDMI port 202 is output as the video signal V201.

Thus, according to this embodiment, by using the timer 242, the state of each HDMI port can be regularly monitored by changing the input selection information C202, whereby the state transition of each HDMI port can be followed.

Fifth Embodiment

Figure 22:
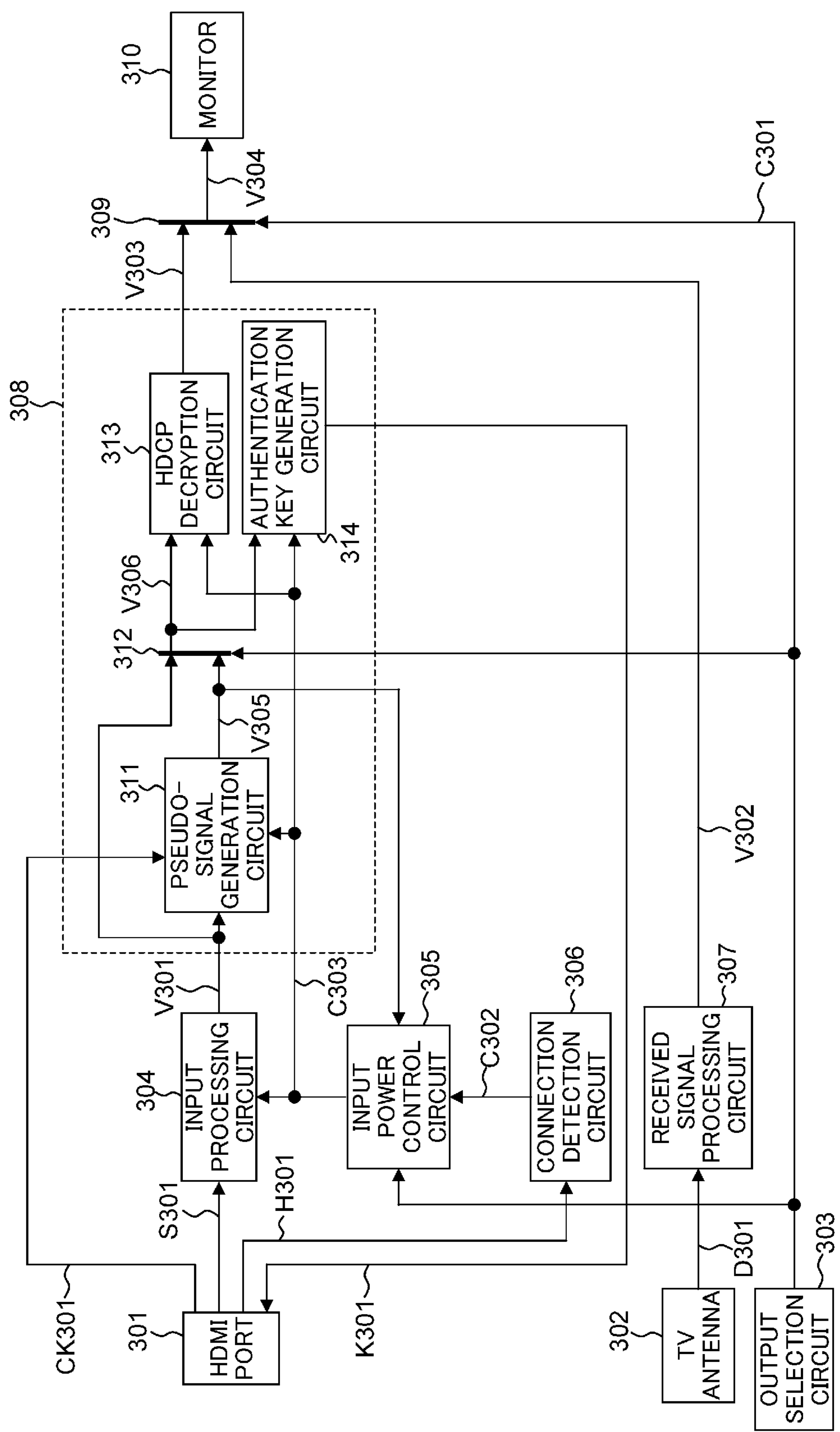
FIG. 22 is a block diagram showing an example configuration of a video input device according to a fifth embodiment.

FIG. 22 shows an example configuration of a video input device according to a fifth embodiment. In FIG. 22, the video input device includes an HDMI port (reception interface section) 301, a TV antenna (video signal receiver) 302, an output selection circuit 303, an input processing circuit 304, an input power control circuit 305, a connection detection circuit 306, a received signal processing circuit 307, an HDCP processing circuit (decryption circuit) 308, a video signal selector 309, and a monitor 310. The HDCP processing circuit 308 includes a pseudo-signal generation circuit 311, a second video signal selector 312, an HDCP decryption circuit (video decryption circuit) 313, and an authentication key generation circuit 314.

The HDMI port 301 is used to connect to an external apparatus via an HDMI cable, and receive a digital video signal, and write or read HDCP-related information (including an authentication key) to and from the external apparatus. The digital signal received from the HDMI port 301 is output as a digital signal S301, and a clock signal contained in the received digital signal is output as a clock signal CK301. The TV antenna 302 receives television broadcast waves, and outputs a TV signal D301. The received signal processing circuit 307 performs signal processing, such as a decoding process etc., on video data contained in the TV signal D301, to output a video signal V302. The output selection circuit 303 outputs output selection information C301 for selecting one of the video signal received from the HDMI port 301 and the video signal received from the TV antenna 302. The connection detection circuit 306 receives a signal H301 which indicates whether or not an external apparatus is connected to the HDMI port 301, and detects the connection state of the HDMI port 301, to output port connection information C302. The input processing circuit 304 performs a serial-to-parallel conversion process conforming to the HDMI standard on the input digital signal S301 to output a video signal V301.

The input power control circuit 305 can control the power-on state or power-down state of the input processing circuit 304 by outputting a power control signal C303. Here, it is assumed that the input processing circuit 304 transitions to the power-down state when the power control signal C303 is 0, and to the power-on state when the power control signal C303 is 1. The input power control circuit 305 sets the power control signal C303 to "0" when the port connection information C302 is "0" (an external apparatus is not connected to the HDMI port 301), and the power control signal C303 to "1" when the port connection information C302 is "1" (an external apparatus is connected to the HDMI port 301) and the output selection information C301 indicates an "HDMI port." The input power control circuit 305 also sets the power control signal C303 to "0" or "1," depending on the video signal V305 output from the pseudo-signal generation circuit 311, when the port connection information C302 is "1" and the output selection information C301 indicates a "TV antenna."

The HDCP processing circuit 308 decrypts the encryption of the video signal V301 to output a video signal V303, and generates and outputs an authentication key K301 required for HDCP authentication. The video signal selector 309 selects, based on the output selection information C301, one of the video signal V303 output from the HDCP processing circuit 308 and the video signal V302 output from the received signal processing circuit 307, and outputs the selected signal as a video signal V304. The monitor 310 displays the input video signal V304.

Next, the internal circuitry of the HDCP processing circuit 308 will be described. The pseudo-signal generation circuit 311 generates and outputs a pseudo-video signal V305 based on the video signal V301 and the clock signal CK301 received from the HDMI port 301. The video signal selector 312 selects the video signal V301 when the output selection information C301 indicates the HDMI port 301, and the pseudo-video signal V305 output from the pseudo-signal generation circuit 311 when the output selection information C301 indicates the TV antenna 302, and outputs the selected signal as a video signal V306. The HDCP decryption circuit 313 decrypts the encryption of the video signal V306, and outputs the resulting signal as the video signal V303. The authentication key generation circuit 314 generates and outputs the authentication key K301 based on the video signal V306.

The HDCP decryption circuit 313 transitions to the power-down state when the power control signal C303 indicates the power-down state, and to the power-on state when the power control signal C303 indicates the power-on state. The authentication key generation circuit 314 is allowed to transition to the power-down state or the power-on state, depending on the timing of the video signal V306, when the power control signal C303 indicates the power-down state.

Figure 23:
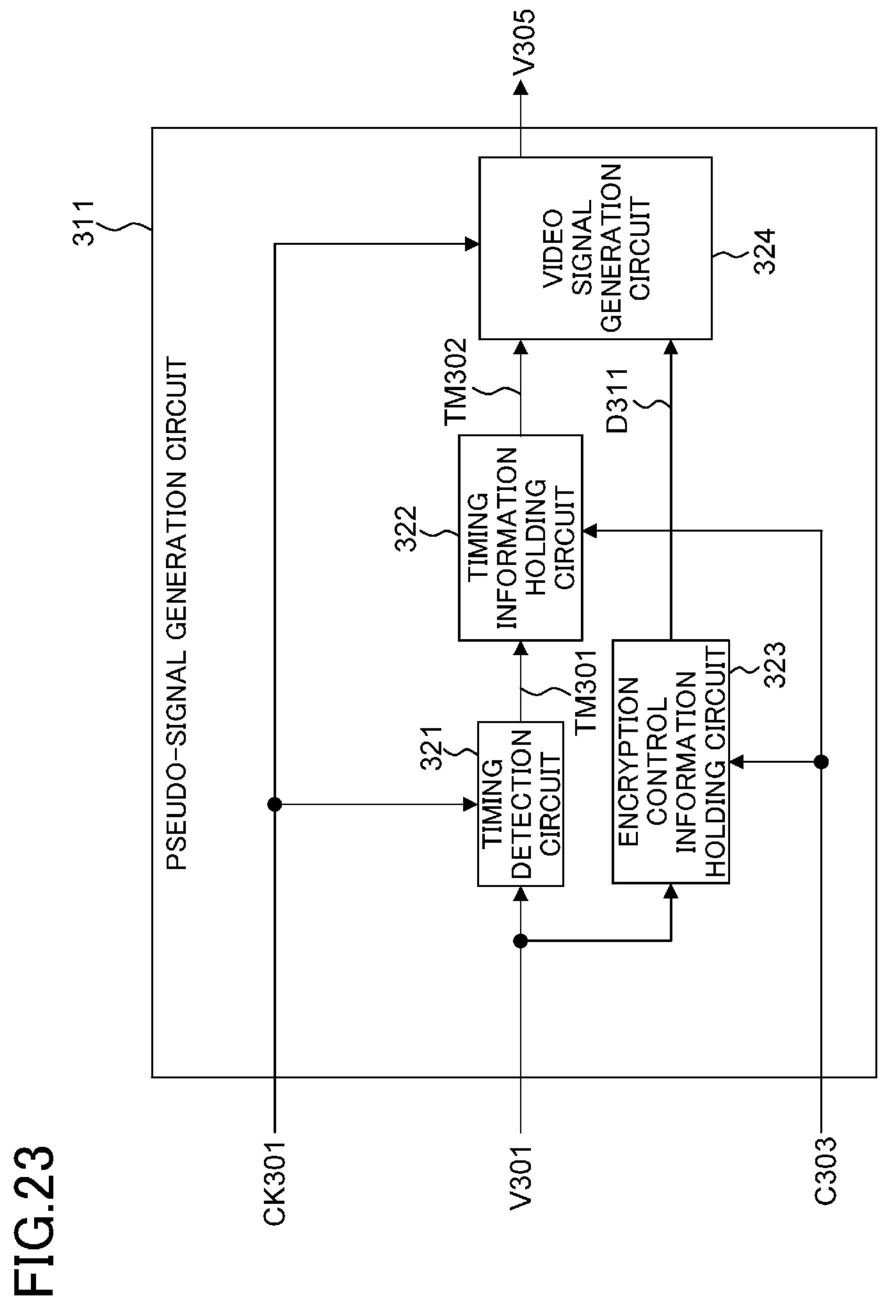
FIG. 23 is a block diagram showing an example configuration of a pseudo-signal generation circuit in the video input device of the fifth embodiment.

FIG. 23 shows an example configuration of the pseudo-signal generation circuit 311 of FIG. 22. The pseudo-signal generation circuit 311 includes a timing detection circuit 321, a timing information holding circuit 322, an encryption control information holding circuit 323, and a video signal generation circuit 324.

The timing detection circuit 321 detects the operation timing of the video signal V301 based on the clock signal CK301 to output timing information TM301. Here, the timing information TM301 contains VSYNC rise time information indicating a time when a vertical synchronization signal (VSYNC) contained in the video signal V301 rises, and VSYNC fall time information indicating a time when VSYNC falls. The timing information holding circuit 322 holds the timing information TM301 based on the power control signal C303, and outputs the timing information TM301 as timing information TM302. The encryption control information holding circuit 323 holds encryption control information (CTL) contained in the video signal V301 based on the power control signal C303, and outputs the encryption control information (CTL) as encryption control information D301. The video signal generation circuit 324 generates a video signal based on the clock signal CK301, the timing information TM301, and the encryption control information D301, and outputs the video signal as the pseudo-video signal V305.

The timing information holding circuit 322 and the encryption control information holding circuit 323, when the power control signal C303 indicates the power-on state, hold input information, and when the power control signal C303 indicates the power-down state, continue to hold information which has been held when the power control signal C303 has indicated the power-on state.

Figure 24:
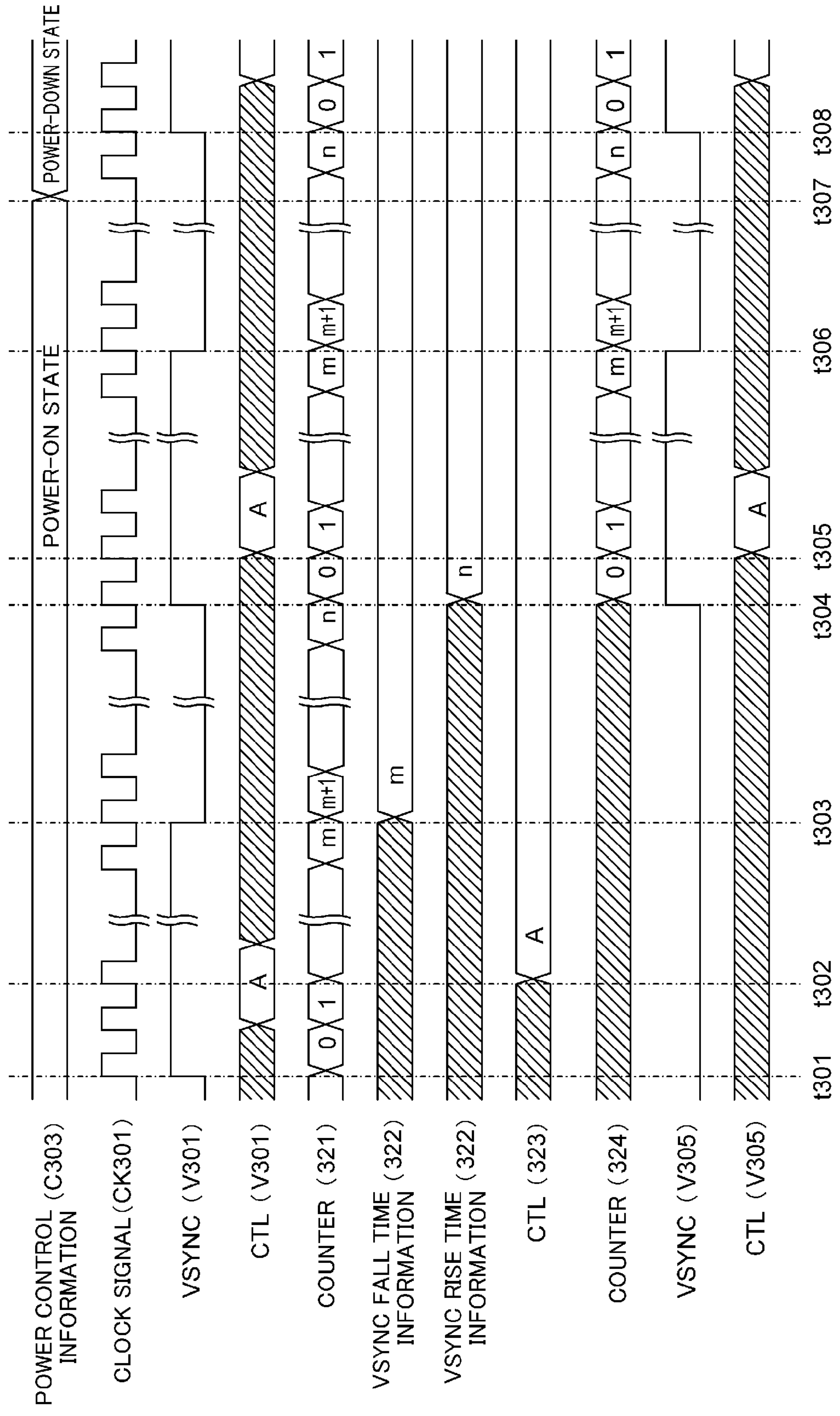
FIG. 24 is a timing chart for describing operation of the pseudo-signal generation circuit in the video input device of the fifth embodiment.

FIG. 24 is a timing chart for describing operation of the pseudo-signal generation circuit 311.

When the power control signal C303 indicates the power-on state, then if the timing detection circuit 321 receives the video signal V301, the timing detection circuit 321 detects the timing of VSYNC contained in the video signal V301 in synchronization with the clock signal CK301. At time t301, VSYNC rises, and the timing detection circuit 321 activates the internal counter to start timing detection. At time t302, CTL which is encryption control information contained in the video signal V301 is set to an arbitrary value "A," and the encryption control information holding circuit 323 captures and holds the value "A" indicated by CTL. The value of CTL is captured with timing which is previously determined relative to VSYNC. Next, at time t303, VSYNC falls, and a value "m" indicated by the internal counter of the timing detection circuit 321 at this time is output as the timing information TM301, and is held as VSYNC fall time information in the timing information holding circuit 322. At time t304, VSYNC rises, and a value "n" indicated by the internal counter of the timing detection circuit 321 at this time is output as the timing information TM301, and is held as VSYNC rise time information in the timing information holding circuit 322. Also, at this time, the value of the internal counter of the timing detection circuit 321 is cleared to "0" in synchronization with the rise of VSYNC contained in the video signal V301.

The video signal generation circuit 324 generates the pseudo-video signal V305 based on the timing information TM302 (containing the VSYNC fall time information and the VSYNC rise time information) held in the timing information holding circuit 322, the encryption control information (CTL) held in the encryption control information holding circuit 323, and the clock signal CK301. At time t304, the VSYNC rise time information is output, so that all information items required for generation of the pseudo-video signal V305 have been obtained, and therefore, the video signal generation circuit 324 activates the internal counter to start generating the pseudo-video signal V305 in synchronization with the clock signal CK301. At time t305, the video signal generation circuit 324 outputs a value indicated by the encryption control information D301 (CTL) as CTL contained in the pseudo-video signal V305. The output timing of CTL is previously determined relative to VSYNC contained in the pseudo-video signal V305. At time t306, the counter value of the video signal generation circuit 324 is equal to the VSYNC fall time information contained in the timing information TM302, and therefore, VSYNC contained in the pseudo-video signal V305 falls. At time t308, the counter value of the video signal generation circuit 324 is equal to the VSYNC rise time information contained in the timing information TM302, and therefore, VSYNC contained in the pseudo-video signal V305 rises. At time t307, the power control signal C303 transitions from the power-on state to the power-down state, and therefore, after time t307, the information held in the timing information holding circuit 322 and the information held in the encryption control information holding circuit 323 continue to be held without any change. Therefore, even after time t307, the pseudo-signal generation circuit 311 continues to generate the pseudo-video signal V305 which operates with predetermined timing.

FIG. 25 is a timing chart for describing state transitions of the constituent circuits which occur when input ports (the HDMI port 301 and the TV antenna 302) for outputting a signal to the monitor are changed.

In FIG. 25, initially, the output selection information C301 indicates an "HDMI port." At this time, an external apparatus is not connected to the HDMI port 301 and the port connection information C302 is "0," and therefore, the input power control circuit 305 sets the power control signal C303 to "0," and the input processing circuit 304 and the HDCP decryption circuit 313 are in the power-down state. At time t311, an external apparatus is connected to the HDMI port 301, so that the signal H301 indicating the connection state of the HDMI port 301 is set to "1," and the port connection information C302 is set to "1," and therefore, a digital signal is input from the external apparatus via the HDMI port 301. The digital signal S301 received from the HDMI port 301 is subjected to serial-to-parallel conversion by the input processing circuit 304, and the resulting signal is output as the video signal V301. The HDCP processing circuit 308 decrypts the encryption of the video signal V301, and outputs the resulting signal as the video signal V302. Because the output selection information C301 indicates an "HDMI port," the video signal selector 309 selects and outputs the video signal V302 as the video signal V304 to the monitor 310. Also, at time t311, HDCP authentication operation is started, and the authentication key K301 generated by the authentication key generation circuit 314 started to be output. After time t311, the authentication state is continued while the authentication key K301 is being updated based on VSYNC contained in the video signal V306.

At time t312, the pseudo-signal generation circuit 311 starts outputting the pseudo-video signal V305. At time t313, the output selection information C301 changes from "HDMI port" to "TV antenna." The input power control circuit 305 detects the change to "TV antenna" of the output selection information C301, and outputs "0" as the power control signal C303. As a result, the input processing circuit 304 transitions to the power-down state, and the HDCP decryption circuit 313 also transitions to the power-down state. Because the power control signal C303 is set to "0," the video signal selector 312 selects and outputs the pseudo-video signal V305 as the video signal V306.

At time t314, VSYNC of the pseudo-video signal V305 rises. The input power control circuit 305 detects the rise of the pseudo-video signal V305, and sets the power control signal C303 to "1." As a result, the input processing circuit 304 and the HDCP decryption circuit 313 transition to the power-on state. At time t315 (a predetermined period of time after time t314), the input power control circuit 305 sets the power control signal C303 back to "0." As a result, the input processing circuit 304 and the HDCP decryption circuit 313 transition back to the power-down state. At time t316, the external apparatus connected to the HDMI port 301 is disconnected, and the port connection information C302 is set to "0," and therefore, the video signal V301 becomes unstable. Moreover, the clock signal CK301 output from the HDMI port 301 is stopped, and therefore, the pseudo-video signal V305 output from the pseudo-signal generation circuit 311 is also stopped, and the video signal V306 output from the video signal selector 312 is also stopped. The input power control circuit 305 also detects that the port connection information C302 is "0," and sets the power control signal C303 to "0," and along with this, the input processing circuit 304 and the HDCP decryption circuit 313 transition to the power-down state.

Thus, according to this embodiment, even when the output selection information C301 does not indicates an "HDMI port," the pseudo-signal generation circuit 311 generates the pseudo-video signal V305, and based on the pseudo-video signal V305, the input power control circuit 305 regularly sets the power control signal C303 to "0" or "1." As a result, the video signal V306 can be output while the power consumption of the input processing circuit 304 and the HDCP decryption circuit 313 is minimized, and therefore, the HDCP authentication of the HDMI port 301 is continued. Therefore, it is no longer necessary to perform authentication again when the input selection information C301 is set back to an "HDMI port," and therefore, the time that it takes to display video on the monitor 310 can be reduced.

Figure 26:
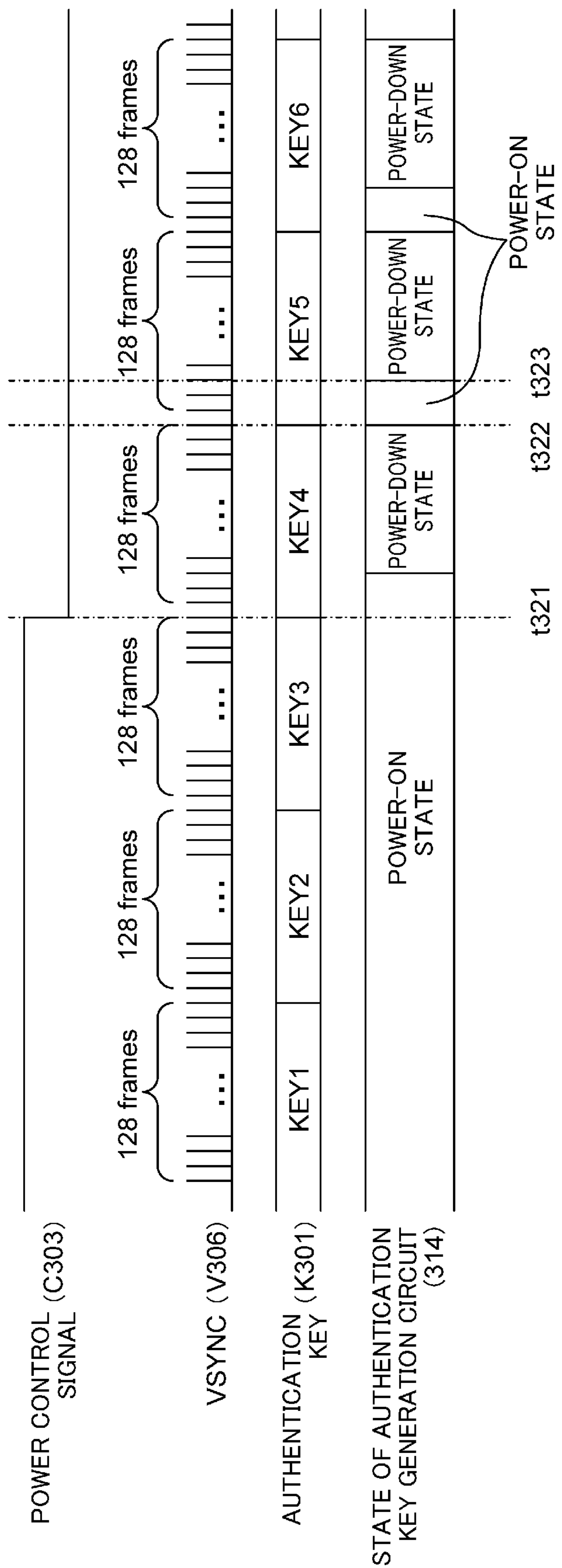
FIG. 26 is a timing chart for describing state transitions of an authentication key generation circuit which occur when HDMI ports for displaying are changed, in the video input device of the fifth embodiment.

FIG. 26 is a timing chart showing changes in VSYNC contained in the video signal V306, changes in the authentication key K301 generated by the authentication key generation circuit 314, and state transitions of the authentication key generation circuit 314. The authentication key generation circuit 314 generates an authentication key based on the video signal V306. Specifically, the authentication key is calculated based on VSYNC of the video signal V306, and the calculated authentication key is output as the authentication key K301 every 128 frames while VSYNC contained in the video signal V306 is being counted. While the power control signal C303 indicates "1," the authentication key is calculated in synchronization with VSYNC of the input video signal V306. After the power control signal C303 is set to "0" at time t321, the authentication key generation circuit 314 immediately calculates an authentication key for 128 frames. When the calculation of an authentication key for the 128 frames is ended (at time t322), the authentication key generation circuit 314 transitions to the power-down state. Thereafter, when the number of counts of VSYNC of the video signal V306 reaches 128 frames (at time t323), the authentication key generation circuit 314 transitions back to the power-on state, and outputs the calculated authentication key as the authentication key K301, and starts calculating an authentication key for the next 128 frames. Thus, when the power control signal C303 indicates "0," power consumption can be reduced by operating the authentication key generation circuit 314 intermittently.

Sixth Embodiment

Figure 27:
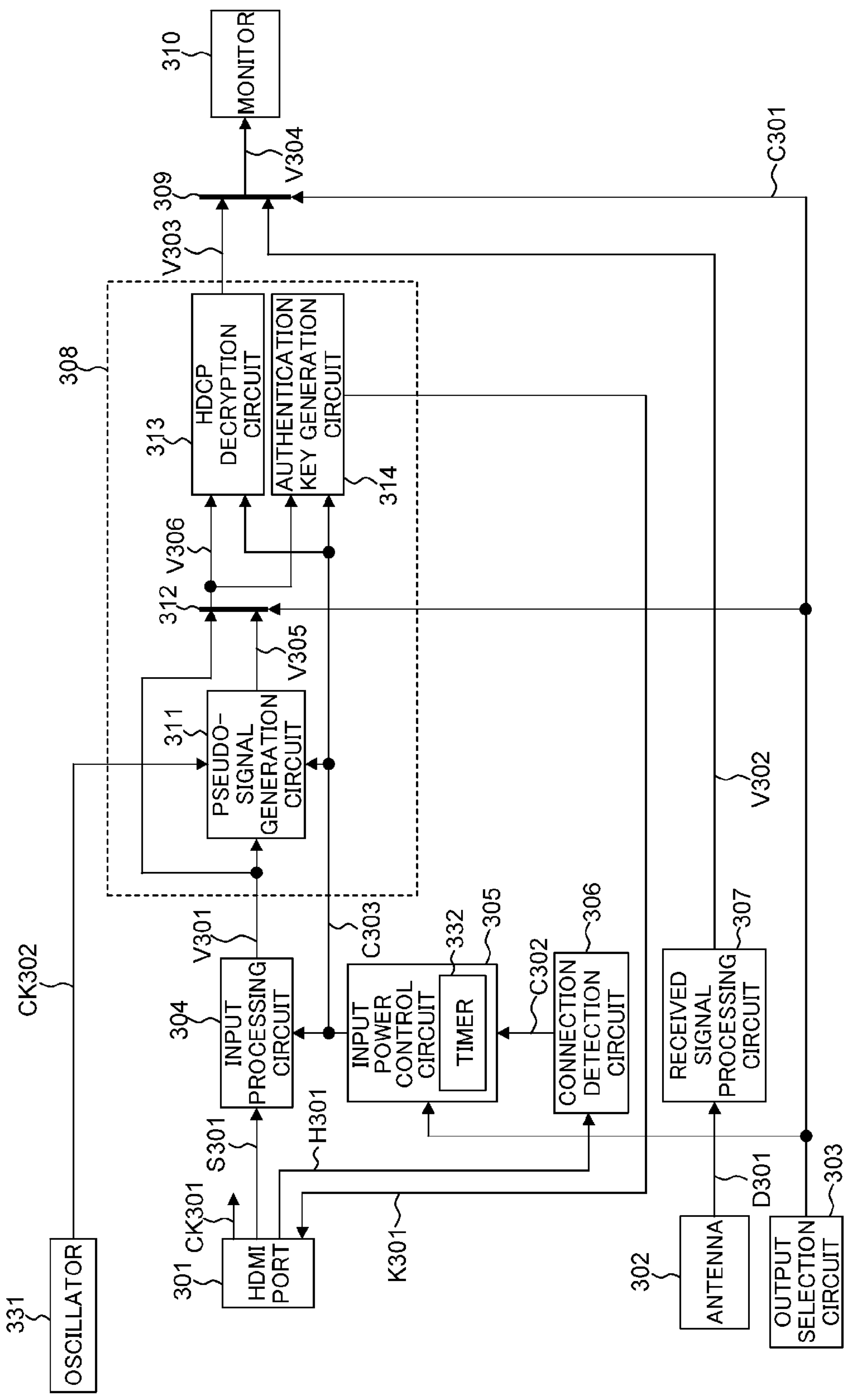
FIG. 27 is a block diagram showing an example configuration of a video input device according to a sixth embodiment.

FIG. 27 shows an example configuration of a video input device according to a sixth embodiment. In FIG. 27, the same parts as those of FIG. 22 are indicated by the same reference characters as those of FIG. 22 and will not be described here in detail. The configuration of FIG. 27 is different from that of FIG. 22 in that an oscillator 331 which outputs a clock signal CK302 oscillating at a predetermined frequency is provided, and the pseudo-signal generation circuit 311 of the HDCP processing circuit 308 receives the clock signal CK302 instead of the clock signal CK301 output from the HDMI port 301. Also, the input power control circuit 305 includes a timer 332 which measures an arbitrary period of time and outputs the measured value. The timer 332 is used to change the power control signal C303 with predetermined timing. Specifically, the input power control circuit 305 sets the power control signal C303 to "0" when the port connection information C302 is "0" (an external apparatus is not connected to the HDMI port 301), and to "1" when the port connection information C302 is "1" (an external apparatus is connected to the HDMI port 301), and the output selection information C301 indicates an "HDMI port." The input power control circuit 305 also sets the power control signal C303 to "0" or "1," depending on the timer 332, when the port connection information C302 is "1" and the output selection information C301 indicates a "TV antenna."

Figure 28:
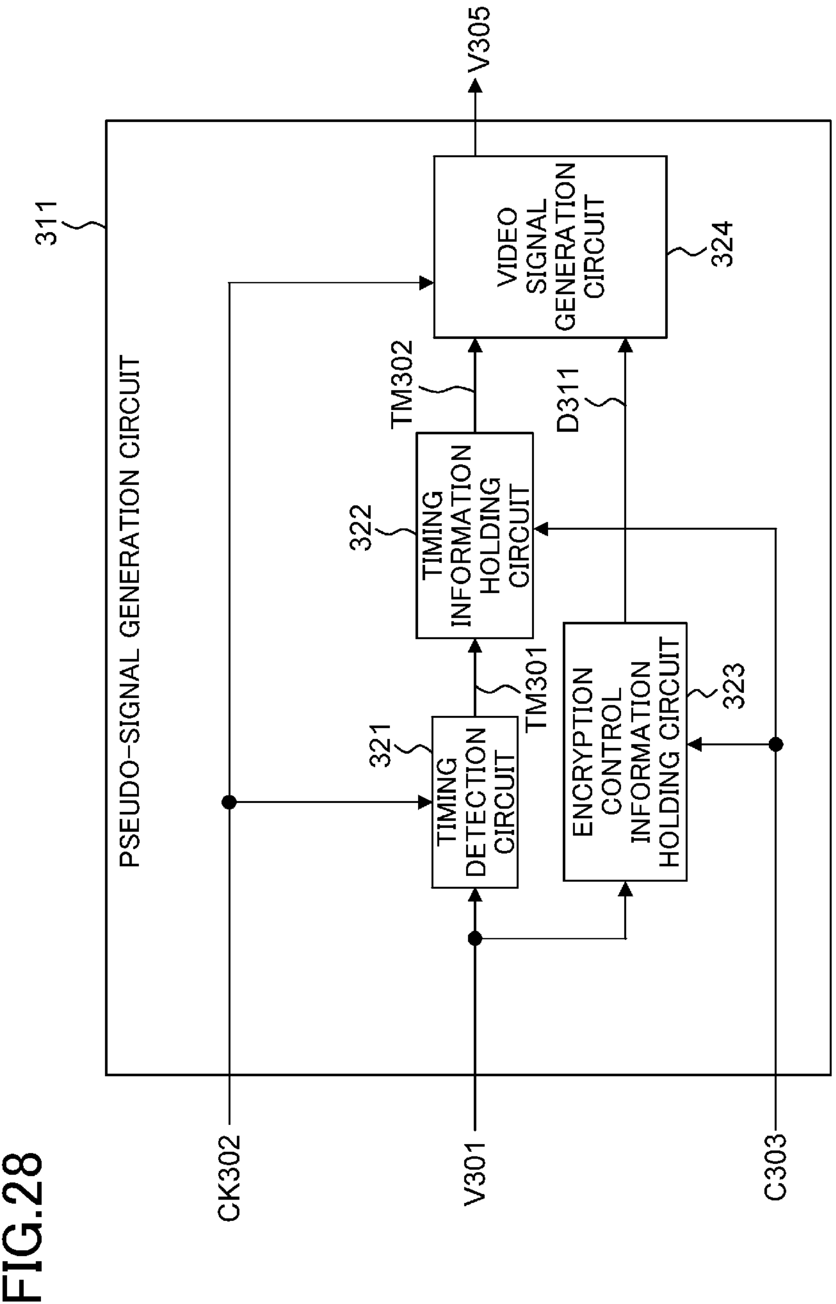
FIG. 28 is a block diagram showing an example configuration of a pseudo-signal generation circuit in the video input device of the sixth embodiment.

FIG. 28 shows an example configuration of the pseudo-signal generation circuit 311 of FIG. 27. In FIG. 28, the same parts as those of FIG. 23 are indicated by the same reference characters as those of FIG. 23 and will not be described here in detail. The configuration of FIG. 28 is different from that of FIG. 23 in that the clock signal CK302 output from the oscillator 331 is input to the timing detection circuit 321 and the video signal generation circuit 324. The other parts are similar to those of FIG. 23.

Figure 29:
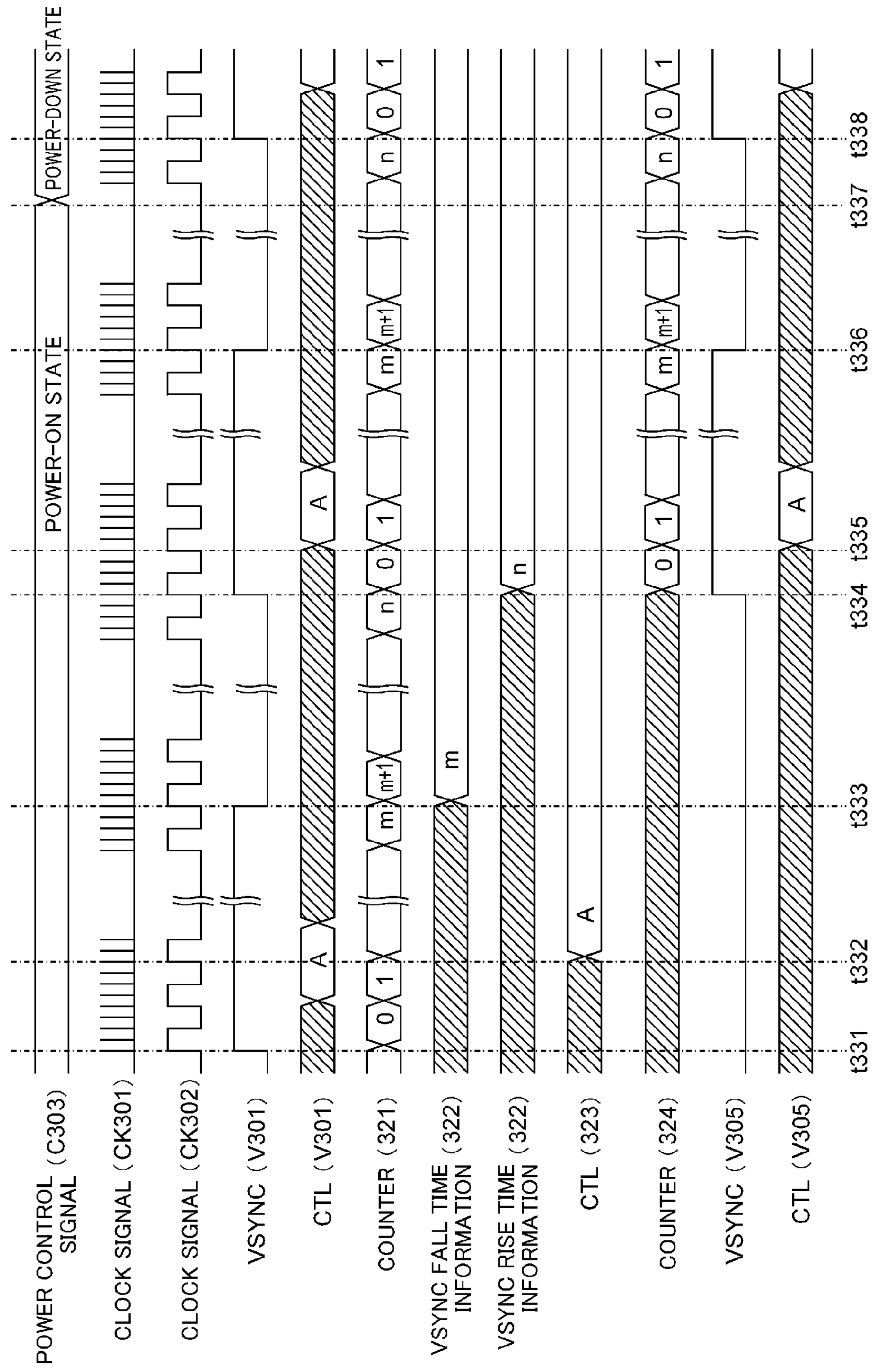
FIG. 29 is a timing chart for describing operation of the pseudo-signal generation circuit in the video input device of the sixth embodiment.

FIG. 29 is a timing chart for describing operation of the pseudo-signal generation circuit 311. This operation is similar to that of FIG. 24, except that the clock signal CK302 is used, and therefore, will not be described here in detail.

FIG. 30 is a timing chart for describing state transitions of the constituent circuits which occur when input ports (the HDMI port 301 and the TV antenna 302) through which a signal is output to the monitor are changed.

In FIG. 30, initially, the output selection information C301 indicates an "HDMI port." At this time, an external apparatus is not connected to the HDMI port 301, and the port connection information C302 is "0," and therefore, the input power control circuit 303 sets the power control signal C303 to "0," and the input processing circuit 304 and the HDCP decryption circuit 313 are in the power-down state. The timer 332 of the input power control circuit 305 outputs a predetermined interval T (ms). At time t341, an external apparatus is connected to the HDMI port 301, so that the signal H301 indicating the connection state of the HDMI port 301 is set to "1" and the port connection information C302 is set to "1," and therefore, a digital signal is input from the external apparatus via the HDMI port 301. The digital signal S301 received from the HDMI port 301 is subjected to serial-to-parallel conversion by the input processing circuit 304, and the resulting signal is output as the video signal V301. The HDCP processing circuit 308 decrypts the encryption of the video signal V301, and outputs the resulting signal as the video signal V302. Because the output selection information C301 indicates an "HDMI port," the video signal selector 309 selects and outputs the video signal V302 as the video signal V304 to the monitor 310. Also, at time t341, HDCP authentication operation is started, and the authentication key K301 generated by the authentication key generation circuit 314 starts to be output. After time t341, the authentication state is continued while the authentication key K301 is being updated based on VSYNC contained in the video signal V306.

At time t342, the pseudo-signal generation circuit 311 starts outputting the pseudo-video signal V305. At time t343, the output selection information C301 changes from an "HDMI port" to a "TV antenna." The input power control circuit 305 detects the change to a "TV antenna" of the output selection information C301, and outputs "0" as the power control signal C303. As a result, the input processing circuit 304 transitions to the power-down state, and the HDCP decryption circuit 313 also transitions to the power-down state. Because the power control signal C303 is set to "0," the video signal selector 312 selects and outputs the pseudo-video signal V305 as the video signal V306.

At time t344, based on the output of the timer 332, the input power control circuit 305 sets the power control signal C303 to "1." As a result, the input processing circuit 304 and the HDCP decryption circuit 313 transition to the power-on state. At time t345 (the predetermined interval T (ms) after time t344), the input power control circuit 305 sets the power control signal C303 back to "0." As a result, the input processing circuit 304 and the HDCP decryption circuit 313 transition back to the power-down state. At time t346, the external apparatus connected to the HDMI port 301 is disconnected, and the port connection information C302 is set to "0," and therefore, the video signal V301 becomes unstable. The input power control circuit 305 also detects that the port connection information C302 is "0," and sets the power control signal C303 to "0." Along with this, the video signal V305 output from the pseudo-signal generation circuit 311 is stopped, and the video signal V306 output from the video signal selector 312 is also stopped. The input processing circuit 304 and the HDCP decryption circuit 313 transition to the power-down state.

Thus, according to this embodiment, even when the output selection information C301 does not indicates an "HDMI port," the input power control circuit 305 regularly sets the power control signal C303 to "0" or "1" based on the timer 332 which outputs a time at predetermined intervals. As a result, the video signal V306 can be output while the power consumption of the input processing circuit 304 and the HDCP decryption circuit 313 is minimized, and therefore, the HDCP authentication of the HDMI port 301 is continued. Therefore, it is no longer necessary to perform authentication again when the output selection information C301 is set back to an "HDMI port," and therefore, the time that it takes to display video on the monitor 310 can be reduced.

Figure 31:
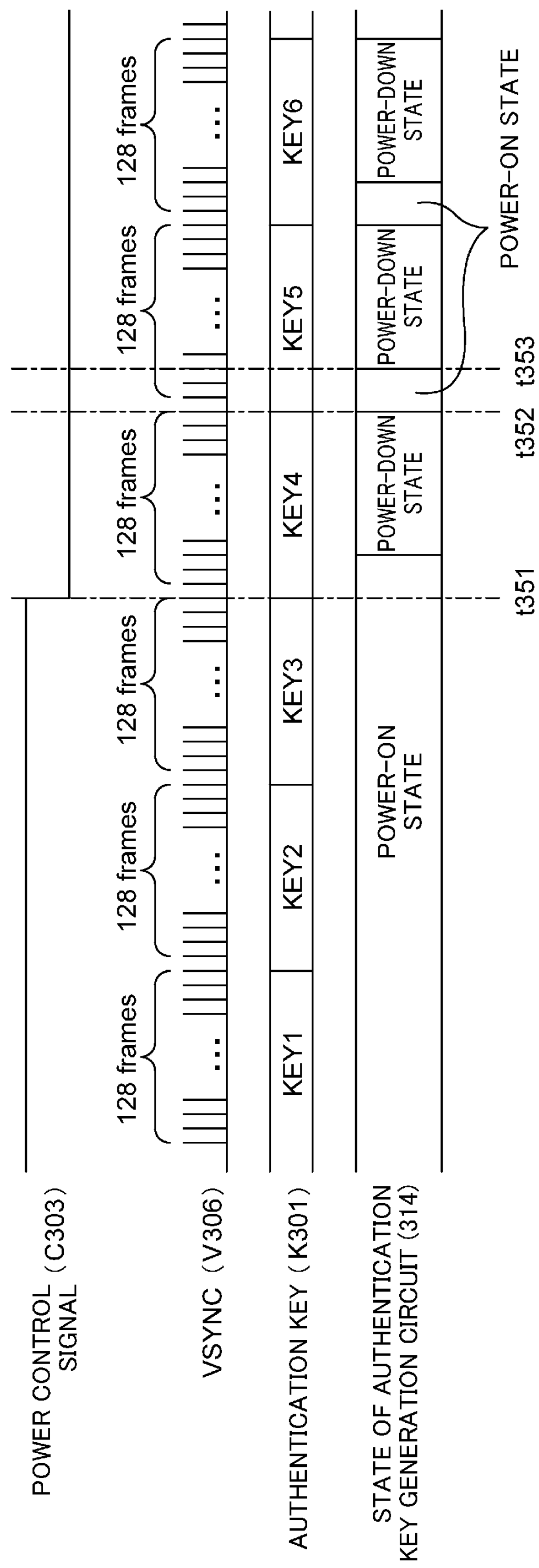
FIG. 31 is a timing chart for describing state transitions of an authentication key generation circuit which occur when HDMI ports for displaying are changed, in the video input device of the sixth embodiment.

FIG. 31 is a timing chart showing changes in VSYNC contained in the video signal V306, changes in the authentication key K301 generated by the authentication key generation circuit 314, and state transitions of the authentication key generation circuit 314. The authentication key generation circuit 314 generates an authentication key based on the video signal V306. Specifically, the authentication key is calculated based on VSYNC of the video signal V306, and the calculated authentication key is output as the authentication key K301 every 128 frames while VSYNC contained in the video signal V306 is being counted. While the power control signal C303 indicates "1," the authentication key is calculated in synchronization with VSYNC of the input video signal V306. After the power control signal C303 is set to "0" at time t351, the authentication key generation circuit 314 immediately calculates an authentication key for 128 frames. When the calculation of an authentication key for the 128 frames is ended (at time t352), the authentication key generation circuit 314 transitions to the power-down state. Thereafter, when the number of counts of VSYNC of the video signal V306 reaches 128 frames (at time t353), the authentication key generation circuit 314 transitions back to the power-on state, and outputs the calculated authentication key as the authentication key K301, and starts calculating an authentication key for the next 128 frames. Thus, when the power control signal C303 indicates "0," power consumption can be reduced by operating the authentication key generation circuit 314 intermittently.

Seventh Embodiment

FIG. 32 shows an example configuration of a video display system according to a seventh embodiment. In FIG. 32, the video display system includes video playback devices 401 and 402 and a video display device 403. The video playback device 401 includes a storage medium 404, an AV signal processing circuit 405, an HDCP encryption circuit (encryption circuit) 406, an HDCP authentication circuit (authentication circuit) 407, an output control circuit 408, a consumer electronics control (CEC) control circuit (transmission control information communication section) 409, and an HDMI port (transmission interface section) 410. The video display device 403 includes HDMI ports (reception interface sections) 411 and 412, an input selection circuit 413, an input signal selector 414, an input processing circuit 415, HDCP processing circuits (decryption circuits) 416 and 417, a CEC control circuit (reception control information communication section) 418, a video signal selector 419, and a monitor 420.

The circuits of the video playback device 401 will be described. Note that the video playback device 402 is assumed to have a configuration similar to that of the video playback device 401. The storage medium 404 stores video contents compressed using MPEG2 etc. The stored video contents are output as video data M401. The AV signal processing circuit 405 performs signal processing, such as a decoding process etc., on the compressed video data M401 read from the storage medium 404, and outputs the resulting signal as a video signal V401. The AV signal processing circuit 405 also outputs video format information 1401 of the video signal V401 to be transmitted. The HDCP encryption circuit 406 performs an HDCP encryption process on the video signal V401, and outputs the resulting signal as a video signal V402. The output control circuit 408 performs signal processing, such as parallel-to-serial conversion conforming to the HDMI standard etc., on the video signal V402, and outputs the resulting signal as a digital signal S401. The HDMI port 410 is used to connect to the video display device 403 via an HDMI cable, and transmit the digital signal S401 via a transition minimized differential signaling (TMDS) data line, write or read HDCP-related information (including an authentication key) to or from the video display device 403 via a display data channel (DDC) line, and communicates via the CEC line. The HDCP authentication circuit 407 performs HDCP authentication on the video display device 403, i.e., compares the authentication key read from the HDMI port 410 with an authentication key generated by itself to confirm the authentication state. The CEC control circuit 409 transmits the video format information 1401 via a CEC communication line L401 in a manner conforming to the CEC transmission scheme.

Next, the video display device 403 will be described. The HDMI port 411 (412) is used to connect to the video playback device 401 (402) via an HDMI cable, and receive a digital signal from a TMDS data line, write or read HDCP-related information (including an authentication key) to or from the video playback device 401 (402) via a DDC line, and perform communication via a CEC line. A digital signal received from the HDMI port 411 (412) is output as a digital signal S402 (S403). The input selection circuit 413 outputs input selection information C401 for selecting one of the video signals received from the HDMI ports 411 and 412. The input signal selector 414 selects and outputs, based on the input selection information C401, one of the digital signals S402 and S403 received from the HDMI ports 411 and 412, as a digital signal S404. The input processing circuit 415 performs a serial-to-parallel conversion process conforming to the HDMI standard on the input digital signal S404, and outputs the resulting signal as a video signal V403. The HDCP processing circuit 416 (417) decrypts the encryption of the video signal V403, and outputs the resulting signal as a video signal V404 (V405), and also generates and outputs an authentication key K402 (K403) required for HDCP authentication. The video signal selector 419 selects and outputs, based on the input selection information C401, one of the video signals V404 and V405 which have been output by the HDCP processing circuits 416 and 417 decrypting the encryption of the video signal V403, as a video signal V406. The monitor 420 displays the input video signal V406. The CEC control circuit 418 performs communication via CEC communication lines L402 and L403 in a manner conforming to the CEC transmission scheme, and outputs video format information 1402 and 1403 which are video signals received from the video playback devices 401 and 402.

FIG. 33 shows an example configuration of the HDCP processing circuit 416 (417) of FIG. 32. The HDCP processing circuit 416 (417) includes a pseudo-signal generation circuit 421, a second video signal selector 422, an HDCP decryption circuit (video decryption circuit) 423, and an authentication key generation circuit 424. The pseudo-signal generation circuit 421 includes a timing detection circuit 425, a timing information holding circuit 426, an encryption control information holding circuit 427, a video signal generation circuit 428, a video signal generation circuit 429, a video parameter storage memory 430, and a video signal selector 431.

The pseudo-signal generation circuit 421 generates and outputs a pseudo-video signal V413 based on the video format information 1402 (1403), the video signal V403, and a clock signal CK401 (CK402). The video signal selector 422 selects the video signal V403 when, in the HDCP processing circuit 416 (417), the input selection information C401 indicates the HDMI port 411 (Port 0) (the HDMI port 412 (Port 1)), and the pseudo-video signal V413 when the input selection information C401 indicates Port 1 (Port 0), and outputs the selected signal as a video signal V414. The HDCP decryption circuit 423 decrypts the encryption of the video signal V414, and outputs the resulting signal as the video signal V404 (V405). The authentication key generation circuit 424 generates and outputs the authentication key K402 (K403) based on the video signal V414.

Next, the pseudo-signal generation circuit 421 will be described. The timing detection circuit 425 detects the operation timing of the video signal V403 based on the clock signal CK401 (CK402) to output timing information TM401. Here, the timing information TM401 contains VSYNC rise time information indicating a time when a vertical synchronization signal (VSYNC) contained in the video signal V403 rises, and VSYNC fall time information indicating a time when VSYNC falls. The timing information holding circuit 426 holds the timing information TM401 based on the input selection information C401, and outputs the timing information TM401 as timing information TM402. The timing information holding circuit 426 also sets an information storage completion signal C402 to "1" when holding timing information, and to "0" when not holding timing information. The encryption control information holding circuit 427 holds encryption control information (CTL) contained in the video signal V403 based on the input selection information C401, and outputs the encryption control information (CTL) as encryption control information D401. The video signal generation circuit 428 generates a video signal based on the clock signal CK401 (CK402), the timing information TM402, and the encryption control information D401, and outputs the video signal as a pseudo-video signal V411.

The timing information holding circuit 426 and the encryption control information holding circuit 427, when the input selection information C401 indicates the corresponding port, update the held information based on input information, and otherwise, continue to hold the held information without any change. Specifically, the timing information holding circuit 426 and the encryption control information holding circuit 427 in the HDCP processing circuit 416 (417), when the input selection information C401 indicates Port 0 (Port 1), hold input information, and when the input selection information C401 indicates Port 1 (Port 0), continue to hold the information which has been held when the input selection information C401 has indicated Port 0 (Port 1).

In the HDCP processing circuit 416 (417), the video parameter storage memory 430 stores predetermined video parameter information. The second video signal generation circuit 429 reads video parameter information 1404 corresponding to the video format information 1402 (1403) from the video parameter storage memory 430, and generates and outputs a video signal V412 based on the clock signal CK401 (CK402). The third video signal selector 431 selects the pseudo-video signal V411 when the information storage completion signal C402 is "1," and the video signal V412 when the information storage completion signal C402 is "0," and outputs the selected signal as a video signal V413.

Figure 34:
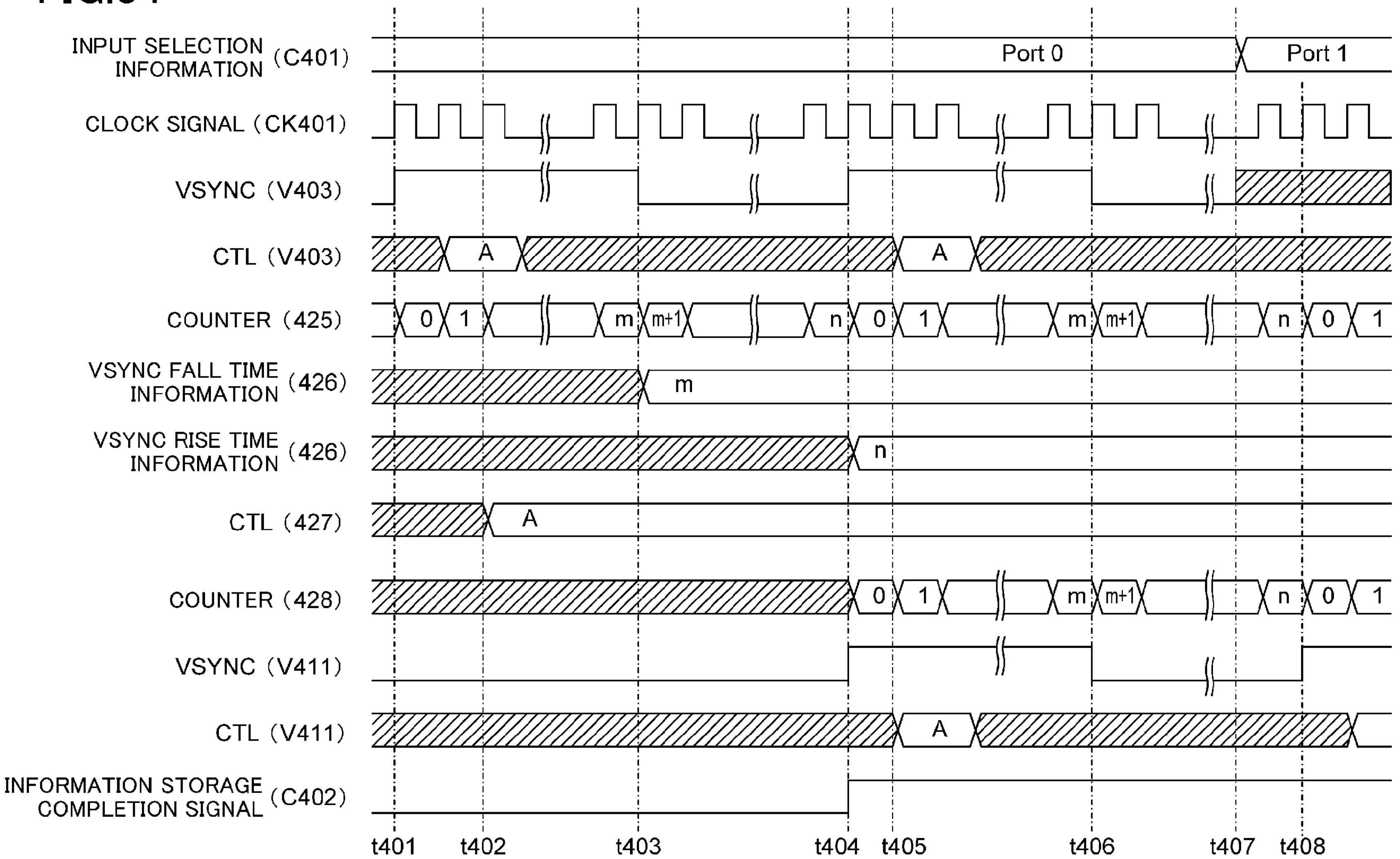
FIG. 34 is a block diagram showing an example configuration of a pseudo-signal generation circuit in the video display device of the video display system of the seventh embodiment.

FIG. 34 is a timing chart for describing operation of the pseudo-signal generation circuit 421 in the HDCP processing circuit 416. Note that operation of the pseudo-signal generation circuit 421 in the HDCP processing circuit 417 is similar to this.

In the operation timing of FIG. 34, initially, the input selection information C401 indicates "Port 0." The timing detection circuit 425, when receiving the video signal V403, detects the timing of VSYNC contained in the video signal V403 in synchronization with the clock signal CK401. At time t401, VSYNC rises, and the timing detection circuit 425 activates the internal counter to start timing detection. At time t402, CTL which is encryption control information contained in the video signal V403 is set to an arbitrary value "A," and the encryption control information holding circuit 427 captures and holds the value "A" indicated by CTL. The value of CTL is captured with timing which is previously determined relative to VSYNC. Next, at time t403, VSYNC falls, and a value "m" indicated by the internal counter of the timing detection circuit 425 at this time is output as the timing information TM401, and is held as VSYNC fall time information in the timing information holding circuit 426. At time t404, VSYNC rises, and a value "n" indicated by the internal counter of the timing detection circuit 425 at this time is output as the timing information TM401, and is held as VSYNC rise time information in the timing information holding circuit 426. Also, at this time, the value of the internal counter of the timing detection circuit 425 is cleared to "0" in synchronization with the rise of VSYNC contained in the video signal V403 The timing information holding circuit 426 also sets the information storage completion signal C402 to "1" when holding the VSYNC rise time information.

The video signal generation circuit 428 generates the pseudo-video signal V411 based on the timing information TM402 (containing the VSYNC fall time information and the VSYNC rise time information) held in the timing information holding circuit 426, the encryption control information (CTL) held in the encryption control information holding circuit 427, and the clock signal CK401. At time t404, the VSYNC rise time information is output, so that all information items required for generation of the pseudo-video signal V411 have been obtained, and therefore, the video signal generation circuit 428 activates the internal counter to start generating the pseudo-video signal V411 in synchronization with the clock signal CK401. At time t405, the video signal generation circuit 428 outputs a value indicated by the encryption control information D401 (CTL) as CTL contained in the pseudo-video signal V411. The output timing of CTL is previously determined relative to VSYNC contained in the pseudo-video signal V411. At time t406, the counter value of the video signal generation circuit 428 is equal to the VSYNC fall time information contained in the timing information TM402, and therefore, VSYNC contained in the pseudo-video signal V411 falls. At time t408, the counter value of the video signal generation circuit 428 is equal to the VSYNC rise time information contained in the timing information TM402, and therefore, VSYNC contained in the pseudo-video signal V411 rises. At time t407, the input selection information C401 changes from "Port 0" to "Port 1," and therefore, after time t407, the information held in the timing information holding circuit 426 and the information held in the encryption control information holding circuit 427 continue to be held without any change. Therefore, even after time t407, the pseudo-signal generation circuit 421 continues to generate the pseudo-video signal V411 which operates with predetermined timing.

Figure 35:
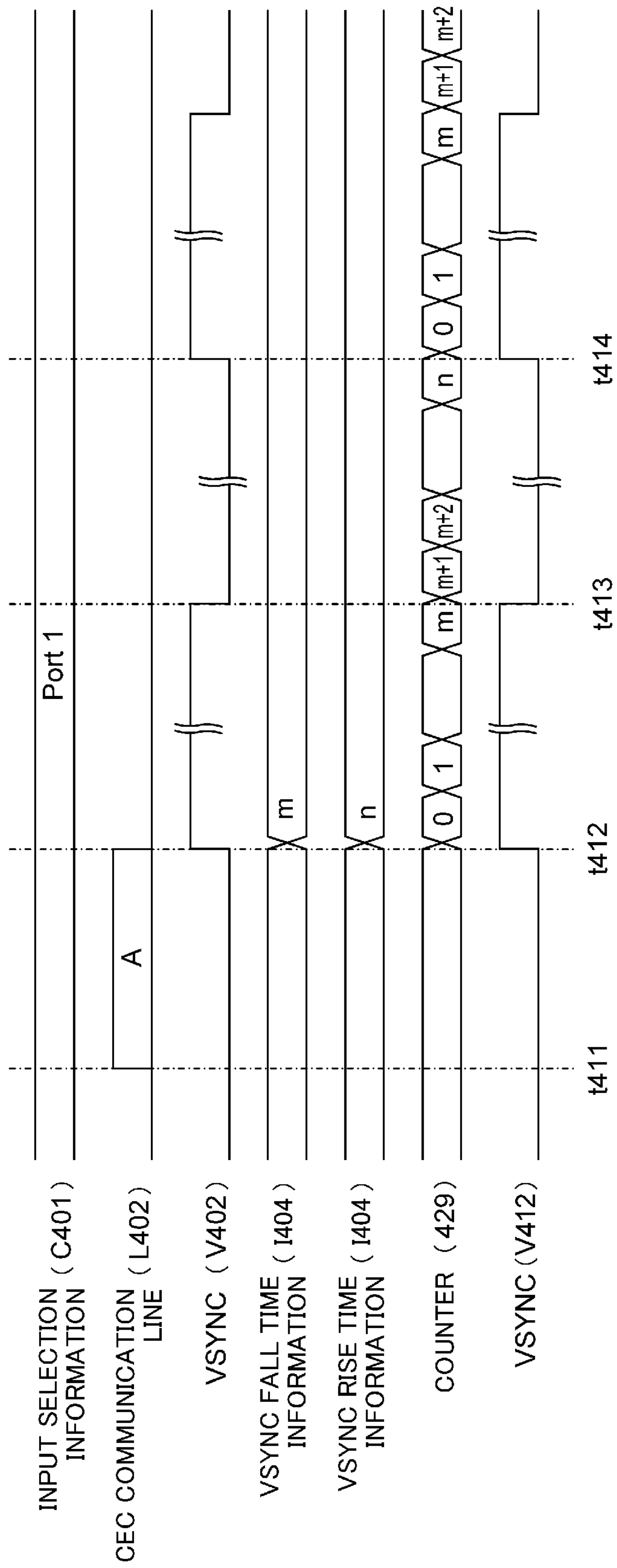
FIG. 35 is a block diagram showing an example configuration of a video signal generation circuit in the video display device of the video display system of the seventh embodiment.

FIG. 35 is a timing chart for describing operation of the video signal generation circuit 429 in the pseudo-signal generation circuit 421. Here, as an example, operation of the pseudo-signal generation circuit 421 in the HDCP processing circuit 416 is shown.

In the operation timing of FIG. 35, initially, the input selection information C401 indicates "Port 1." At this time, it is assumed that the video playback device 401 is not transmitting a video signal to the HDMI port 411 (Port 0). At time t411, the video playback device 401 transmits information about a video format to be transmitted, via CEC, so that reception of the video format information "A" via the CEC communication line L402 is started. At time t412, the reception of the video format information "A" via the CEC communication line L402 is completed, and the received video format information "A" is input as the video format information 1402 from the CEC control circuit 418 to the video signal generation circuit 429. At this time, the video signal generation circuit 429 reads, from the video parameter storage memory 430, the video parameter information 1404 corresponding to the information "A" indicated by the video format information 1402. Thereafter, the internal counter of the video signal generation circuit 429 starts operating, and the video signal generation circuit 429 starts generating the video signal V412 based on the video parameter information 1404. Here, as an example, the video parameter information 1404 contains VSYNC falling information and VSYNC rising information. The video parameter information 1404 corresponding to the video format information "A" includes "m" as the VSYNC rise time information and "n" as the VSYNC rise time information.

At time t413, the internal counter of the video signal generation circuit 429 becomes "m," which is equal to the VSYNC fall time information "m," and therefore, VSYNC contained in the video signal V412 falls. At time t414, the internal counter of the video signal generation circuit 429 becomes "n," which is equal to the VSYNC rise time information "n," and therefore, VSYNC contained in the video signal V412 rises. At this time, the value of the internal counter is reset to "0."

Figure 36:
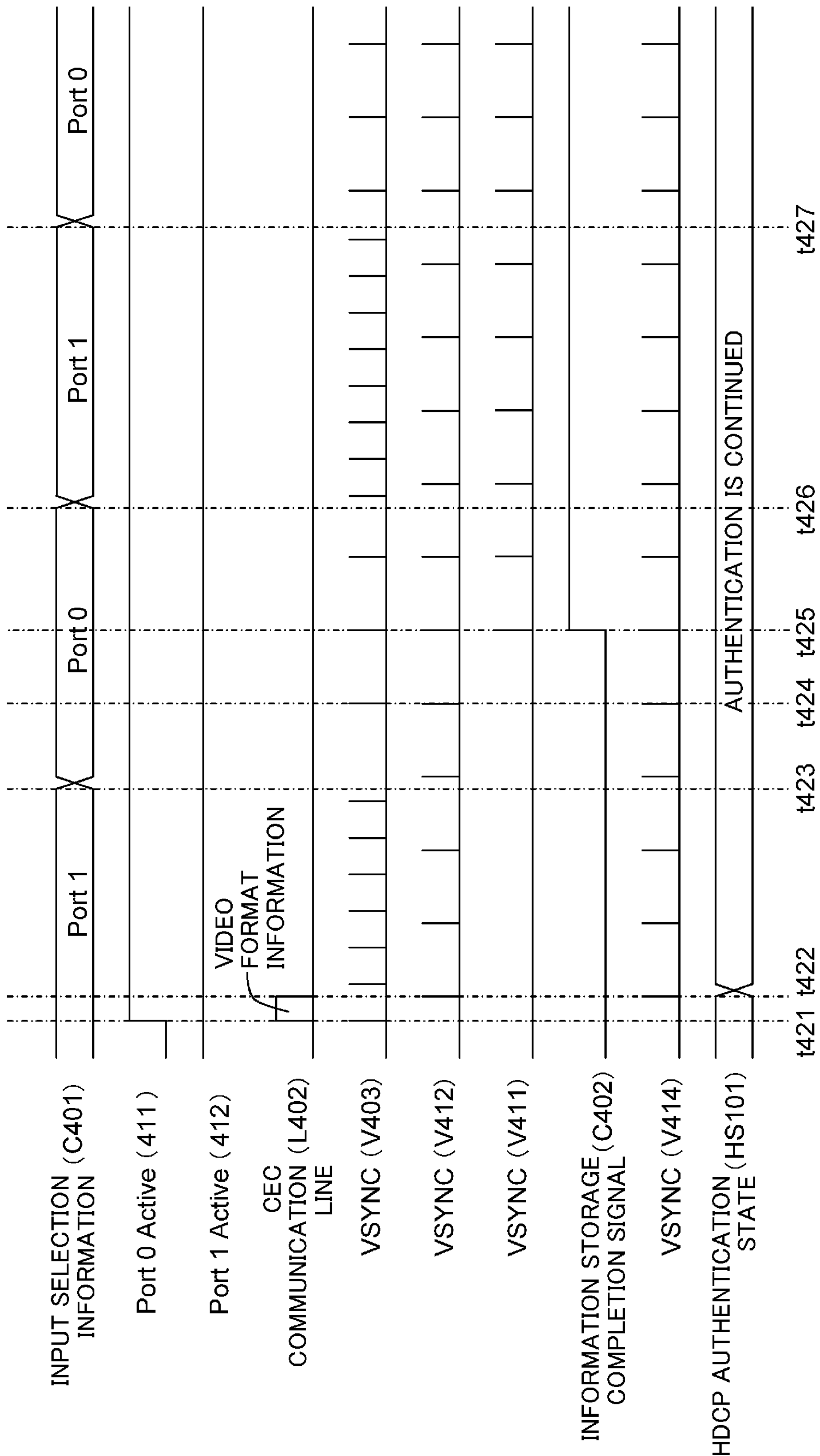
FIG. 36 is a timing chart for describing operation of the video display device of the video display system of the seventh embodiment when input ports for displaying are changed.
Figure 37:
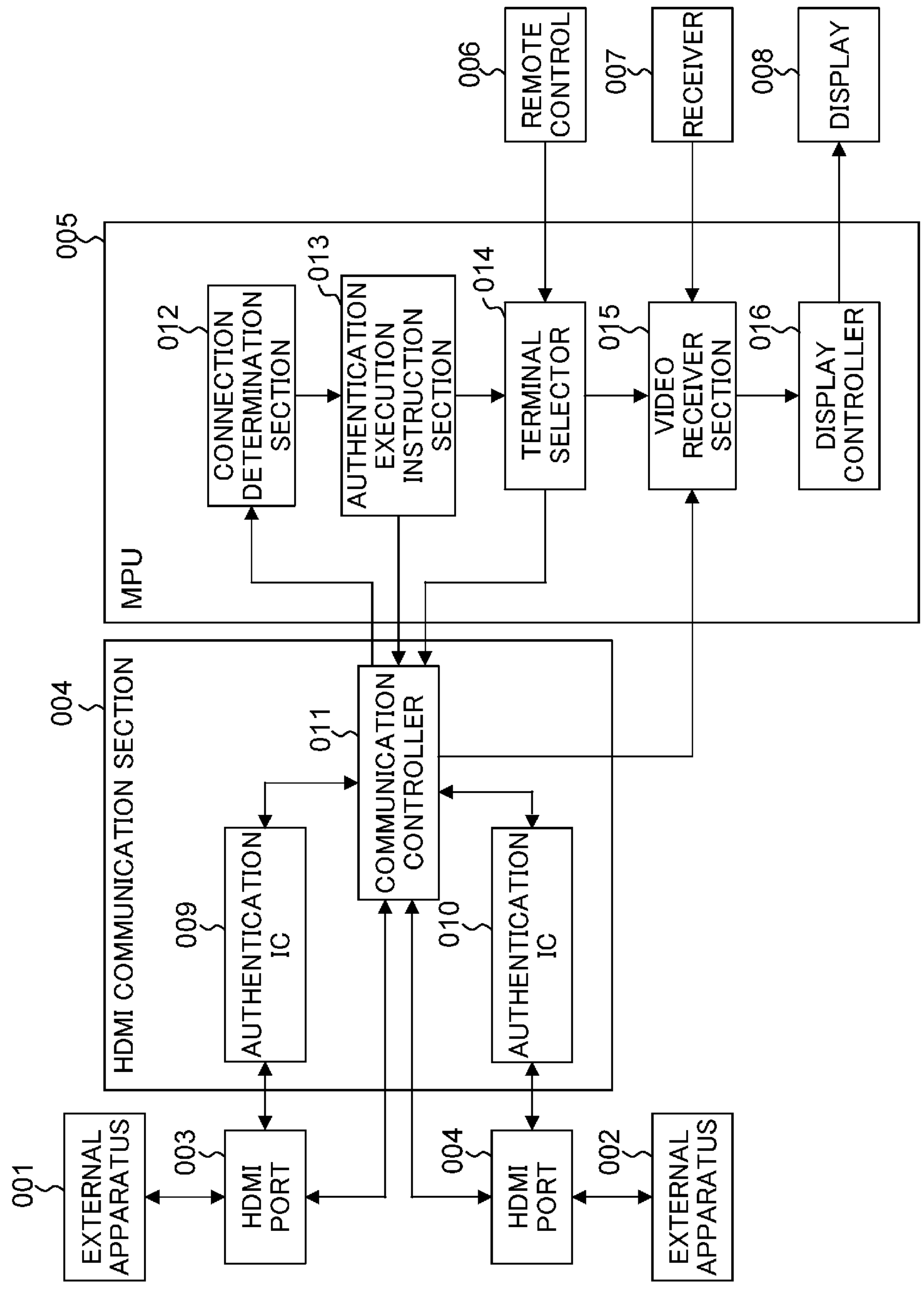
FIG. 37 is a block diagram showing an example configuration of a conventional video receiver.

FIG. 36 is a timing chart for describing state transitions of the constituent circuits which occur when the HDMI ports for outputting a signal to the monitor are changed. Here, as an example, the HDCP authentication state of the HDMI port 411 will be described.

In the operation timing of FIG. 36, initially, the input selection information C401 indicates "Port 1." At time t421, an external apparatus is connected to the HDMI port 411, and a digital signal is input from the external apparatus via the HDMI port 411. Because the input selection information C401 indicates "Port 1," the input signal selector 414 selects and outputs the digital signal S403 output by the HDMI port 412, as the digital signal S404. The HDCP processing circuit

416 receives the video signal V403 which has been obtained by serial-to-parallel conversion in the input processing circuit 415. Here, video format information is transmitted from the video playback device 401 via the CEC line, and the CEC control circuit 418 starts receiving the video format information via the CEC communication line L402.

At time t422, the reception of the video format information via the CEC communication line L402 is completed, and the CEC control circuit 418 outputs the video format information 1402, and the video signal generation circuit 429 of the pseudo-signal generation circuit 421 generates the video signal V412. At this time, the timing information holding circuit 426 does not store video timing information, and therefore, the information storage completion signal C402 is "0," and the video signal selector 431 selects and outputs the video signal V412 as the video signal V413. Because the input selection information C401 indicates "Port 1," the video signal selector 422 selects and outputs the video signal V413 as the video signal V414. Thus, the video signal generated by the video signal generation circuit 429 is input to the authentication key generation circuit 424. The authentication key generation circuit 424 generates an authentication key based on the input video signal V414, and outputs the generated authentication key as the authentication key K402. The video playback device 401 uses the authentication key K402 to determine the HDCP authentication state.

At time t423, the input selection information C401 is set to "Port 0." Along with this, the input signal selector 414 selects and outputs the digital signal S402 received via the HDMI port 411 (Port 0), as the digital signal S404, and the input processing circuit 415 performs serial-to-parallel conversion on the digital signal S404, and outputs the resulting signal as the video signal V403. Because the input selection information C401 indicates "Port 0," the video signal selector 422 of the HDCP processing circuit 416 selects and outputs the video signal V403 as the video signal V414. The HDCP decryption circuit 423 decrypts the encryption of the video signal V414 to output the video signal V404. Because the input selection information C401 indicates "Port 0," the video signal selector 419 selects and outputs the video signal V404 output from the HDCP processing circuit 416, as the video signal V406, to the monitor 420.

At time t424, VSYNC contained in the video signal V403 rises, and the timing detection circuit 425 of the pseudo-signal generation circuit 421 starts operating. At time t425, VSYNC of the video signal V403 rises again, and the timing information holding circuit 426 sets the information storage completion signal C402 to "1," which indicates that video signal timing information has been stored, and the video signal generation circuit 428 starts generating a video signal. Because the information storage completion signal C402 is "1," the video signal selector 431 selects and outputs the pseudo-video signal V411 as the video signal V413.

At time t426, the input selection information C401 is set to "Port 1." The input signal selector 414 selects and outputs the digital signal S403 received from the HDMI port 412, as the digital signal S404. The HDCP processing circuit 417 decrypts the encryption of the video signal V403 which has been obtained by serial-to-parallel conversion in the input processing circuit 415, and outputs the resulting signal as the video signal V406 via the video signal selector 419 to the monitor 420. At this time, in the HDCP processing circuit 416, the video signal selector 431 selects the video signal V411, and the video signal selector 422 selects and outputs the video signal V413 as the video signal V414, and therefore, the authentication key generation circuit 424 generates an authentication key based on the video signal generated by the video signal generation circuit 428. As a result, HDCP authentication is continued.

At time t427, the input selection information C401 is set back to "Port 0." Before time t427, the HDCP authentication state has been continued, and therefore, the digital signal S404 output by the input signal selector 414 is changed to the digital signal S402, and the video signal V406 output by the video signal selector 419 is changed to the video signal V404, and the video signal V406 is input to the monitor 420. At this time, it is no longer necessary to perform HDCP authentication again, and therefore, the time that it takes to display video when HDMI ports are changed can be reduced.

According to the present disclosure, a low-cost and low-power consumption configuration can be used to reduce the time that it takes to display a signal when digital video signals etc. to be displayed are changed. Therefore, the present disclosure is effective to reduce cost and display waiting time of, for example, a video receiver apparatus, such as a TV set etc.

What is claimed is:

1. A video input device which includes a predetermined number of two or more reception interface sections configured to receive a digital signal conforming to a predetermined digital interface standard, the digital signal having been obtained from an encrypted video signal, and selects and decrypts one of the digital signals received via the predetermined number of reception interface sections, and outputs the decrypted signal, the device comprising:

- an input selection circuit configured to output input selection information for selecting one of the predetermined number of reception interface sections;
- an input signal selector configured to select and output one of the digital signals input via the predetermined number of reception interface sections, based on the input selection information;
- an input processing circuit configured to decode the digital signal output from the input signal selector to output a video signal;
- a plurality of decryption circuits, one decryption circuit for each of the predetermined number of reception interface sections, each configured to decrypt encryption of the video signal output from the input processing circuit and output the decrypted video signal, and generate and send an authentication key of the encryption to the reception interface section; and
- a video signal selector configured to select and output one of the video signals output from the plurality of decryption circuits, based on the input selection information, wherein the plurality of decryption circuits each include

- a pseudo-signal generation circuit configured to extract information from the video signal output from the input processing circuit, and based on the extracted information, generate and output a pseudo-video signal,
- a second video signal selector configured to select and output one of the video signal output from the input processing circuit and the pseudo-video signal output from the pseudo-signal generation circuit, based on the input selection information,
- an authentication key generation circuit configured to generate and output an authentication key based on the video signal output from the second video signal selector, and
- a video decryption circuit configured to decrypt encryption of the video signal output from the second video signal selector, and output the decrypted video signal.

2. The video input device of claim 1, wherein the pseudo-signal generation circuit includes

- a timing detection circuit configured to obtain timing information of the video signal output from the input processing circuit, a timing information holding circuit configured to store the timing information output from the timing detection circuit, based on the input selection information, an encryption control information holding circuit configured to obtain encryption control information contained in the video signal output from the input processing circuit, and store the encryption control information based on the input selection information, and a video signal generation circuit configured to generate the pseudo-video signal based on the encryption control information output from the encryption control information holding circuit and the timing information output from the timing information holding circuit.

3. The video input device of claim 1, further comprising:

an oscillator configured to generate and output a clock signal oscillating at a predetermined period, wherein the pseudo-signal generation circuit operates based on the clock signal output from the oscillator.

4. The video input device of claim 1, wherein the plurality of decryption circuits are controlled to a power-down state based on the input selection information.

5. The video input device of claim 1, wherein the authentication key generation circuit is controlled to a power-down state based on the input selection information and the selection result of the second video signal selector.

6. The video input device of claim 1, further comprising:

a connection detection circuit configured to detect whether or not a video playback device is connected to each of the predetermined number of reception interface sections, wherein the input processing circuit is controlled to a power-down state based on the input selection information and the detection result of the connection detection circuit.

7. A video input device which includes a predetermined number of three or more reception interface sections configured to receive a digital signal conforming to a predetermined digital interface standard, the digital signal having been obtained from an encrypted video signal, and selects and decrypts one of the digital signals received via the predetermined number of reception interface sections, and outputs the decrypted signal, the device comprising:

an output video selection circuit configured to output output selection information for selecting one of the predetermined number of reception interface sections;

an input selection circuit configured to output input selection information for selecting one of the predetermined number of reception interface sections;

a first input signal selector configured to select and output one of the digital signals input via the predetermined number of reception interface sections, based on the output selection information;

a second input signal selector configured to select and output one of the digital signals input via the predetermined number of reception interface sections, based on the input selection information;

a first input processing circuit configured to decode the digital signal output from the first input signal selector to output a video signal;

a second input processing circuit configured to decode the digital signal output from the second input signal selector to output a video signal;

a plurality of decryption circuits, one decryption circuit for each of the predetermined number of reception interface sections, each configured to decrypt encryption of the video signal output from the first or second input processing circuit and output the decrypted video signal, and generate and send an authentication key of the encryption to the reception interface section; and a video signal selector configured to select and output one of the video signals output from the plurality of decryption circuits, based on the output selection information, wherein the plurality of decryption circuits each include a pseudo-signal generation circuit configured to extract information from the video signal output from the first or second input processing circuit, and based on the extracted information, generate and output a pseudo-video signal, a second video signal selector configured to select and output one of the video signal output from the second input processing circuit and the pseudo-video signal output from the pseudo-signal generation circuit, based on the input selection information, a third video signal selector configured to select and output one of the video signal output from the first input processing circuit and the video signal output from the second video signal selector, based on the output selection information, an authentication key generation circuit configured to generate and output an authentication key based on the video signal output from the third video signal selector, and a video decryption circuit configured to decrypt encryption of the video signal output from the third video signal selector, and output the decrypted video signal.

8. The video input device of claim 7, wherein the pseudo-signal generation circuit includes a fourth video signal selector configured to select one of the video signal output from the first input processing circuit and the video signal output from the second input processing circuit, based on the output selection information, a timing detection circuit configured to obtain timing information of the video signal output from the fourth video signal selector, a timing information holding circuit configured to store the timing information output from the timing detection circuit, based on the output selection information and the input selection information, an encryption control information holding circuit configured to obtain encryption control information contained in the video signal output from the fourth video signal selector, and store the encryption control information based on the output selection information and the input selection information, and a video signal generation circuit configured to generate the pseudo-video signal based on the encryption control information output from the encryption control information holding circuit and the timing information output from the timing information holding circuit.

9. The video input device of claim 7, further comprising:

an oscillator configured to generate and output a clock signal oscillating at a predetermined period, wherein the pseudo-signal generation circuit operates based on the clock signal output from the oscillator.

10. The video input device of claim 7, wherein the plurality of decryption circuits are controlled to a power-down state based on the output selection information.

11. The video input device of claim 7, wherein the authentication key generation circuit is controlled to a power-down state based on the output selection information and the selection result of the third video signal selector.

12. The video input device of claim 7, further comprising: a connection detection circuit configured to detect whether or not a video playback device is connected to each of the predetermined number of reception interface sections, wherein the first input processing circuit is controlled to a power-down state based on the output selection information and the detection result of the connection detection circuit, and the second input processing circuit is controlled to a power-down state based on the input selection information and the detection result of the connection detection circuit.

13. The video input device of claim 7, wherein the input selection circuit includes a timer, and regularly changes the input selection information based on time information output from the timer.

14. A video input device which includes a reception interface section configured to receive a digital signal conforming to a predetermined digital interface standard, the digital signal having been obtained from an encrypted video signal, and a predetermined number of video signal receivers configured to receive a video signal from a transmission path, and selects and outputs one of the digital signal received via the reception interface section and the video signals received via the predetermined number of video signal receivers, the device comprising:

an output selection circuit configured to output output selection information for selecting output video;

an input processing circuit configured to decode the digital signal input via the reception interface section to output a video signal;

an input power control circuit configured to output power control information for controlling whether or not to cause the input processing circuit to be in a power-down state;

a decryption circuit configured to decrypt encryption of the video signal output from the input processing circuit and output the decrypted video signal, and generate and send an authentication key of the encryption to the reception interface section;

a received signal processing circuit provided for each of the predetermined number of video signal receivers, and configured to perform signal processing, such as a decoding process or the like, on a received signal to output a video signal, and a video signal selector configured to select and output one of the video signal output from the decryption circuit and the video signal output from the received signal processing circuit, based on the output selection information, wherein the decryption circuit includes a pseudo-signal generation circuit configured to extract information from the video signal output from the input processing circuit, and based on the extracted information, generate and output a pseudo-video signal, a second video signal selector configured to select and output one of the video signal output from the input processing circuit and the pseudo-video signal output from the pseudo-signal generation circuit, based on the output selection information, an authentication key generation circuit configured to generate and output an authentication key based on the video signal output from the second video signal selector, and a video decryption circuit configured to decrypt encryption of the video signal output from the second video signal selector, and output the decrypted video signal.

15. The video input device of claim 14, wherein the pseudo-signal generation circuit includes a timing detection circuit configured to obtain timing information of the video signal output from the input processing circuit, a timing information holding circuit configured to store the timing information output from the timing detection circuit, based on the power control information, an encryption control information holding circuit configured to obtain encryption control information contained in the video signal output from the input processing circuit, and store the encryption control information based on the power control information, and a video signal generation circuit configured to generate the pseudo-video signal based on the encryption control information output from the encryption control information holding circuit and the timing information output from the timing information holding circuit.

16. The video input device of claim 14, further comprising: an oscillator configured to generate and output a clock signal oscillating at a predetermined period, wherein the pseudo-signal generation circuit operates based on the clock signal output from the oscillator.

17. The video input device of claim 14, wherein the decryption circuit is controlled to a power-down state based on the power control information.

18. The video input device of claim 14, wherein the authentication key generation circuit is controlled to a power-down state based on the power control information and the selection result of the second video signal selector.

19. The video input device of claim 14, further comprising: a connection detection circuit configured to detect whether or not a video playback device is connected to the reception interface section, wherein the input power control circuit sets the power control information based on the detection result of the connection detection circuit.

20. The video input device of claim 14, wherein the input power control circuit includes a timer, and regularly sets the power control information based on the output selection information and time information output from the timer.

21. The video input device of claim 14, wherein the input power control circuit sets the power control information based on the output selection information and the pseudo-video signal output from the pseudo-signal generation circuit.

22. A video display system which includes a predetermined number of one or more video playback devices configured to transmit a digital signal conforming to a predetermined digital interface standard, the digital signal having been obtained from an encrypted video signal, and a video display device which includes a predetermined number of reception interface sections configured to receive the digital signals transmitted from the respective ones of the predetermined number of video playback devices, the video display device being configured to select and decrypt one of the digital signals received via the predetermined number of reception interface sections, and output the decrypted digital signal, wherein the video playback devices each include an encryption circuit configured to encrypt a digital video signal, an output control circuit configured to encode the digital video signal output from the encryption circuit in order to output the digital video signal to external circuitry, a transmission interface section configured to output a digital signal to the video display device, receive an authentication key of the video display device, and receive and output control information, an authentication circuit configured to generate an authentication key of encryption based on the digital video signal, and compare the authentication key of encryption with the authentication key of the video display device input via the transmission interface section, to check an authentication state, and a transmission control information communication section configured to receive and output control information via the transmission interface section, the video display device includes a reception control information communication section configured to receive and output control information via the predetermined number of reception interface sections, an input selection circuit configured to output input selection information for selecting one of the predetermined number of reception interface sections, an input signal selector configured to select and output one of the digital signals input via the predetermined number of reception interface sections, based on the input selection information, an input processing circuit configured to decode the digital signal output from the input signal selector to output a video signal, a plurality of decryption circuits, one decryption circuit for each of the predetermined number of reception interface sections, each configured to decrypt encryption of the video signal output from the input processing circuit and output the decrypted video signal, and generate and send an authentication key of the encryption to the reception interface section, and a video signal selector configured to select and output one of the video signals output from the plurality of decryption circuits, based on the input selection information, the plurality of decryption circuits each include a pseudo-signal generation circuit configured to extract information from the video signal output from the input processing circuit, and based on the extracted information, generate and output a pseudo-video signal, a second video signal selector configured to select and output one of the video signal output from the input processing circuit and the pseudo-video signal output from the pseudo-signal generation circuit, based on the input selection information, an authentication key generation circuit configured to generate and output an authentication key based on the video signal output from the second video signal selector, and a video decryption circuit configured to decrypt encryption of the video signal output from the second video signal selector, and output the decrypted video signal, the transmission control information communication section outputs video format information of a video signal to be transmitted, the reception control information communication section outputs the received video format information to the plurality of decryption circuits, and the pseudo-signal generation circuit in each of the plurality of decryption circuits generates the pseudo-video signal based on the video format information.

23. The video display system of claim 22, wherein the pseudo-signal generation circuit includes a timing detection circuit configured to obtain timing information of the video signal output from the input processing circuit, a timing information holding circuit configured to store the timing information output from the timing detection circuit, based on the input selection information, and output a storage state signal indicating that the timing information is stored, an encryption control information holding circuit configured to obtain encryption control information contained in the video signal output from the input processing circuit, and store the encryption control information based on the input selection information, a video signal generation circuit configured to generate the pseudo-video signal based on the encryption control information output from the encryption control information holding circuit and the timing information output from the timing information holding circuit, a video parameter storage memory configured to store a plurality of predetermined video parameter information items, a second video signal generation circuit configured to read the video parameter information corresponding to the video format information from the video parameter storage memory to generate a video signal, and a third video signal selector configured to select and output one of the pseudo-video signal output from the video signal generation circuit and the video signal output from the second video signal generation circuit, based on the storage state signal.

* * * * *